US010250066B2

(12) United States Patent
Jankins et al.

(10) Patent No.: US 10,250,066 B2
(45) Date of Patent: Apr. 2, 2019

(54) WIRELESS CHARGING AUTOCLAVABLE BATTERIES INSIDE A STERILIZABLE TRAY

(71) Applicant: Electrochem Solutions, Inc., Clarence, NY (US)

(72) Inventors: Eric Jankins, Raynham, MA (US); Brian R. Peterson, Cumberland, RI (US); Gregory G. Decker, Taunton, MA (US); William A. Planck, Hillsboro, OR (US)

(73) Assignee: Greatbatch Ltd., Clarence, NY (US)

( * ) Notice: Subject to any disclaimer, the term of this patent is extended or adjusted under 35 U.S.C. 154(b) by 90 days.

(21) Appl. No.: 15/592,678

(22) Filed: May 11, 2017

(65) Prior Publication Data

US 2017/0331318 A1      Nov. 16, 2017

Related U.S. Application Data

(60) Provisional application No. 62/334,674, filed on May 11, 2016.

(51) Int. Cl.
*H02J 7/02* (2016.01)
*H02J 50/12* (2016.01)
*H02J 7/00* (2006.01)

(52) U.S. Cl.
CPC ............ *H02J 7/025* (2013.01); *H02J 7/0013* (2013.01); *H02J 7/0027* (2013.01);
(Continued)

(58) Field of Classification Search
USPC ........................................................ 320/108
See application file for complete search history.

(56) References Cited

U.S. PATENT DOCUMENTS

| 5,341,083 A | 8/1994 | Klontz et al. |
| 5,923,544 A | 7/1999 | Urano |

(Continued)

FOREIGN PATENT DOCUMENTS

| DE | 4031214 | 10/1991 |
| EP | 0558316 | 9/1993 |

(Continued)

OTHER PUBLICATIONS

Extended European Search, Application No. 17170714.4 dated Jul. 19, 2017.

*Primary Examiner* — Bryce M Aisaka
(74) *Attorney, Agent, or Firm* — Michael F. Scalise; Steven W. Winn

(57) ABSTRACT

A system for wirelessly charging an electrical energy storage device such as secondary electrochemical cell or battery pack of at least two electrically connected secondary cells is described. The system comprises an electrical energy capture circuit and capture coil that is electrically incorporatable with an energy storage device. The system is primarily designed to be used with electrical power that is wirelessly transmitted by near field magnetic induction. The energy transmitting circuit and coil may be incorporated within a container designed to hold or enclose an energy storage device during an autoclave sterilization process. In addition, a wireless energy adapter configured with the energy capture circuit designed to facilitate wireless charging of an energy storage device is disclosed. Furthermore, a cart designed to provide a mobile wireless energy source is disclosed. The cart comprises at least one of the energy transmitting circuit, transmitting coil, energy capture circuit, and energy capture coil.

25 Claims, 38 Drawing Sheets

(52) U.S. Cl.
CPC .......... *H02J 7/0042* (2013.01); *H02J 7/0045* (2013.01); *H02J 50/12* (2016.02)

(56) References Cited

U.S. PATENT DOCUMENTS

| | | | |
|---|---|---|---|
| 6,025,725 | A | 2/2000 | Gershenfeld et al. |
| 6,452,482 | B1 | 9/2002 | Cern |
| 6,809,633 | B2 | 10/2004 | Cern |
| 8,258,745 | B2 | 9/2012 | Smith et al. |
| 8,319,925 | B2 | 11/2012 | Ben-Shalom |
| 8,461,719 | B2 | 6/2013 | Kesler et al. |
| 8,588,876 | B1 | 11/2013 | Trociewitz et al. |
| 9,030,159 | B2 | 5/2015 | Aghassian et al. |
| 2007/0290654 | A1 | 12/2007 | Govari et al. |
| 2012/0116380 | A1* | 5/2012 | Madan ............. A61B 17/00234 606/33 |
| 2012/0235634 | A1 | 9/2012 | Hall et al. |
| 2013/0230769 | A1 | 9/2013 | Xu et al. |
| 2014/0091756 | A1 | 4/2014 | Ofstein et al. |
| 2015/0207337 | A1 | 7/2015 | Peterson et al. |
| 2015/0365136 | A1 | 12/2015 | Miller et al. |
| 2016/0056664 | A1 | 2/2016 | Partovi |

FOREIGN PATENT DOCUMENTS

| | | |
|---|---|---|
| EP | 1521206 | 4/2005 |
| WO | 2013035986 | 3/2013 |
| WO | 2013142720 | 9/2013 |
| WO | 2013180399 | 12/2013 |

\* cited by examiner

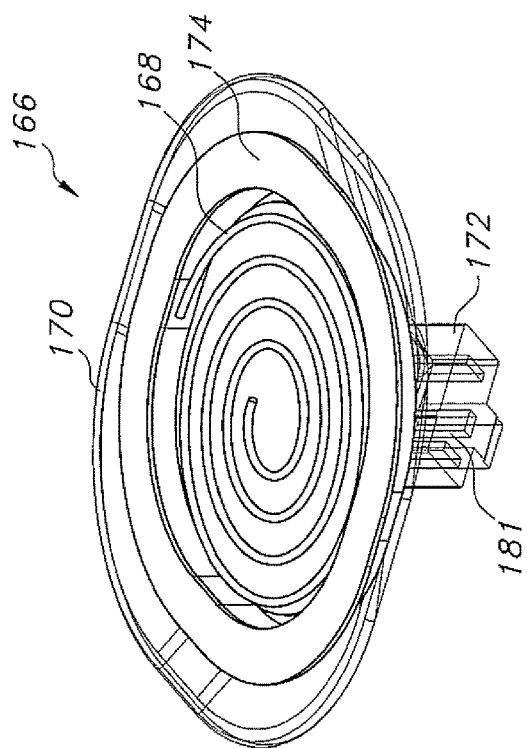
FIG. 22
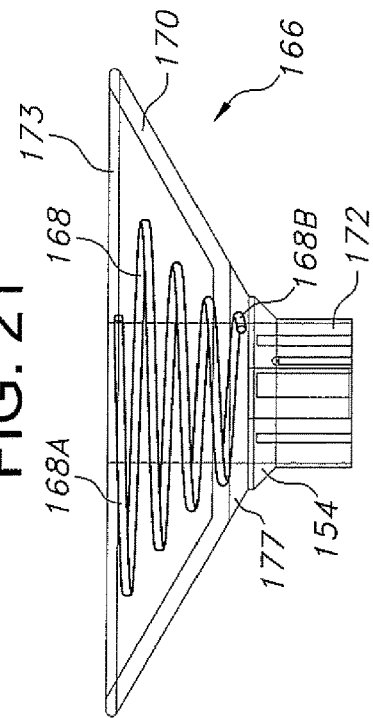
FIG. 21
FIG. 23
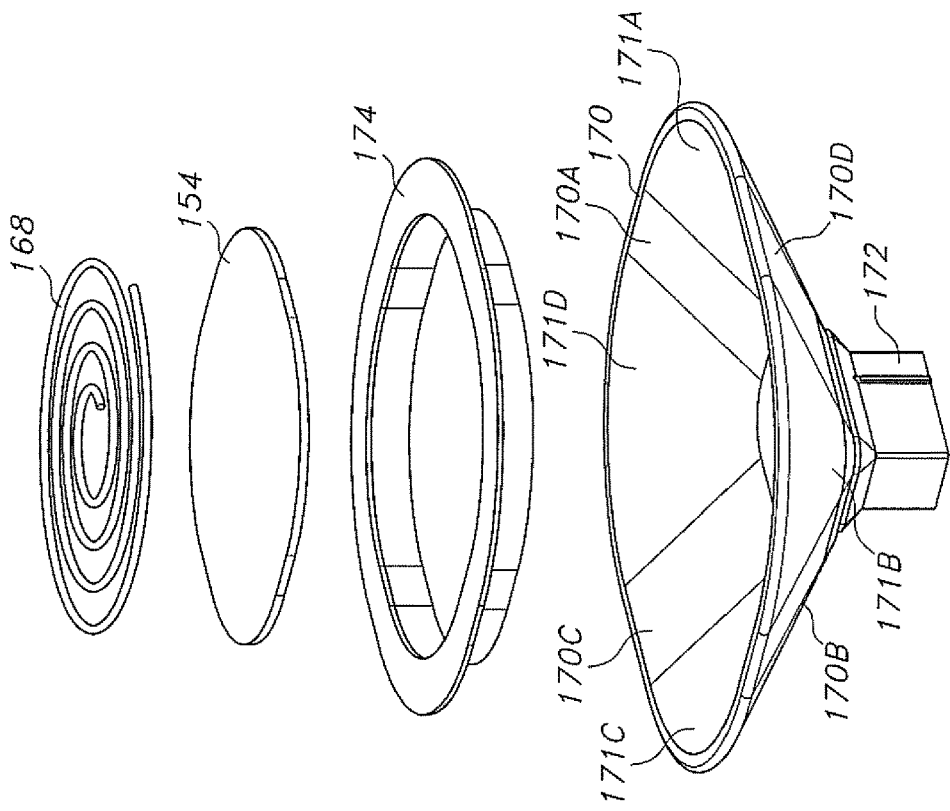

WIRELESS CHARGING AUTOCLAVABLE BATTERIES INSIDE A STERILIZABLE TRAY

CROSS-REFERENCE TO RELATED APPLICATION

This application claims priority from U.S. Provisional Patent Application Ser. No. 62/334,674, filed May 11, 2016.

FIELD OF THE INVENTION

The present invention relates to a system for wirelessly charging electrochemical cells. In particular, the invention relates to a circuit for controlling and modifying wireless electrical power to charge an electrochemical cell.

BACKGROUND

It is often desirable to be able to power a portable electronic device without the need of a traditional electrical power cable that connects the device to an electrical power outlet. Electrical power cords tether devices and restrict their movement. Therefore, entangled power cords could cause confusion as to what cord is connected to a particular device and further delay usage in untangling the cords. These problems are particularly problematic when powering medical devices, such as electrically powered surgical tools that are used in an operating room environment.

Therefore, it is desirable to power portable electronic devices wirelessly without the need to plug the device into an electrical outlet. One such way of providing electrical power to a portable medical device is by using either primary or secondary electrochemical cells. However, when these cells become depleted through use of the device, the cells need to be replaced or recharged. In either case, use of the device is stopped to exchange or re-charge the cells. Such a delay in use of a medical device is not desirable, particularly when the device is being used to perform a surgical procedure.

In addition, to reduce, if not eliminate, the possibility of patient infection, surgical environments require that a sterile field be sustained continuously throughout a procedure. Generally, a "sterile field" is the space surrounding a surgical site at which a procedure is performed. Further, the sterile field extends to the front of the surgeon and any assisting personnel. This requirement extends not only to medical devices used in the sterile field, but also to power sources used by these medical devices. These medical devices may be used to perform a procedure, to monitor a patient, to monitor the surrounding environment, to provide visual, lighting, audio, recording and other such needs. Power sources are also used in personal protection systems that surgical personnel sometimes wear when performing a procedure. These personal protection systems may include a ventilation unit, a light source, or communication device. These devices generally utilize a rechargeable electrical power source that may be depleted and recharged multiple times.

Many electrical power sources used in the operating room include rechargeable cells. This allows the battery to be repetitively used. A unique set of problems arises when a sterilized surgical device or medical instrument also has a removable battery component that needs to periodically be removed from the device and recharged. Such battery components generally do not stay within the sterile field of a singular operation as they are intended to be used for multiple and different surgical procedures on different patients. As such, to reduce the risk of spreading disease and infection, the battery must either be sterilized before it can be reused in another surgical procedure or, if not sterilized, be transferred into a sterile environment within a sterile container. The former poses performance issues while the latter creates risk for breaching the sterile field. Therefore, there is a need to provide electrical power to recharge electrical power sources or directly power medical devices with minimal physical contact to thus reduce the possibility of contamination thereof.

Autoclave sterilization is a process in which pressurized heated steam is used to sterilize a surface. The autoclave process is often used to sterilize tools and instruments, particularly those used during a surgical procedure. In addition, the autoclave process is used to sterilize batteries and battery packs that are used during a surgical procedure. However, heat from the autoclave process may cause the cell chemistry to react or become modified thus resulting in an electrochemical cell or battery pack that does not perform optimally. For example, the autoclave process may cause a chemical reaction within the cell that results in a reduction of cell capacity.

Since it is important to keep the cell or battery pack sterilized, particularly, prior to use during a medical procedure, it is advantageous to minimize contact of the cell or pack to external surfaces after sterilization. As such, to ensure optimal sterilized conditions, cells and battery packs are typically charged prior to sterilization to minimize contact of the battery or battery pack with foreign surfaces, thus minimizing the possibility of breaching the sterile barrier. However, exposure of the cells to the heat of the autoclave process may result in electrical performance degradation as previously discussed. Therefore, it is ideal for a cell or battery pack to be charged after the autoclave sterilization process. Charging a cell or battery pack after the sterilization process would minimize the possibility that the cell's electrical performance may be degraded and, thus, would enable a longer usable life (cycle count).

Thus, there is a need to charge a battery or battery pack after an autoclave sterilization process without the need to physically contact the battery or pack to a foreign surface. One such means to recharge an electrical power source, such as an electrochemical cell or battery pack, is by using near field resonant inductive coupling to wirelessly transfer electrical energy to the electrical power source. Therefore, since electrical energy is transferred wirelessly, physical contact is reduced, and thus the possibility of contaminating the electrical power source is minimized.

In near field resonant inductive coupling, electrical energy is transferred wirelessly between two resonators that are tuned to resonate at about the same frequency. When the two resonators resonate, an oscillating magnetic field between the two is created that enables transfer of electrical energy therebetween. The electrical energy may thus be used to recharge an electrochemical cell or battery pack a distance away from the electrical power source. More specifically, near field resonant inductive coupling typically uses coupled electromagnetic resonators with long-lived oscillatory resonant modes to transfer electrical power. Near field resonant inductive coupling is further discussed in U.S. Pat. No. 8,461,719 to Kesler et al., which is incorporated herein in its entirety.

SUMMARY OF THE INVENTION

The present invention provides an electrical system that utilizes wirelessly transmitted electrical energy to charge an energy storage device. More specifically, the present invention provides an electrical charging system that utilizes near field resonant inductive coupling to wirelessly transmit electrical energy so that one or more energy storage devices can be electrically charged. The charging system comprises an energy transmitting circuit electrically connected to an energy transmitting coil that is spaced apart from an energy capture circuit electrically connected to an energy capture coil.

In an embodiment, an energy capture circuit and energy capture coil, electrically incorporated within an energy storage device, i.e., a battery pack is disclosed. In addition, a container configured to hold or store an energy storage device equipped with an energy capture circuit and energy capture coil is disclosed. The container is further configured with an energy transmitting circuit and energy transmitting coil. In an embodiment, the container is constructed to temporarily support an energy storage device equipped with the energy capture circuit and capture coil of the present invention while being subjected to an autoclave sterilization process. Examples of containers include, but are not limited to a bay, a bin, and a tray. After the autoclave sterilization process is complete, the sterilized energy storage device is electrically charged via wireless energy while the energy storage device remains in the container. Thus, the possibility of breaking the sterilization barrier is minimized since the energy storage device is wirelessly charged after an autoclave sterilization process within the sterilized container without physical contact.

In a further embodiment, a wireless energy adapter configured to be electrically connectable to an energy storage device is disclosed. The wireless energy adapter enables an energy storage device, not previously equipped with a wireless energy capture circuit and capture coil, to harness wirelessly transmitted electrical power such that the captured wireless electrical energy can be used to charge the device. The adapter comprises the energy capture circuit and capture coil of the present invention.

In yet another embodiment, a wireless energy cart configured with the wireless charging system of the present invention is disclosed. The cart provides a mobile wireless electrical energy source that is capable of wirelessly charging at least one energy storage device equipped with the energy capture circuit and capture coil of the present invention by placing the device on or near the surface of the cart. Also, the cart is capable of wirelessly powering other electronic devices. Furthermore, the cart is configured to transfer electrical power between multiple carts that are in physical contact with each other.

The charging system works by placing at least one electrical energy storage device, equipped with an energy capture circuit and capture coil, in contact with, or in the vicinity of, the energy transmitting coil which is electrically connected to the energy transmitting circuit. Electrical power is transmitted wirelessly between the energy transmitting circuit and the energy capture-equipped energy storage device by receiving the magnetic field that is generated by the energy transmitting circuit and transmitted by the transmitting coil. As such, it is important that the energy storage device is in relatively close proximity and in an optimal orientation to the transmitting coil to ensure maximum electrical power transfer.

These and other objects of the present invention will become increasingly more apparent to those skilled in the art by reference to the following description and to the appended drawings.

BRIEF DESCRIPTION OF THE FIGURES

FIG. 21 shows an embodiment of the wireless energy capture adapter of the present invention.

FIG. 22 is an exploded view of the wireless energy capture adapter shown in FIG. 20.

FIG. 23 is a side view of the wireless energy capture adapter shown in FIG. 21.

DETAILED DESCRIPTION OF THE
PREFERRED EMBODIMENTS

The present invention provides an energy system that is designed to utilize near-field resonant inductive coupling to wirelessly transmit alternating current electrical energy. The transmitted electrical energy may be used to recharge at least one electrical energy storage device 12 (FIG. 17), such as a secondary or rechargeable electrochemical cell or a battery pack of two or more electrically connected secondary or rechargeable electrochemical cells or, alternatively, the system may be used to directly power a device (not shown). In a preferred embodiment, the system comprises an energy transmitting circuit 14 and an energy capture circuit 16 that is spaced from the transmitting circuit 14.

The energy capture circuit 16 is configured to receive electrical energy that is sent from the energy transmitting circuit 14 so that this energy can be used to recharge an energy storage device 12 that is electrically attached thereto. The energy capture system may be positioned on an exterior surface of an energy storage device 12 or, alternatively, it may be electrically incorporated within the structure of the energy storage device. Likewise, the energy capture system may be positioned on an exterior surface of an electronic device or, alternatively, the system may be electrically connected within the device.

Figure 32:
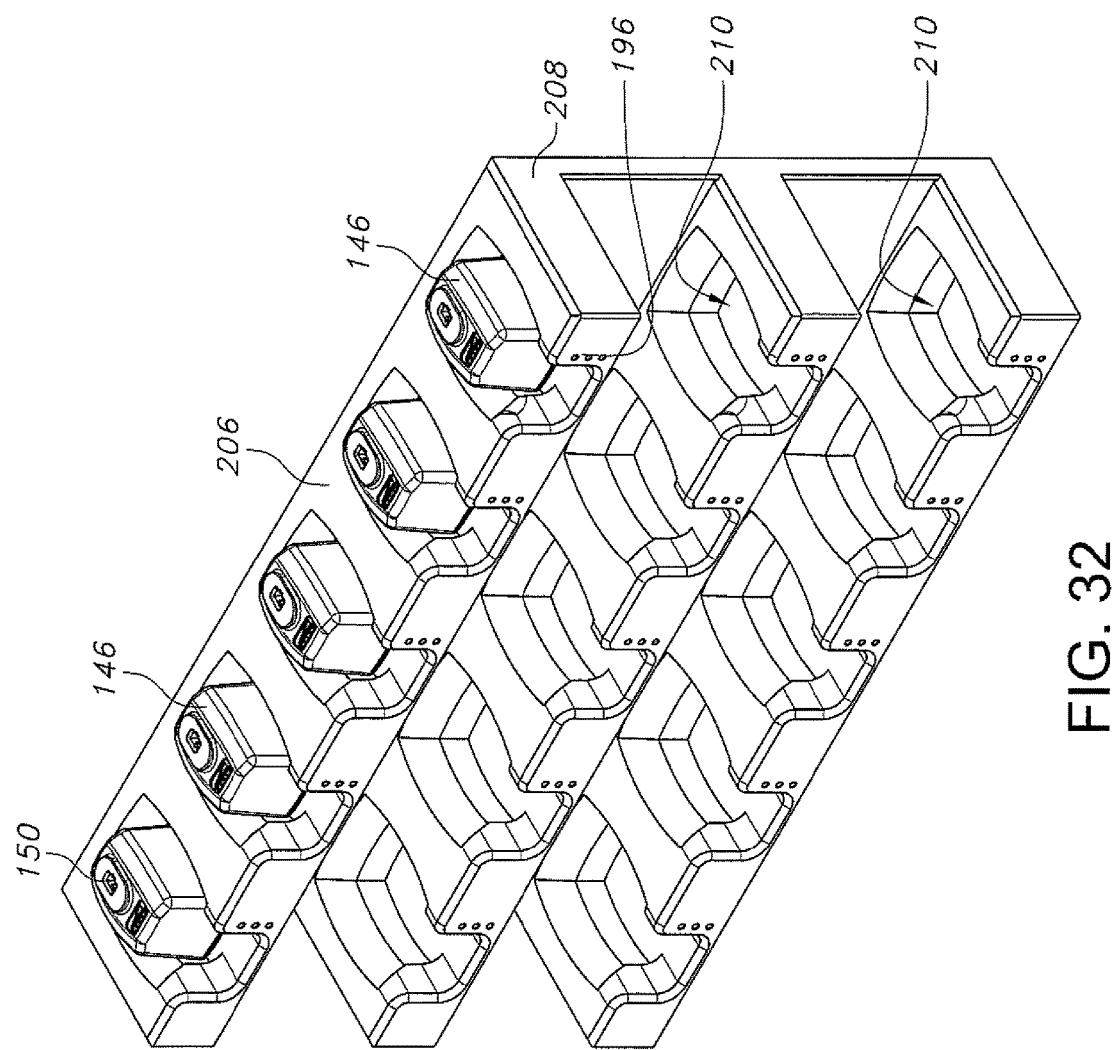
FIG. 32 shows an embodiment of an energy storage device bay configured with the wireless energy transmitting circuit of the present invention.
Figure 33:
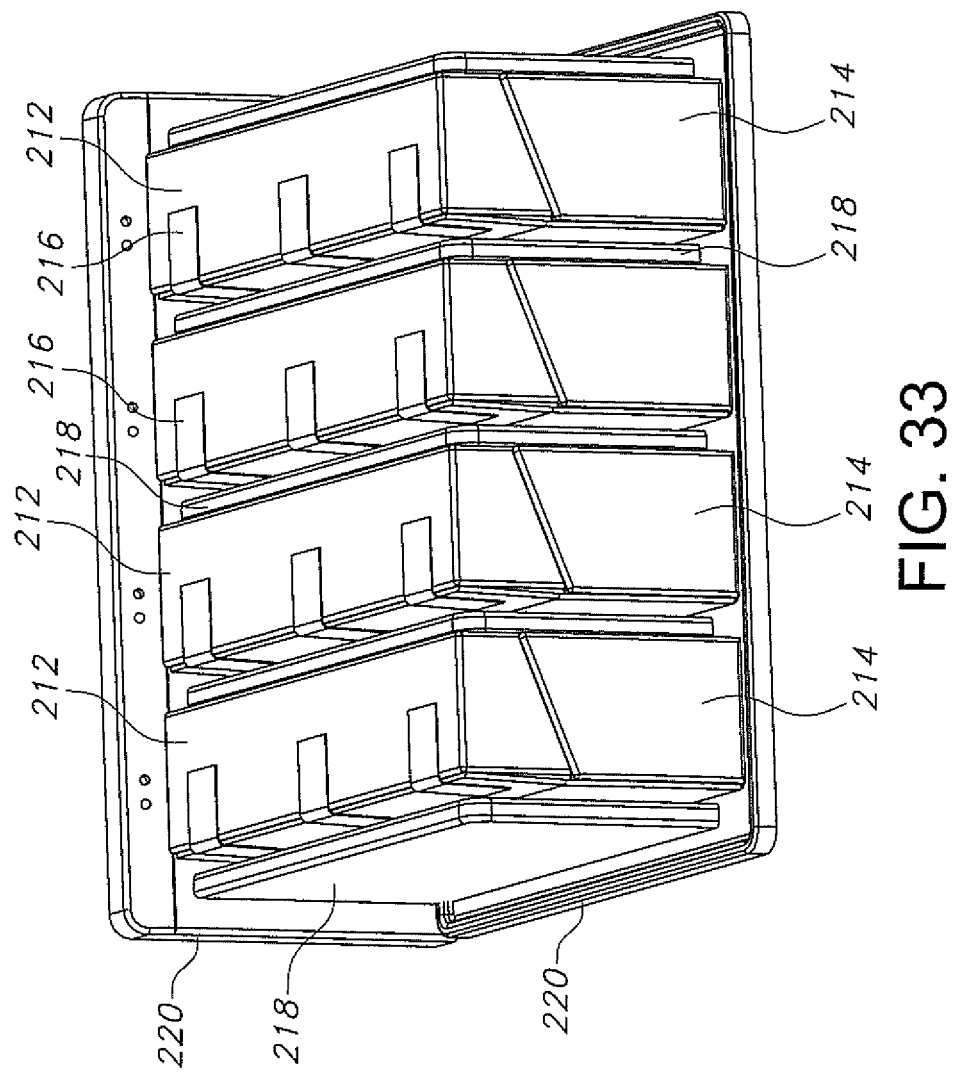
FIGS. 33 and 34 illustrate embodiments of an energy storage device bin configured with the wireless energy transmitting circuit of the present invention.
Figure 34:
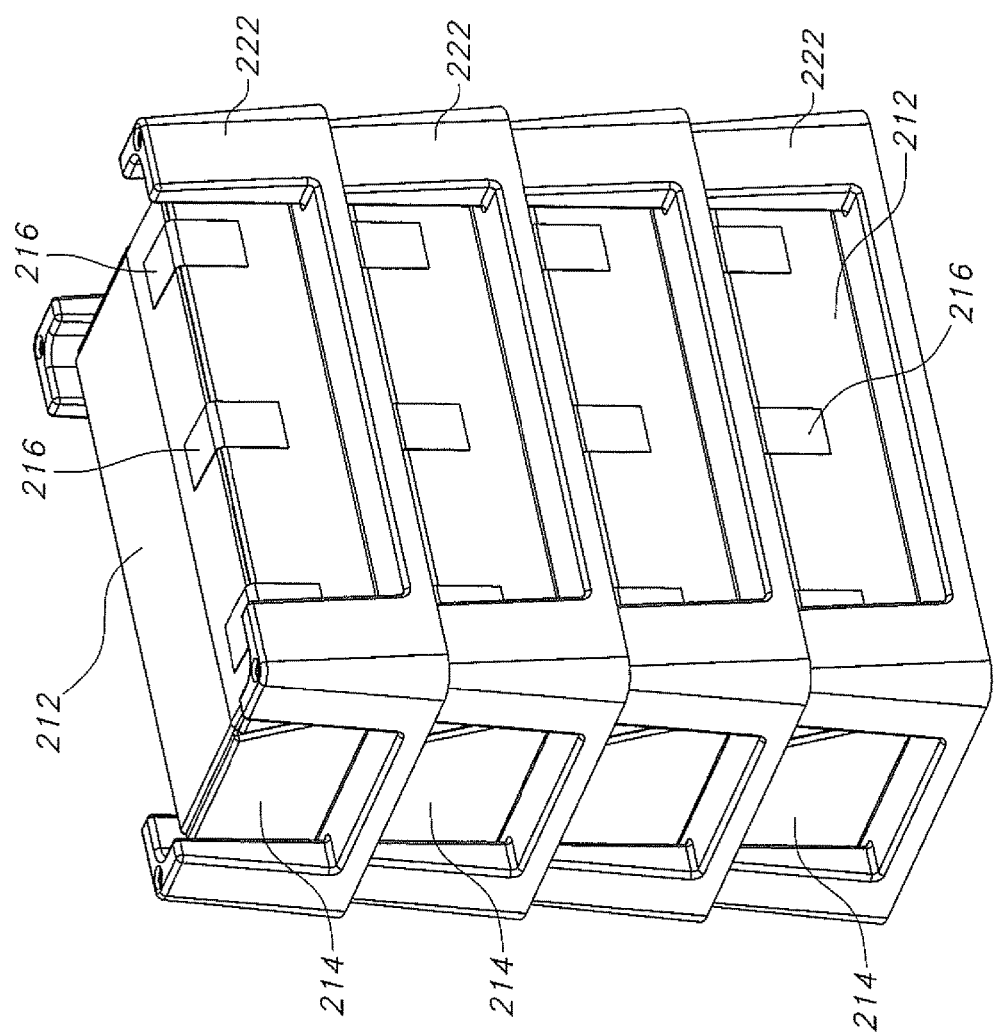
Figure 35:
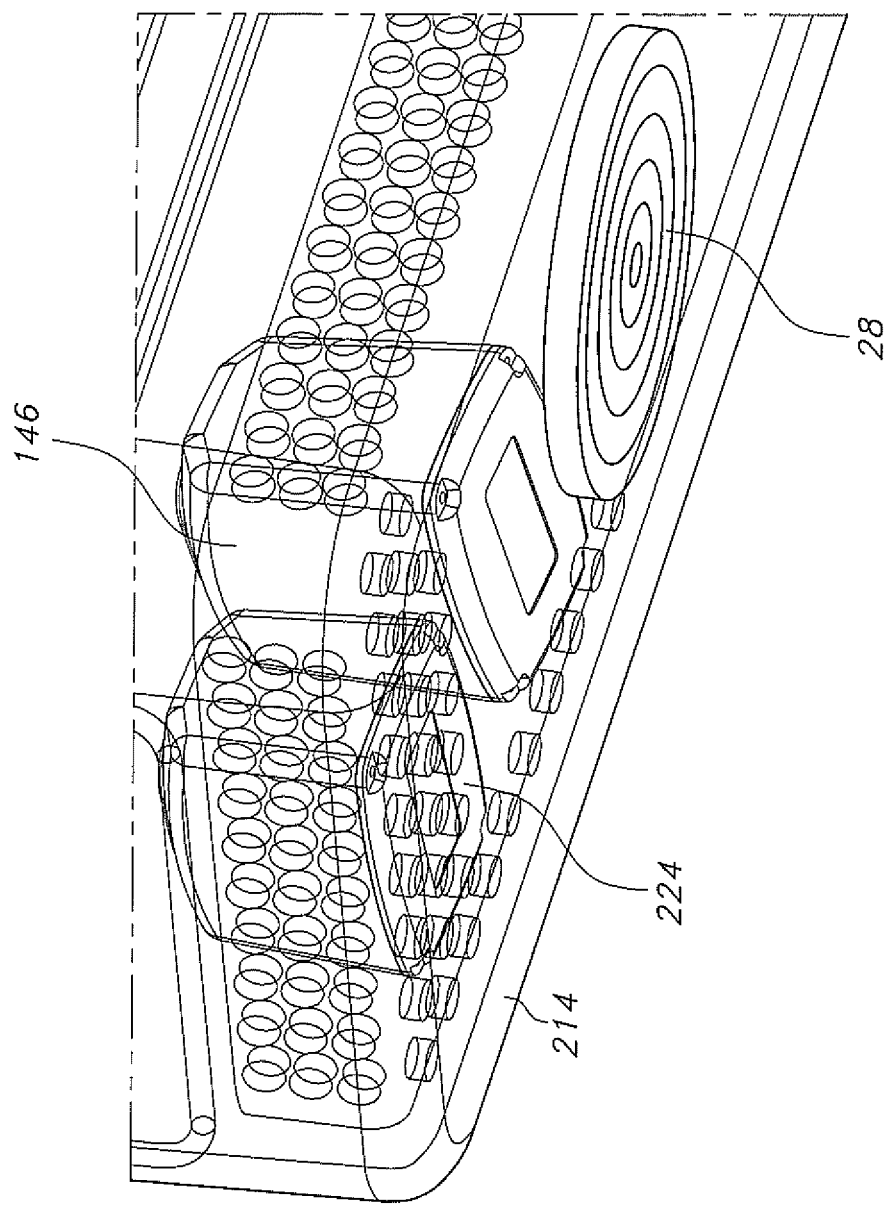
FIG. 35 illustrates an embodiment of a transmitting coil positioned within an energy storage device bin shown in FIGS. 33 and 34.

As defined herein, an electrical energy storage device is an apparatus that is capable of repeatably storing electrical energy. An energy storage device may comprise an electrochemical cell, a battery pack of two or more electrically connected (series or parallel, or both) secondary or rechargeable electrochemical cells or a capacitor. An electrochemical cell is a device capable of generating electrical energy from a chemical reaction. A "battery pack" comprises a plurality of at least two electrochemical cells that are electrically connected together to provide an electrical power source. In a preferred embodiment, the electrochemical cell or battery pack comprises at least one rechargeable or secondary electrochemical cell. A "capacitor" is defined herein as a device for accumulating and holding a charge of electricity. As defined herein, "charge power" is the electrical power emitted by the charging system to charge an electrical energy storage device, such as an electrochemical cell or battery pack. "Charge current" is the electrical current that is emitted by the charging system to charge a cell. "Charge voltage" is the electrical voltage that is emitted by the charging system to charge a cell. "Charge power" (P) is equal to charge voltage (V) multiplied by charge current (I). A "container" is defined herein as a receptacle that holds an energy storage device. Examples of containers include, but are not limited to, a tray, a bin, and a bay. A "bay" is defined herein as a receptacle comprising a compartment within which an energy storage device is received. The compartment may be formed within a housing, such that the energy storage device is hidden from view as shown in the embodiments of FIGS. 30A-30C, 31A-31C or the compartment may be formed such that the energy storage device is exposed as illustrated in FIG. 32. A "tray" is defined herein as a receptacle that holds an energy storage device. A tray may comprise a cavity within which an energy storage device is positioned. Examples of trays are illustrated in FIGS. 24, 25, 27, 28, and 29. A "bin" is defined herein as a receptacle that encloses an energy storage device therewithin. Examples of bins are shown in FIGS. 33, 34, and 35.

In an embodiment, electrical energy received wirelessly by the energy capture circuit 16 of the present invention is used to charge a secondary electrochemical cell or battery pack of at least two electrically connected secondary electrochemical cells. Such secondary electrochemical cells may include, but are not limited to, electrochemical chemistries such as lithium ion (Li-ion), lithium ion polymer (Li-ion polymer), nickel metal hydride (NiMH), nickel cadmium (NiCd), and lithium iron phosphate (LiFePO$_4$). In a preferred embodiment, the energy capture system of the present invention may be used to charge cells and power packs requiring from about 1 milliwatts to about 500 kilowatts of electrical power.

In wireless electrical power transfer using near-field resonant inductive coupling, a source resonator or transmitting coil is electrically connected to an electrical power generator with direct electrical connections. A receiving resonator, or receiving coil positioned a distance from the source resonator is electrically connected to a load (i.e., a device) with direct electrical connections. The source and receiving resonators are coupled via a magnetic field therebetween to exchange electrical energy wirelessly between the source and the receiving resonators in order to transmit electrical power from the power generator to the device.

A resonator may be constructed such that the energy stored by the electric field is primarily confined within the resonator structure and energy stored by the magnetic field is primarily in the region surrounding the resonator. Thus, the electrical energy exchange is mediated primarily by the resonant magnetic near-field surrounding the space about the resonators. The resonator, sometimes referred to as a "coil", is generally constructed by wrapping a metallic wire around a core of magnetic material. Additional information about resonators utilized in near field resonant induction power transfer can be found in U.S. patent application publication no. 2012/0235634 to Hall et al., which is incorporated herein in its entirety.

Figure 1:
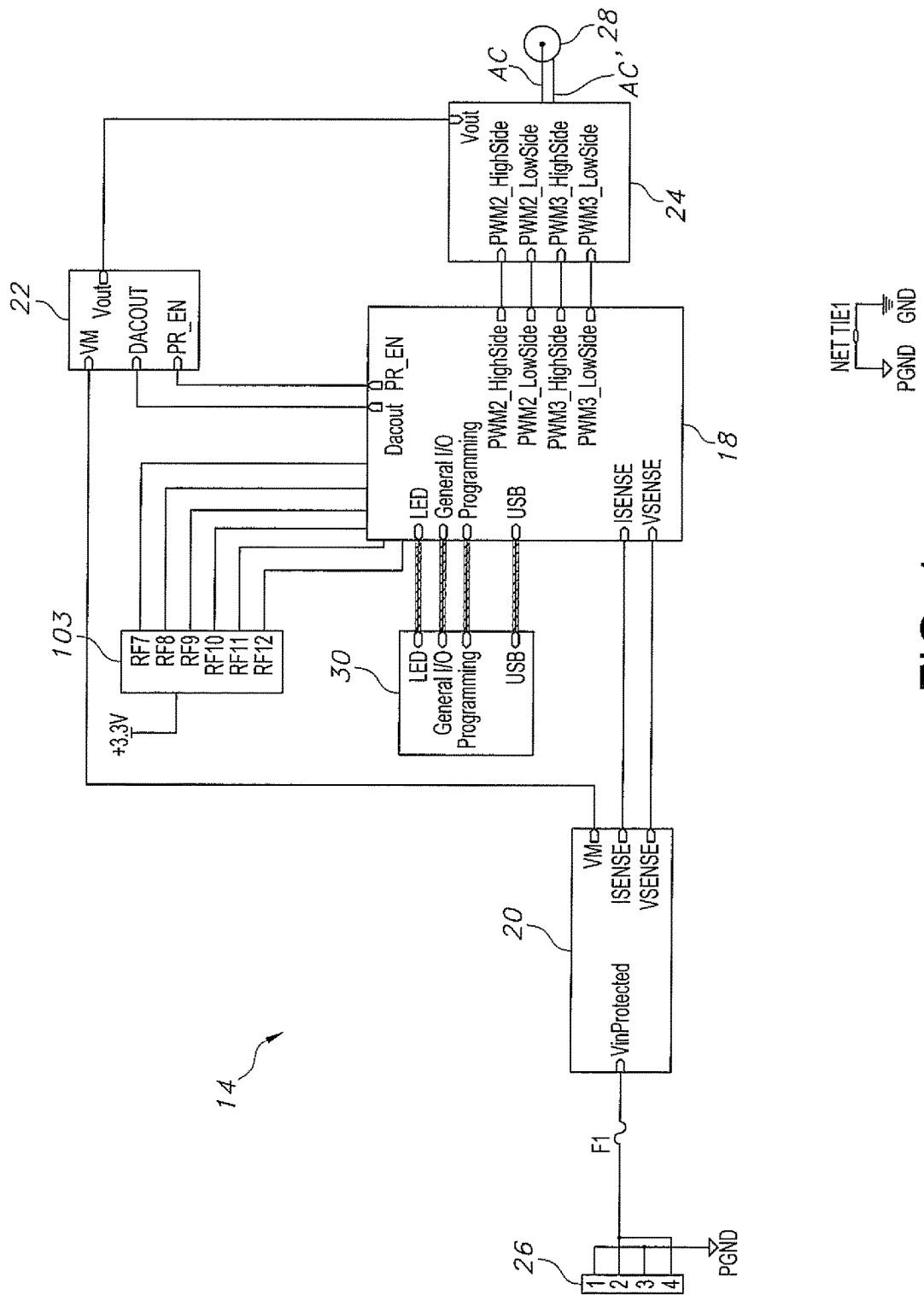
FIG. 1 is an electrical schematic diagram of an embodiment of the energy transmitting circuit of the present invention.
Figure 1A:
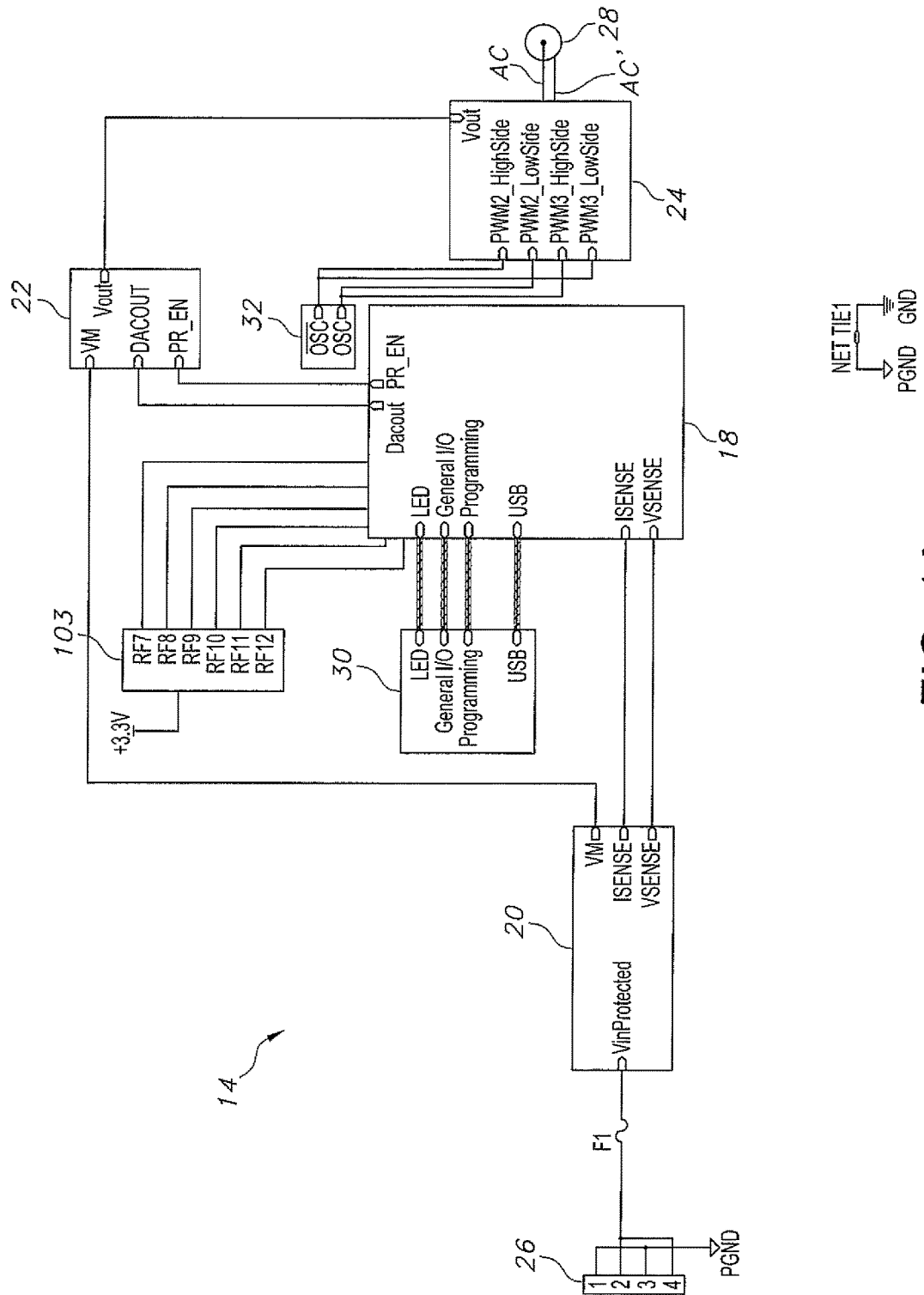
FIG. 1A is an electrical circuit schematic diagram of an alternate embodiment of the energy transmitting circuit of the present invention.

Now turning to the figures, FIGS. 1 and 1A through 15 are electrical schematic diagrams that illustrate embodiments of the circuitry that comprise the energy system of the present invention. FIGS. 1 and 1A are electrical diagrams that illustrate embodiments of the energy transmitting circuit 14. FIGS. 2 through 6, and 15 are electrical diagrams that illustrate embodiments of the sub-circuits and components that comprise the energy transmitting circuit 14. FIG. 7 is an electrical diagram that illustrates an embodiment of the energy capture circuit 16. FIGS. 8 through 14 are electrical circuit diagrams that illustrate embodiments of the sub-circuits and components that comprise the energy capture circuit 16.

The energy system is configured such that electrical power is transmitted wirelessly via near field magnetic inductive coupling from the energy transmitting circuit 14 to the spaced apart capture circuit 16. In an embodiment, the transmitting circuit 14 is configured to be electrically connected to an electrical power source such as an electrical outlet, an electrical generator or an electrical energy storage device. The electrical power source provides the electrical energy that is transmitted via near field magnetic inductive coupling from the energy transmitting circuit 14 to the capture circuit 16.

As shown in FIG. 1, the energy transmitting circuit 14 comprises a transmitting master control unit sub-circuit 18, a power supply sub-circuit 20, a power management sub-circuit 22, a power inverter sub-circuit 24, an input connecter 26, and a transmitting coil 28. The energy transmitting circuit 14 may further comprise an expansion sub-circuit 30 that is electrically connected to the master control unit 18. In an embodiment, the expansion sub-circuit 30 is configured to provide the energy transmitting circuit 14 with additional electronic capabilities that may be custom tailored to a particular application. For example, the expansion sub-circuit 30 may be configured with digital memory and an integrated processor. In addition, the expansion sub-circuit 30 may be configured with circuitry that controls the operation of circuit status indicators such as light emitting diodes (LED), sense circuits such as Hall sensors, or may be used to store operating and programming instructions. Furthermore, the expansion sub-circuit 30 may be configured with additional user inputs such as a universal serial bus (USB) interface, or radio frequency (RF) telemetry circuitry.

In an embodiment, the input connector 26 is designed to be electrically connectable to an electrical power source such as an electrical outlet (not shown). In a preferred embodiment, the input connector 26 is electrically connectable to an alternating current (AC) electrical power. Once received at the input connector 26, the electrical power passes through a fuse $F_1$ which is configured to prevent an over current condition. In the unlikely event that an overcurrent condition occurs when the current of the incoming electrical power exceeds a pre-determined amplitude, the fuse $F_1$ is designed to break so that the incoming electrical power is prevented from proceeding further within the energy transmitting circuit 14. As shown in FIGS. 1 and 1A, fuse $F_1$ is electrically connected to the input connector 26 and the power supply sub-circuit 20. In an embodiment, the power supply sub-circuit 20 is configured to prepare the incoming electrical power for wireless transmission as well as supply electrical power to the transmitting circuit 14. As illustrated, the power supply sub-circuit 20 is electrically connected to the power management sub-circuit 22. The power management sub-circuit 22 is configured to modify the amplitude of the voltage of the incoming electrical power based on the measured amplitude of the incoming electrical power received at the power supply sub-circuit 20. As illustrated, the power management sub-circuit 22 is electrically connected to the power inverter sub-circuit 24 which is configured to convert the electrical power from a direct current voltage to an electrical power having an alternating current voltage. The power inverter 24 is electrically connected to the transmitting coil 28 which is configured to wirelessly transmit the electrical power to the energy capture circuit 16. The master control unit 18, which is electrically connected to the power supply, voltage regulator, and power inverter sub-circuits, is configured to control the operation of the energy transmitting circuit 14.

FIG. 1A illustrates an alternate embodiment of the energy transmitting circuit 14. Similar to the embodiment of the energy transmitting circuit 14 shown in FIG. 1, the energy transmitting circuit 14 shown in FIG. 1A is configured to convert electrical power received from an electrical energy source having a direct current to an electrical power having an alternating current that is conditioned to be wirelessly transmitted. The energy transmitting circuit 14 shown in FIG. 1A comprises the master control unit 18, the power supply sub-circuit 20, the power management sub-circuit 26, the inverter sub-circuit 24, fuse $F_1$, the input connecter 26, the expansion sub-circuit 30 and the transmitting coil 28. In addition, the circuit 14 shown in the embodiment of FIG. 1A further comprises a pulse width modulator sub-circuit 32, further illustrated in FIG. 5 that is electrically connected to the power inverter sub-circuit 24. In an embodiment, the pulse width modulator sub-circuit 32 is configured to generate a reference clock signal that is utilized by the inverter sub-circuit 24 to convert the electrical power to an alternating current electrical power.

Figure 2:
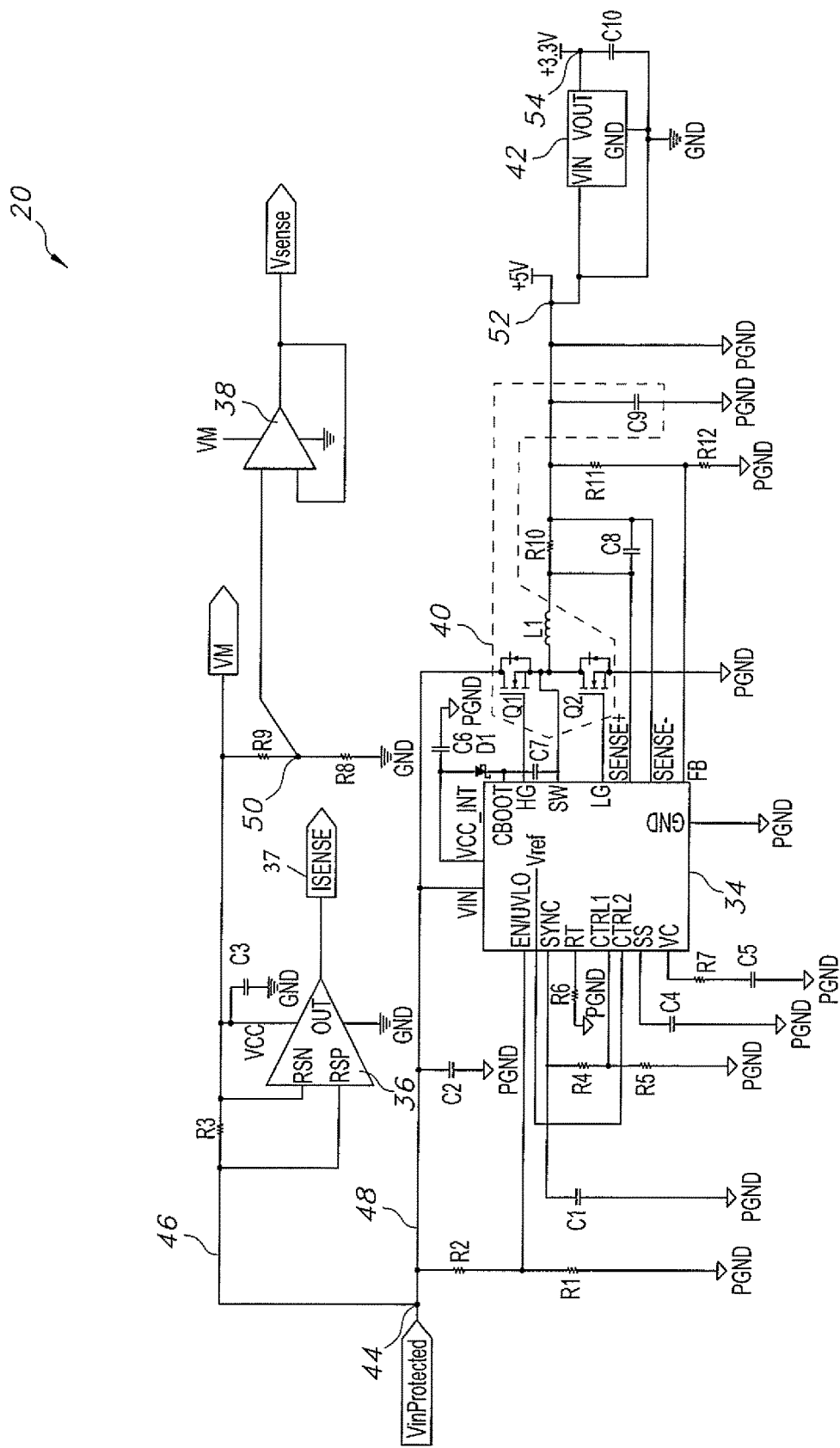
FIG. 2 is an electrical schematic diagram of an embodiment of the power supply sub-circuit comprised within the energy transmitting circuit.

FIG. 2 illustrates an embodiment of the power supply sub-circuit 20. In an embodiment, the power supply sub-circuit 20 is designed to condition the incoming electrical power to be wirelessly transmitted to the energy capture circuit 16. In an embodiment, the power supply sub-circuit 20 converts the incoming electrical power from an alternating current electrical power to a direct current electrical power. The sub-circuit is further configured to measure the electrical current and voltage of the electrical power received from the electrical power source. This information is sent to the master control unit 18 which is used to determine the incoming amplitude of the electrical power received from the electrical power source and adjust the voltage of the electrical power to be wirelessly transmitted accordingly. In addition, the power supply sub-circuit 20 is configured to provide electrical power to the components and sub-circuits that comprise the transmitting circuit 14.

As shown, the power supply sub-circuit 20 comprises a first integrated circuit 34, a first amplifier 36, a second amplifier 38, a first voltage regulator 40 and a second voltage regulator 42. In an embodiment, the first amplifier 36 comprises a differential amplifier and the second amplifier comprises an operational amplifier. The first integrated circuit 34 is configured to work in conjunction with the master control unit 18 to operate the power supply sub-circuit 20. In an embodiment, electrical power received at node 44 is divided into first and second electrical power portions within the power supply circuit 20. The first portion of electrical power travels along electrical path 46 to the power management sub-circuit 22 (FIG. 3) and power inverter sub-circuit 24 (FIG. 4) where it is wirelessly transmitted to the energy capture circuit 16 by the transmitting coil 28. The second portion of electrical power that travels along electrical path 48 is used to electrically power the sub-circuits and components that comprise the energy transmitting circuit 14.

In an embodiment, the voltage and current of the first portion of the incoming electrical power are measured by the power supply sub-circuit 20. As shown in FIG. 2, the first portion of electrical power spans across sense resistor $R_3$ along electrical path 46. In an embodiment, the sense resistor $R_3$ is configured to generate a voltage drop across the RSP and RSN terminals of the first amplifier 36. The voltage drop signal is sent to the master control unit 18 (FIGS. 1 and 1A) along Isense 37 where it is used to determine the amplitude of the electrical current of the incoming electrical power. Given the value of the measured voltage drop of the incoming electrical power and using Ohm's law, the electrical current of the incoming electrical power is determined by the master control unit 18 using the resistance value of the sense resistor $R_3$. The first amplifier 36 is configured to increase the amplitude of the voltage drop measured across sense resistor $R_3$.

A resistor divider comprising resistors $R_8$ and $R_9$ is used to determine the voltage of the incoming electrical at node 50. In an embodiment, the measured voltage at node 50 between resistors R8 and R9 is sent along Vsense to the master control unit 18 where it is used to calculate the magnitude of the voltage of the incoming electrical power given the resistance values of the resistor divider. The voltage measured at node 50 is amplified by the second amplifier 38 which is sent to the master control unit 18. Thus, given the calculated values of the voltage and current of the incoming electrical power, the amplitude of the power is determined by the equation:

Electrical power (W)=Voltage×Current

Based on the calculated amplitude of the incoming electrical power, the master control unit 18 may adjust the voltage of the wirelessly transmitted electrical power by using the power management sub-circuit 22, thereby adjusting the power of the first portion of the incoming electrical energy. In addition, the master control unit 18 may cease operation of the transmitting circuit 14 if the amplitude of the power of the incoming electrical energy is determined to exceed established voltage specifications.

In an embodiment, the second portion of the electrical power received at node 44 is used to power the components and sub-circuits that comprise the energy transmitting circuit 14. The second portion of electrical power travels along electrical path 48 where it enters the first voltage regulator 40, preferably a buck regulator comprising field effect transmitter (FET) $Q_1$, field effect transmitter (FET) $Q_2$, inductor $L_1$, and capacitor $C_9$. In an embodiment, the first regulator 40 modifies the amplitude of the voltage of the second portion of electrical power such that it can be utilized to electrically power the components and sub-circuits that comprise the transmitting circuit 14. In a preferred embodiment, the amplitude of the voltage of the second portion of electrical power at node 52 is about 5 volts. In addition, the amplitude of the voltage of the second portion of electrical power may be further reduced by the second voltage regulator 42, preferably a linear voltage regulator. In an embodiment, the second voltage regulator reduces the amplitude of the voltage of the second portion to about 3.3V at node 54.

Figure 3:
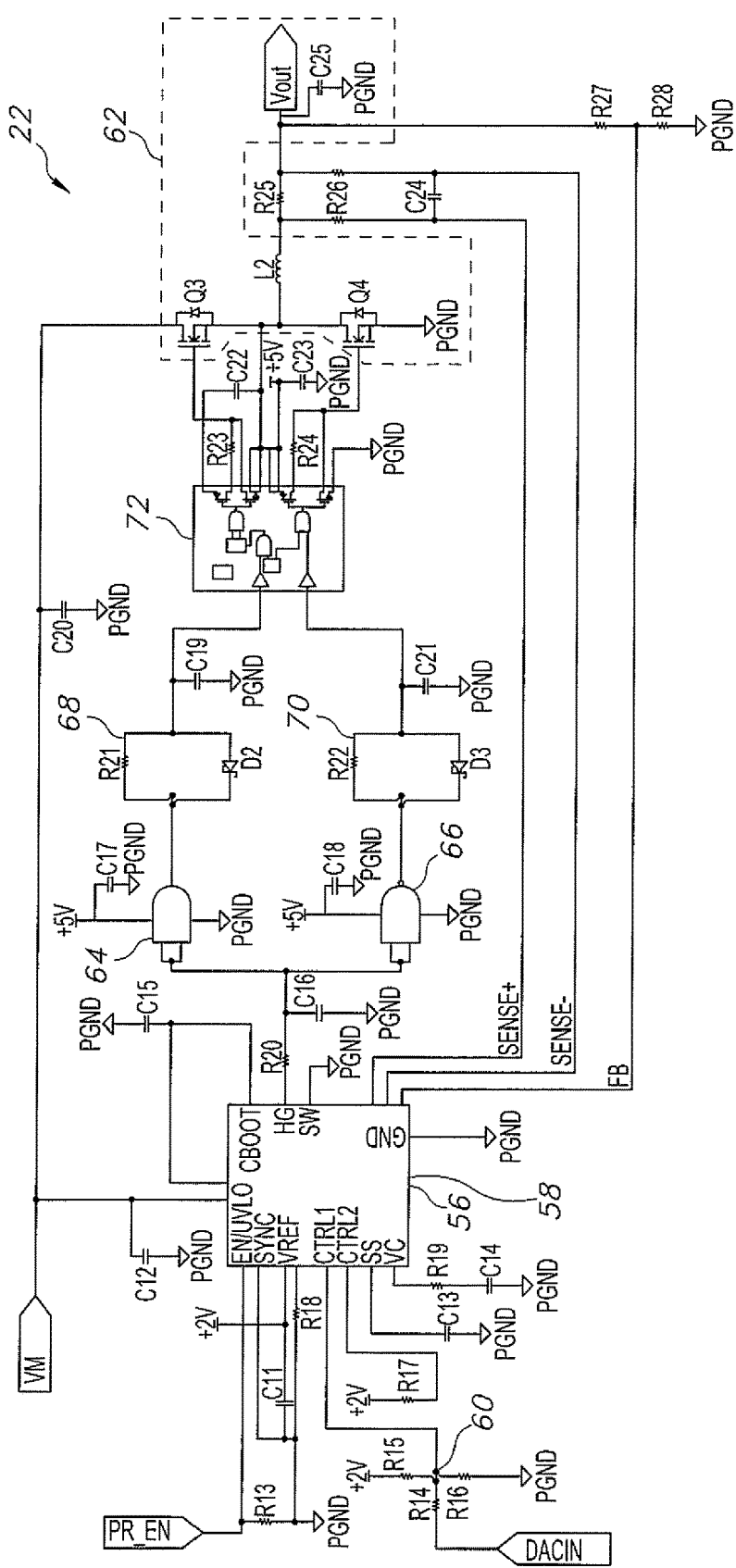
FIG. 3 is an electrical schematic diagram of an embodiment of the power management sub-circuit comprised within the energy transmitting circuit.

FIG. 3 illustrates an embodiment of the power management sub-circuit 22. As shown, the circuit comprises a second integrated circuit 56 that is configured to control the operation of the power management sub-circuit 22. In an embodiment, the power management sub-circuit 22 controls the amount of current that flows through the transmitting coil 28, which thus determines the intensity of the magnetic field that is emanated by the transmitting coil 28. In an embodiment, the second integrated circuit 56 comprising a constant current, constant voltage buck converter 58 incorporated therewithin that is electrically connected to the inverter sub-circuit 24. It is noted that the second integrated circuit 56 is preferably configured to generate a reference voltage ($V_{ref}$) that may range from about 1V to about 4V. A reference voltage of about 2V is preferred in this circuit. In a preferred embodiment, the buck converter 58 controls the amount of electrical power that is directed into the inverter sub-circuit 24 and transmitted wirelessly therefrom. Thus, the buck converter 58 controls the amount of electrical power that is transmitted by the transmitting coil 28.

In a preferred embodiment, the magnitude of current that emanates from integrated circuit 56 is determined by measuring a reference voltage at CTRL1 pin. The reference voltage is created at node 60 which resides between resistors $R_{15}$ and $R_{16}$ that are electrically connected in series. The integrated circuit 56 utilizes the reference voltage as a comparison for the output current. In a preferred embodiment, the electrical connection of resistors $R_{27}$ and $R_{28}$ provides the integrated circuit 56 with a feedback voltage that is utilized to dynamically adjust the voltage of the electrical power that exits the sub-circuit 22. In addition, the circuit comprises Sense$^+$ and Sense$^-$ pins within the integrated circuit 56 that are each capable of measuring a voltage at the respective pin location. In an embodiment, the integrated circuit 56 is configured to determine the amount of electrical current that is being created by the circuit 22 by measuring a voltage drop across resistor $R_{25}$ that is electrically connected between the Sense$^+$ and Sense$^-$ pins.

In addition to the integrated circuit 56, the power management sub-circuit 22 further comprises a buck converter 62 that comprises field effect transistors $Q_3$ and $Q_4$, inductor $L_2$ and capacitor $C_{25}$. Buck converter 62 is operated by integrated circuit 56 that dynamically adjusts the voltage of the electrical power that is wirelessly transmitted by the inverter sub-circuit 24.

In a preferred embodiment, FETs $Q_3$ and $Q_4$ are composed of GaN (gallium nitride) which are capable of high-frequency operation on the order of about 13.56 Mhz. However, these preferred FETs have a limited gate source voltage of about 6V which is not sufficient for optimal operation. To compensate for this limitation, the power management sub-circuit 22 further comprises a clock signal circuit that comprises AND gate 64, NAND gate 66, first and second dead time circuits 68, 70, and FET driver 72. The clock signal circuit electrically connects alternating FETS $Q_3$ and $Q_4$ to integrated circuit 56. Thus, the integrated circuit 56 dynamically adjusts the output voltage of the electrical power by controlling movement of FETS $Q_3$ and $Q_4$ through the clock signal circuit.

Figure 4:
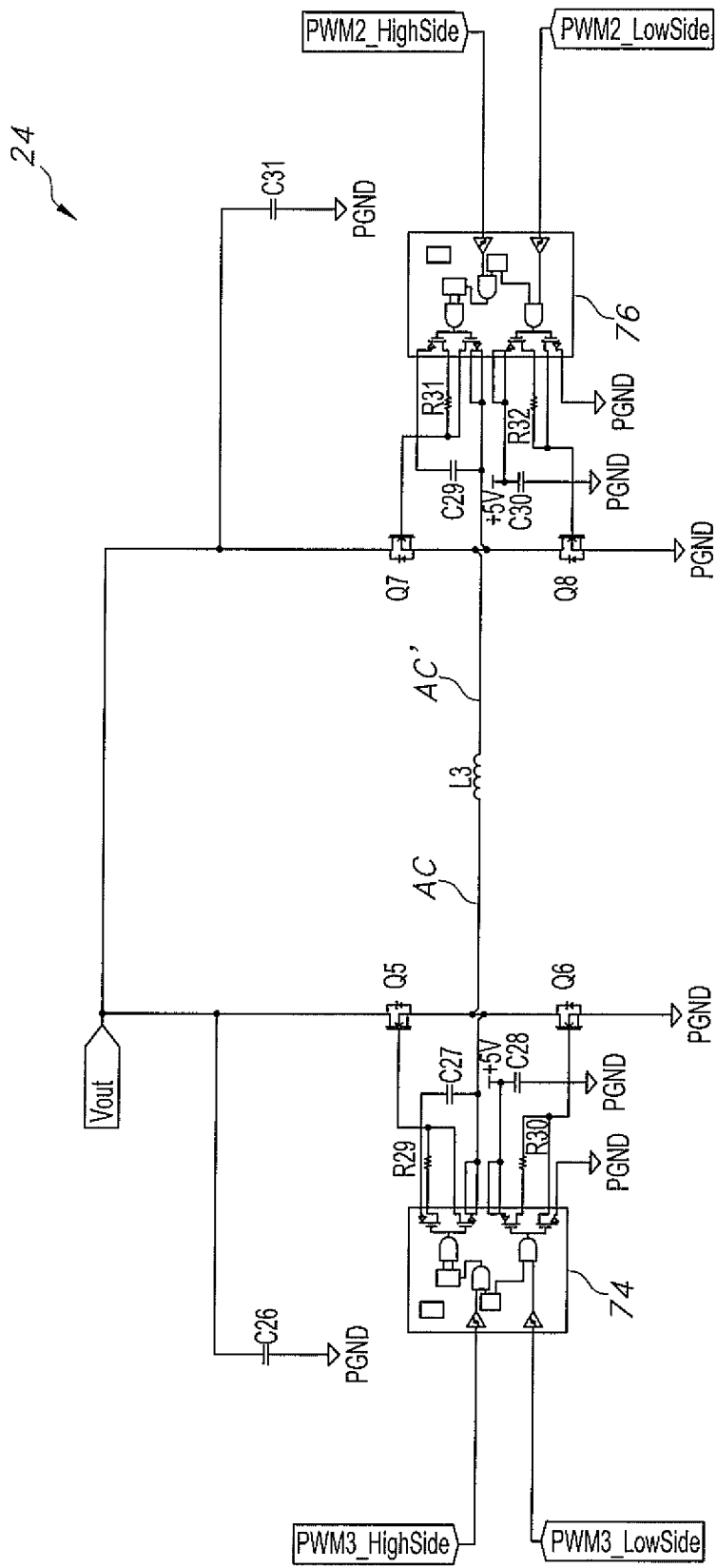
FIG. 4 is an electrical schematic diagram of an embodiment of the power inverter sub-circuit comprised within the energy transmitting circuit.

FIG. 4 shows an embodiment of the inverter sub-circuit 24 of the energy transmitting circuit 16 of the present invention. In a preferred embodiment, inverter sub-circuit 24 comprises a class "D" amplifier. As shown, the inverter sub-circuit 24 comprises field effect transistors $Q_5$-$Q_8$, and second and third field effect transistor drivers 74, 76. In a preferred embodiment, an alternating current, AC and AC', is created across transmitting coil 28 by the alternating movement of field effect transistors $Q_5$-$Q_8$. Thus, by creating an alternating current electrical power across inductor coil 28 causes the transmitting coil 28 to emanate an alternating magnetic field.

In a preferred embodiment, the alternating current of the electrical power is generated by the coordinated movement of the field effect transistors $Q_5$-$Q_8$. In the embodiment shown, field effect transistors $Q_5$ and $Q_8$ form a first FET set and field effect transistors $Q_7$ and $Q_6$ form a second FET set. In a preferred embodiment, movement of the FETs within each first and second set are preferably synchronized together meaning that $Q_5$ and $Q_8$ of the first set are simultaneously in an "open" or "closed" position and $Q_6$ and $Q_7$ of the second set are simultaneously in an "open" or "closed" position. Furthermore, when the field effect transistors of the first set are in an "open" position, the field effect transistors of the second set are in a "closed" position and vice versa. Thus, by alternating the open and closed positions of the FETs within their respective sets, an electrical current alternates back and forth across inductor $L_3$, thereby creating an electrical power having alternating current across transmitting coil 28. Movement of the respective field effect transistors is preferably controlled by first and second FET drivers 74 and 76.

Figure 5:
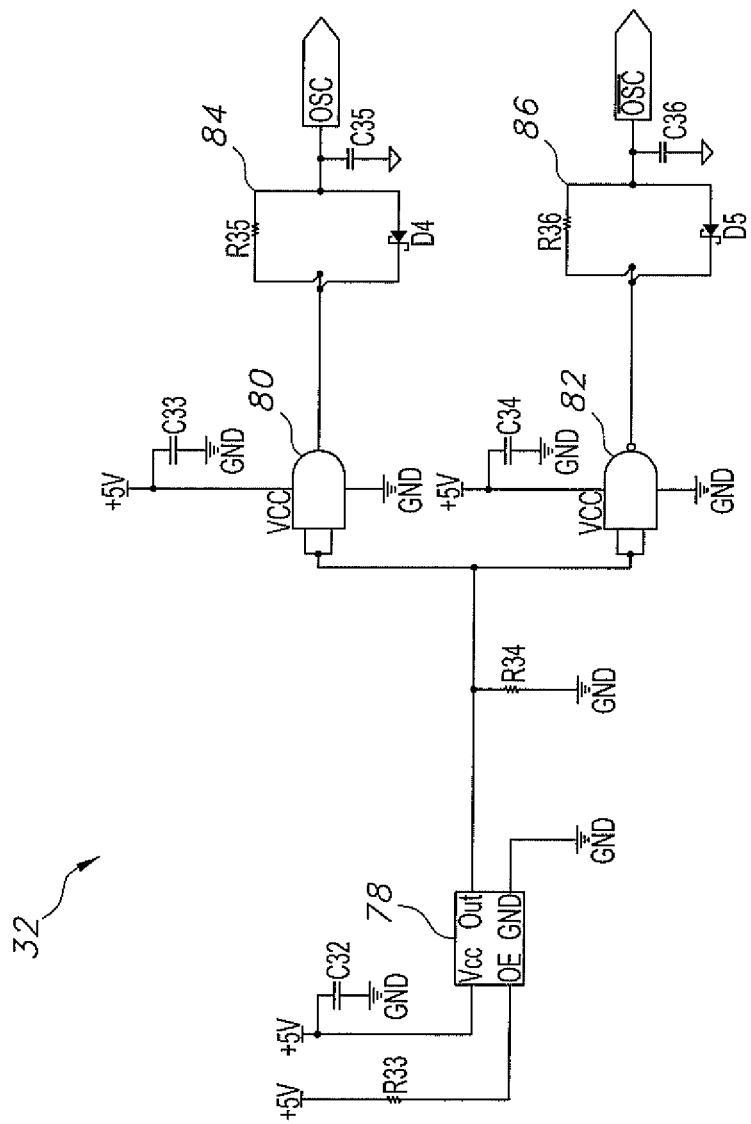
FIG. 5 is an electrical schematic diagram of an embodiment of the pulse width modulator sub-circuit comprised within the energy transmitting circuit.

In an embodiment, the frequency of this coordinated alternating open and close movement of respective FETs is controlled by the pulse modulator sub-circuit 32 (FIG. 5). In a preferred embodiment, the frequency of the alternating first and second sets of FETs is determined by the frequency of the resonating clock source created by the pulse width modulator sub-circuit 32. The frequency of the resonant oscillating magnetic field that is emitted by the transmitting coil 28 is thus controlled by the clock frequency signal created by the pulse width modulator sub-circuit 32.

FIG. 5 illustrates an embodiment of the pulse width modulator sub-circuit 32 of the energy transmitting circuit 14. In a preferred embodiment, the pulse width modulator sub-circuit 32 generates a reference clock signal that is utilized by the inverter sub-circuit 24 to establish the alternating frequency of the electrical power to be wirelessly transmitted. In a preferred embodiment, the frequency of the electrical power to be wirelessly transmitted, established by the pulse width modulator sub-circuit 32, is about equal to the oscillating frequency of the transmitting coil 28. As illustrated in FIG. 5, the pulse width modulator sub-circuit 32 comprises a clock resonator source 78, such as an oscillating crystal or ceramic material, having a clock frequency output. In addition, the PWM sub-circuit 32 comprises an and-gate 80 and a nand-gate 82 that are electrically connected in parallel with the clock resonator source 78. In addition, each of these logic gates 80, 82 is connected to respective dead-time circuits 84, 86. As illustrated, dead time circuit 84 comprises resistor $R_{35}$, diode $D_4$, and capacitor $C_{35}$ and dead-time circuit 86 comprises resistor $R_{36}$, diode $D_5$, and capacitor $C_{36}$. Each of these dead-time circuits 84, 86 provides a switching time delay between oscillations of the FETS $Q_5$-$Q_8$ that comprise the inverter circuit 24. In other words, these dead-time circuits 84, 86 of the respective FETS $Q_5$-$Q_8$ that comprise the inverter circuit 24 creates a time delay such that the respective FETS do not electrically short or create shoot-through.

Figure 6:
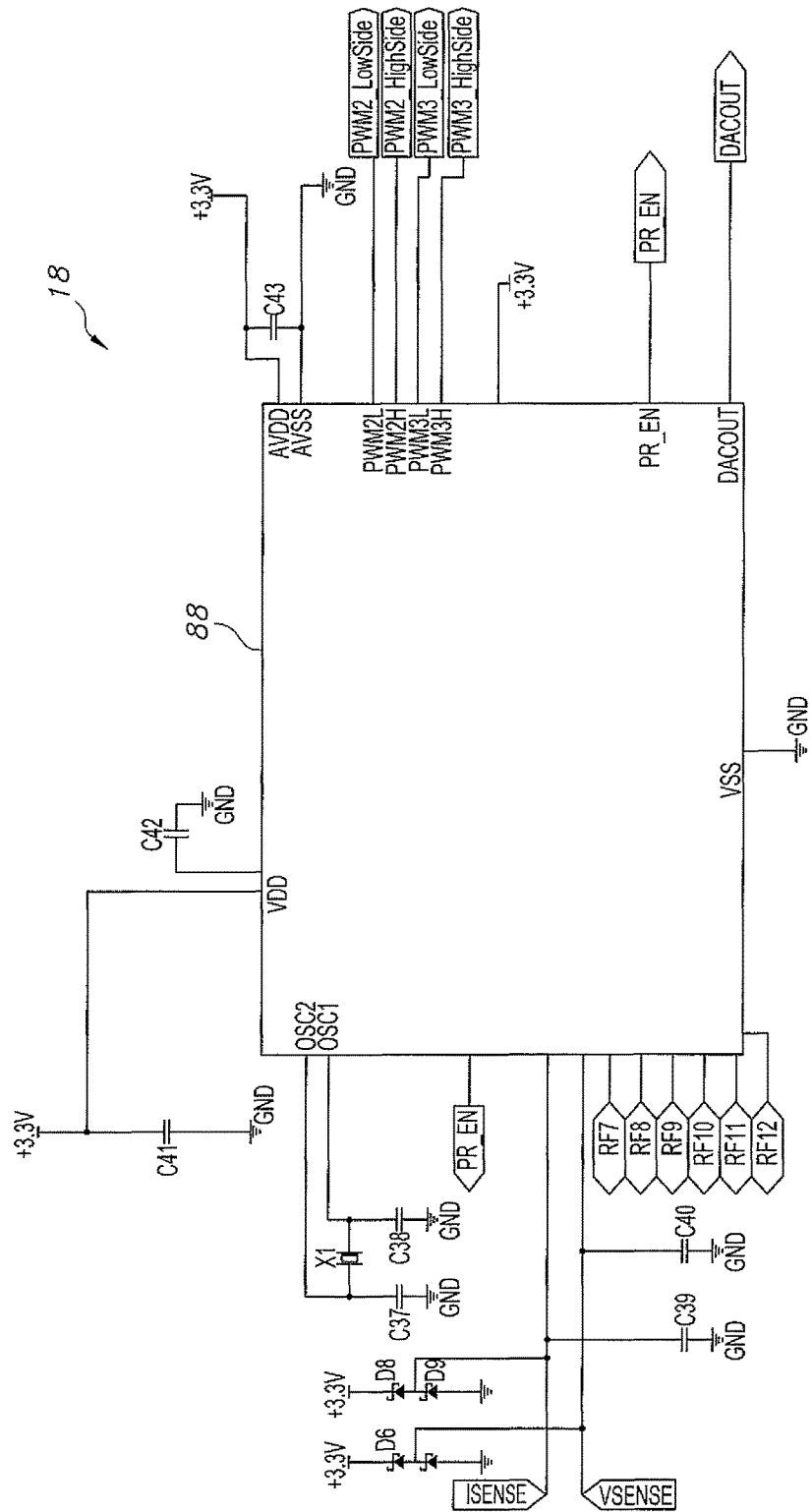
FIG. 6 is an electrical schematic diagram of an embodiment of the energy transmitting circuit master control sub-circuit.
Figure 7:
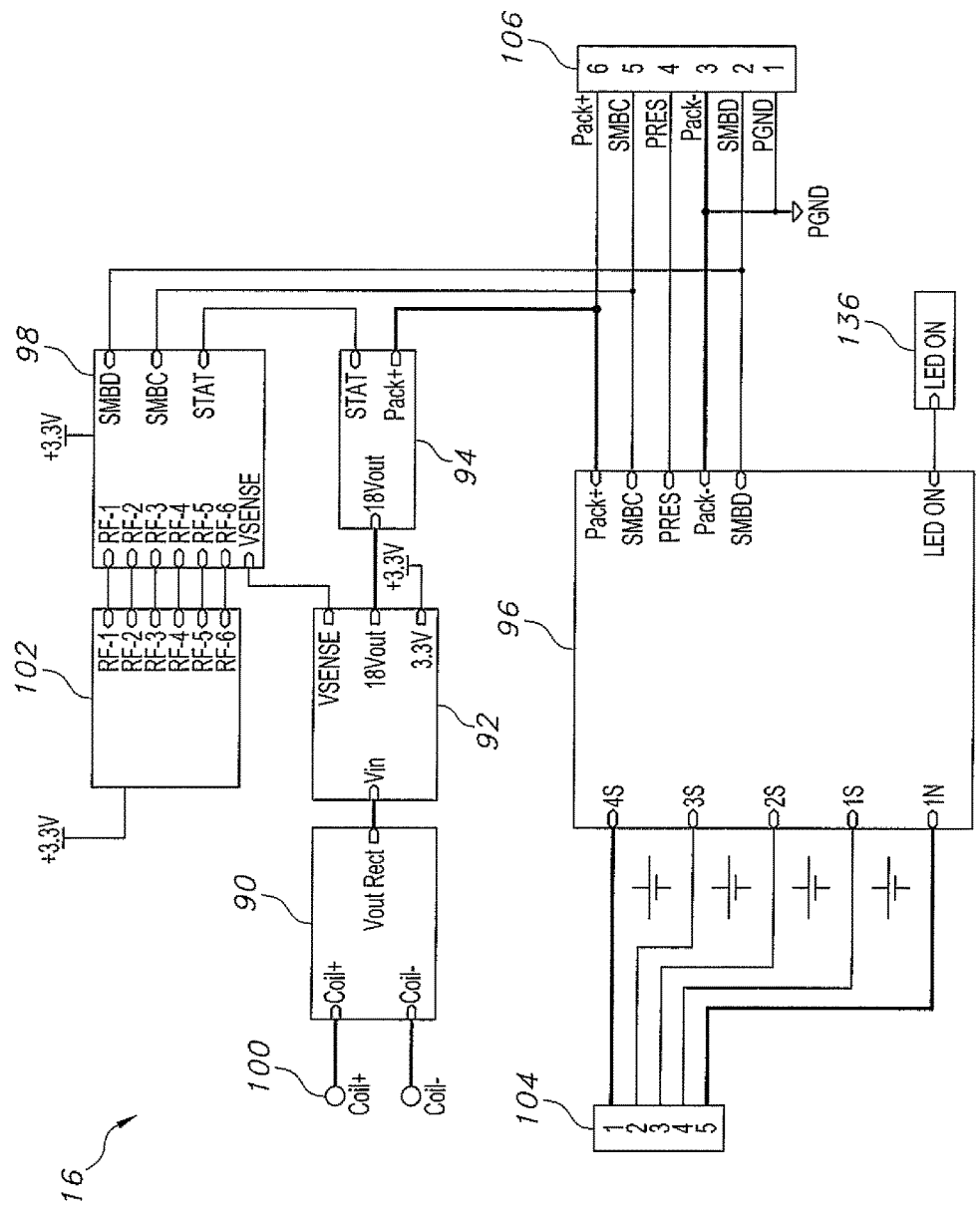
FIG. 7 is an electrical schematic diagram of an embodiment of the energy capture circuit of the present invention.

FIG. 6 shows an electrical circuit of an embodiment of the master control sub-circuit 18 that comprises a third integrated circuit 88. In an embodiment, the master control sub-circuit 18 controls operation of the energy transmitting circuit 14 based on analysis of various inputs from the power supply sub-circuit 20, power management sub-circuit 22 and pulse width sub-circuit 32, if configured. As shown, the voltage and current sense signals Vsense and Isense from the power supply sub-circuit 20 are received by the third integrated circuit 88. Inputs from the pulse width modulator sub-circuit 32 PWM2L and PWM2H are received by the third integrated circuit 88 and outputs to the pulse width modulator sub-circuit PWM3L and PWM3H are sent from the third integrated circuit 88 to the pulse width modulator sub-circuit 32. In lieu of the pulse width modulator sub-circuit 32, the master control sub-circuit 18 may comprise an oscillator $X_1$ to generate a clock signal that is received by the third integrated circuit 88. In an embodiment, the third integrated circuit 88 of the master control sub-circuit 18 is configured to communicate with the power management sub-circuit 22 through the digital to analog converter (DA-COUT) and enable signal PR_EN. Electrical power is supplied to the master control sub-circuit 18 by the power supply sub-circuit 20 by AVDD, VDD, VSS, and AVSS.

Figure 15:
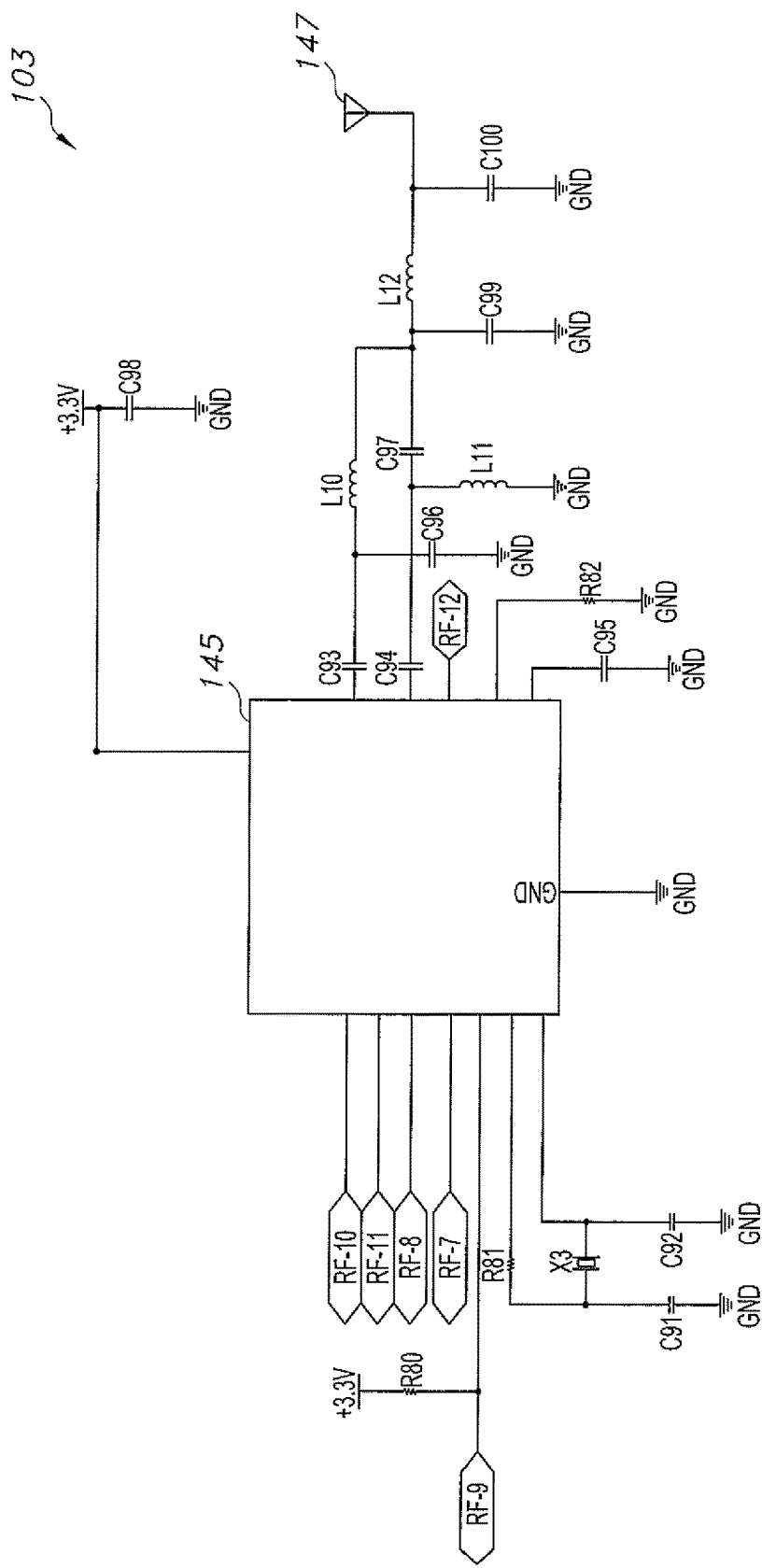
FIG. 15 is an electrical schematic diagram of an embodiment of the transceiver sub-circuit comprised within the energy transmitting circuit of FIGS. 1 and 1A.

Referring to FIG. 15, an embodiment of a transceiver sub-circuit 103 that is electrically connected to the master control unit sub-circuit 18 of the energy transmitting circuit 14 is illustrated. In an embodiment, the transceiver sub-circuit 103 may be used to send and receive data signals between the energy transmitting circuit 14 and the energy capture circuit 16. As shown, the transceiver sub-circuit 103 comprises an integrated circuit 145 that is electrically connected to an RF antenna 147. In addition, the transceiver sub-circuit 103 comprises capacitors $C_{91}$-$C_{100}$, resistors $R_{80}$-$R_{82}$, and inductors $L_{10}$-$L_{12}$. Crystal $X_3$ provides a clock signal to the transceiver sub-circuit 103. In an embodiment, an RF data signal transmitted by the energy transmitting circuit 16 that is received by the RF antenna 147 is sent to the integrated circuit 145 which sends the signal through ports RF-7, RF-8, and RF-9 to the master control sub-circuit 88. Data signals generated by the master control sub-circuit 88 are sent through ports RF-10, RF-11, and RF-12 to the integrated circuit 145 of the transceiver 103 which is then wirelessly transmitted by the RF antenna 147.

Now turning to FIGS. 7 through 14, these schematics illustrate electrical circuit diagrams of an embodiment of the circuits and components of the energy capture circuit 16 of the present invention. FIG. 7 is an electrical schematic diagram of an embodiment of the energy capture circuit 16 of the present invention. FIGS. 8 through 14 illustrate electrical schematic diagrams of the sub-circuits that comprise the energy capture circuit 16 of the energy capture system 10 of the present invention.

The energy capture circuit 16 is designed to receive and modify electrical power that is wirelessly transmitted from the energy transmitting circuit 14 using near-field resonant magnetic coupling. More specifically, the electrical energy capture circuit 16 of the present invention is designed to harness and condition wirelessly transmitted electrical power having an alternating current (AC) and conditioning the electrical power in direct current for use in charging an electrochemical cell or battery pack or alternatively, directly powering a device (not shown) powered by electrical power.

As illustrated in FIG. 7, the energy capture circuit 16 comprises an electrical energy conditioning sub-circuit 90, a voltage regulator sub-circuit 92, a charger sub-circuit 94, a protection and gauging sub-circuit 96, and an energy capture circuit master control unit 98. A receiving coil 100 configured to resonate at about the same frequency as the transmitting coil 28 is electrically connected to the energy conditioning sub-circuit 90. In addition, the energy capture circuit 16 may comprise a transceiver 102 configured to communicate with the energy transmitting circuit 14 through RF telemetry. As shown in FIG. 7, the energy capture circuit 16 comprises battery pack junction 104 designed to connect the circuit 16 to a battery pack 12. The energy capture circuit 16 may also comprise a device junction 106.

In an embodiment, the energy capture circuit 16 is designed to harness and convert an electrical power having an alternating current (AC) that is transmitted wirelessly from the transmitting coil 28 into electrical power having a direct current. Alternatively, the energy capture circuit 16 could be used to capture and condition wirelessly received electrical energy to directly power a device (not shown). More specifically, the electrical energy capture circuit 16 is designed to receive and modify an alternating current electrical power that is transmitted wirelessly via near field resonant inductive coupling such that the modified electrical power can be used to recharge an energy storage device 12, such as secondary electrochemical cell or battery pack of at least two electrically connected secondary electrochemical cells or, alternatively, directly power a device.

Figure 8:
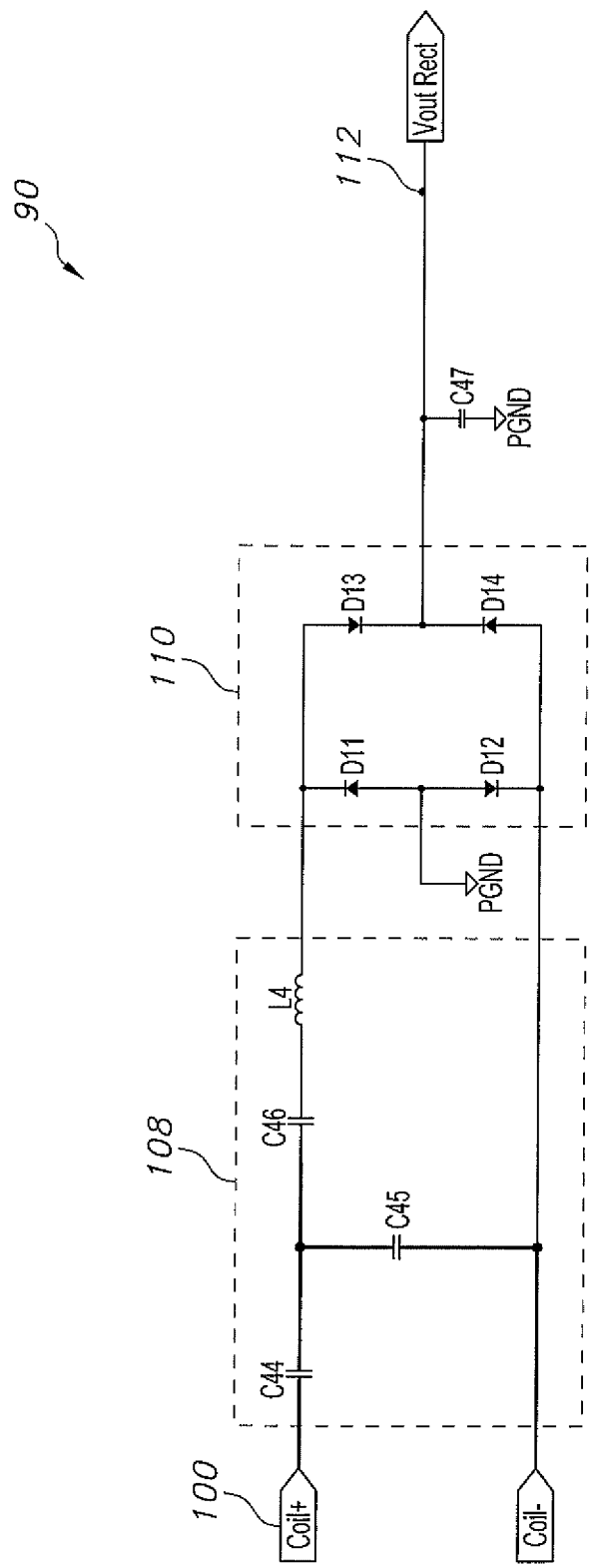
FIG. 8 is an electrical schematic diagram of an embodiment of the conditioning circuit comprised within the energy capture circuit.

FIG. 8 illustrates an electrical schematic diagram of an embodiment of the electrical energy conditioning sub-circuit 90. The conditioning sub-circuit 90 is designed to capture and modify alternating current electrical power that is transmitted wirelessly via near field resonant inductive coupling and convert that alternating current into direct current (DC) electrical power.

As shown, the electrical energy conditioning sub-circuit 90 comprises a matching electrical impedance circuit 108 and a rectification circuit 110. The conditioning sub-circuit 90 serves to convert wireless electrical power received by the receiving coil 100 of the energy receiving circuit 16 from an alternating current electrical power to a direct current electrical power for use in charging an energy storage device 12 or directly powering an electronic device (not shown). The electrical impedance matching or network circuit 108 is electrically connected to the rectification circuit 110. The impedance matching circuit 108 is designed to adjust and match the electrical impedance of the receiving coil 100 to a characteristic impedance of the power generator or the load at a driving frequency of the transmitting coil 28. In general, the efficiency and amount of electrical power delivered between the transmitting coil 28 and the receiving coil 100 is largely dependent on the impedances of the respective inductive elements of the transmitting coil and receiving coil relative to the electrical properties of the device to which the receiving coil is connected thereto. Therefore, the impedance-matching network circuit 108 is designed to maximize the efficiency of the electrical power delivered between the transmitting coil 28 and the receiving coil 100.

As illustrated, the impedance matching network circuit 108 comprises a series of capacitors $C_{44}$-$C_{46}$ that are arranged to actively adjust and match the electrical impedance of the receiving coil 100 to the electrical impedance of the transmitting coil 28 and connected electrical power source. It is noted that some capacitors may be added or removed to achieve optimal impedance match.

The captured wireless electrical power passes from the matching network circuit 108 to the rectification circuit 110. In a preferred embodiment, the rectification circuit 110 modifies the electrical current of the received electrical power from an alternating current to a direct current. In a preferred embodiment illustrated in the electrical schematic of FIG. 8, the rectification circuit 110 comprises a series of diodes, $D_{11}$-$D_{14}$. After the wireless electrical power is modified by the matching network circuit 108 and the rectification circuit 110, the electrical power exits the conditioning sub-circuit 90 at node 112.

The rectified electrical power is then directed to the voltage regulator sub-circuit 92 and the charging sub-circuit 94 where the voltage of the electrical power is modified. The voltage regulator sub-circuit 92 modifies the amplitude of the voltage of the received electrical power so that it can be used to charge the energy storage device 12 or, directly power a device (not shown). In addition, the voltage regulator sub-circuit 92 modifies the amplitude of the voltage of the incoming electrical power so that it can be used to power the components and sub-circuits of the energy capture circuit 16.

In an embodiment, the voltage regulator sub-circuit 92 comprises a voltage regulator that modifies the amplitude of the voltage of the received electrical power. The voltage regulator is selected based on the cell or battery pack being charged or the device being powered. In an embodiment, the voltage regulator sub-circuit 92 may comprise a step-down voltage regulator that reduces the amplitude of the voltage of the captured electrical power. Alternatively, the voltage regulator sub-circuit 92 may comprise a step-up voltage regulator that increases the amplitude of the voltage of the captured electrical power.

Figure 9:
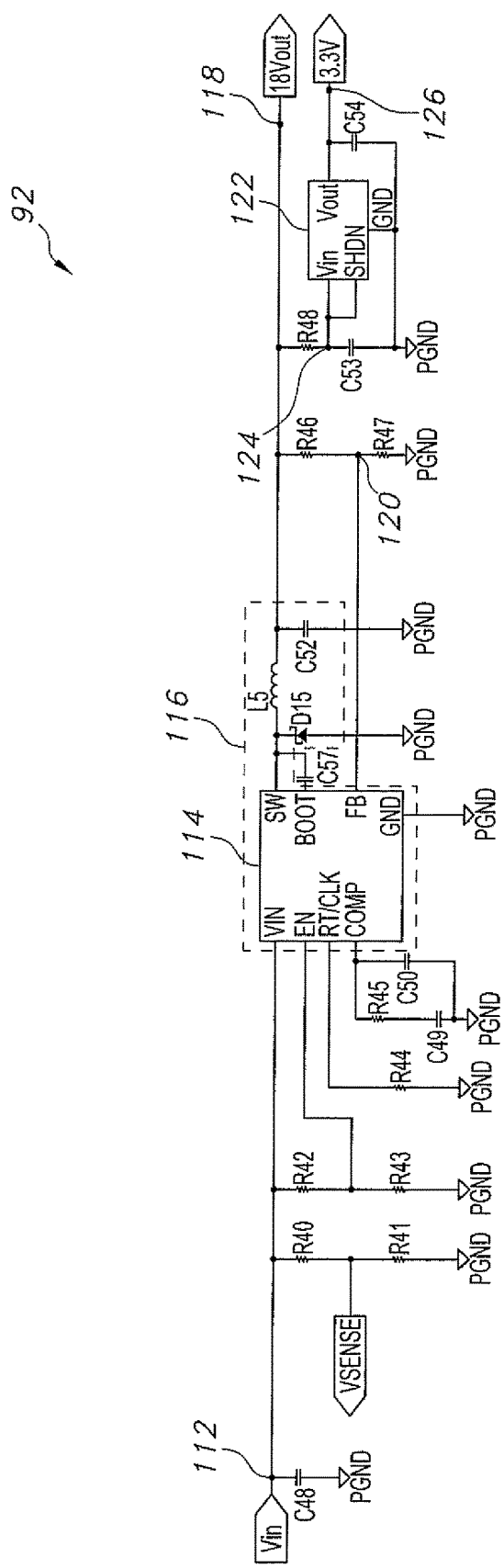
FIG. 9 is an electrical schematic diagram of an embodiment of the voltage regulator sub-circuit comprised within the energy capture circuit.

FIG. 9 illustrates an embodiment of the electrical schematic diagram of the voltage regulator sub-circuit 92. As shown, the circuit 92 comprises a fourth integrated circuit 114 that is capable of modifying the amplitude of the voltage of the incoming electrical power. In a preferred embodiment, the fourth integrated circuit 114 comprises a third voltage regulator 116, preferably an asynchronous buck voltage converter. The asynchronous buck voltage converter 116 comprises one field effect transistor (FET) that resides within the fourth integrated circuit, diode $D_{15}$, inductor $L_5$ and capacitor $C_{52}$. In an embodiment, these FETs may be electrically connected and external to the integrated circuit 114. In addition, a pulse width modulator (PWM) is electrically incorporated within the fourth integrated circuit 114. The PWM preferably controls operation of the buck converter 116 and the resulting amplitude of the voltage of the electrical power that exits the voltage regulator circuit 92 at node 118. The asynchronous buck converter 116 is preferred because it is capable of efficiently modifying the amplitude of a voltage without generating a significant amount of heat. In an embodiment, the regulator sub-circuit 92 of the energy capture circuit 16 of the present invention is capable of reducing the amplitude of the voltage of a received input electrical power from about 10 to 100 volts to about 5V to 30V without generating a significant amount of heat. Use of the buck converter 116 is ideal since the wirelessly configured energy storage devices 12 may receive wireless electrical power having voltages greater than 20V or 30V. Heat generation resulting from reducing the amplitude of voltage of such magnitude is not desired as such heat could adversely affect an energy storage device 12, particularly a lithium ion electrochemical cell and battery packs containing at least two such cells electrically connected together. In addition, the regulator sub-circuit 92 comprising the buck converter 116 is designed to accommodate a larger amount of electrical energy on the order of about 50-100 W. Since the magnitude of the received electrical power is a function of the orientation of the receiving coil 100 with the transmitting coil 28, the energy capture circuit 16 could receive electrical energies having increased power on the order of 50-100 W, or more. Thus, the regulator sub-circuit 92 having the buck converter 116 allows variation in the magnitude of the received wireless electrical power due to the orientation of the energy capture circuit 16 with respect to the transmitting coil 28.

In an embodiment, the PWM works in conjunction with the buck converter 116 to modify the amplitude of the output voltage of the voltage regulator circuit 92 by comparing the output voltage at node 118 to a reference voltage measured at node 120. The reference voltage is established at node 120 by resistors $R_{46}$ and $R_{47}$ that are connected in electrical series. The reference voltage is measured at the voltage feedback pin (FB) by the PWM which thus controls operation of the buck regulator 116 to appropriately reduce the amplitude of the voltage output of the electrical power. In a preferred embodiment, the fourth integrated circuit 114 is configured to always be in an enabled or "on" configuration. This allows the incoming electrical power from node 112 of the conditioning sub-circuit 90 to always be received by the fourth integrated circuit 114 of the voltage regulator sub-circuit 92.

In addition to the asynchronous buck converter 116, the voltage regulator sub-circuit 92 comprises a fourth voltage regulator 122 that modifies the amplitude of the voltage of a separate portion of the electrical power received at node 124. This second portion of electrical power is designed to provide electrical power to the components and sub-circuits that comprise the energy capture circuit 16. In an embodiment, the fourth voltage regulator 122 comprises a linear voltage regulator configured to adjust the amplitude of the voltage of the second power to between 1V to 5V. Electrical power exits the second voltage regulator at node 126.

Figure 10:
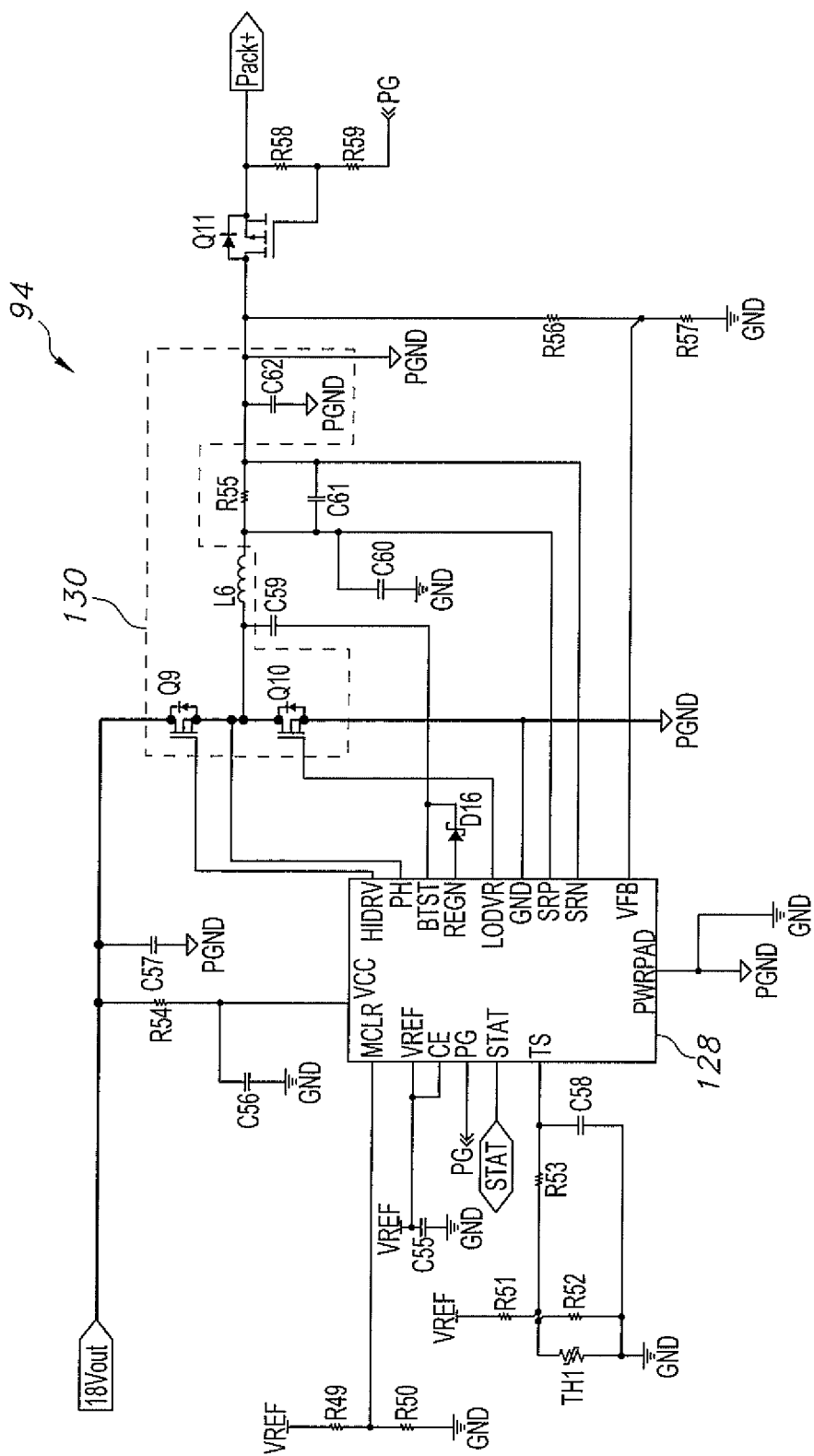
FIG. 10 is an electrical schematic diagram of an embodiment of the charger sub-circuit comprised within the energy capture circuit.

FIG. 10 illustrates an embodiment of the charging sub-circuit 94 that resides within the energy capture circuit 16 of the wireless energy system of the present invention. As shown, the charging sub-circuit 94 comprises a fifth integrated circuit 128 that acts to control a voltage regulator to further modify the amplitude of the voltage of the received electrical power after the voltage of the electrical power is initially reduced by the voltage regulator sub-circuit 92. In an embodiment, the charging sub-circuit 94 further reduces the amplitude of the voltage within about +/−2 V such that it can be optimally utilized to charge the energy storage device 12 or directly power a device. In a preferred embodiment, the charging circuit 94 comprises a fifth voltage regulator 130, preferably a synchronous buck voltage regulator that is electrically incorporated therewithin. The synchronous buck voltage regulator comprises field effect transistors (FET) $Q_9$ and $Q_{10}$, inductor $L_6$ and capacitor $C_{62}$ and is capable of further reducing the amplitude of the voltage of the incoming power. The ability to make relatively small adjustments to the amplitude of the voltage of the charging electrical power is particularly ideal for re-charging lithium secondary cells having a relatively small size. The voltage of such secondary cells may vary only by about 2V or less during use thus, it is ideal to use a synchronous buck voltage regulator that is capable of making small incremental adjustments to the magnitude of the voltage. In an embodiment, the asynchronous buck regulator 116 of the pre-regulator sub-circuit 92 acts as a pre-voltage regulator that efficiently modifies the voltage of the incoming electrical power such that the voltage can be more easily managed by the synchronous buck voltage regulator 130 without generating a significant amount of undesirable heat. In an embodiment, the charging sub-circuit 94 comprises field effect transistor (FET) $Q_{11}$. FET $Q_{11}$ dynamically connects and disconnects the energy storage device 12, i.e., a battery pack, from the charging sub-circuit 96. The FET is designed to open and thus disconnect the energy storage device 12 from the energy capture circuit 16 when the energy storage device 12 is not being charged. Disconnecting the energy storage device 12 from the charging sub-circuit 94 prevents energy depletion when not being charged.

Figure 11:
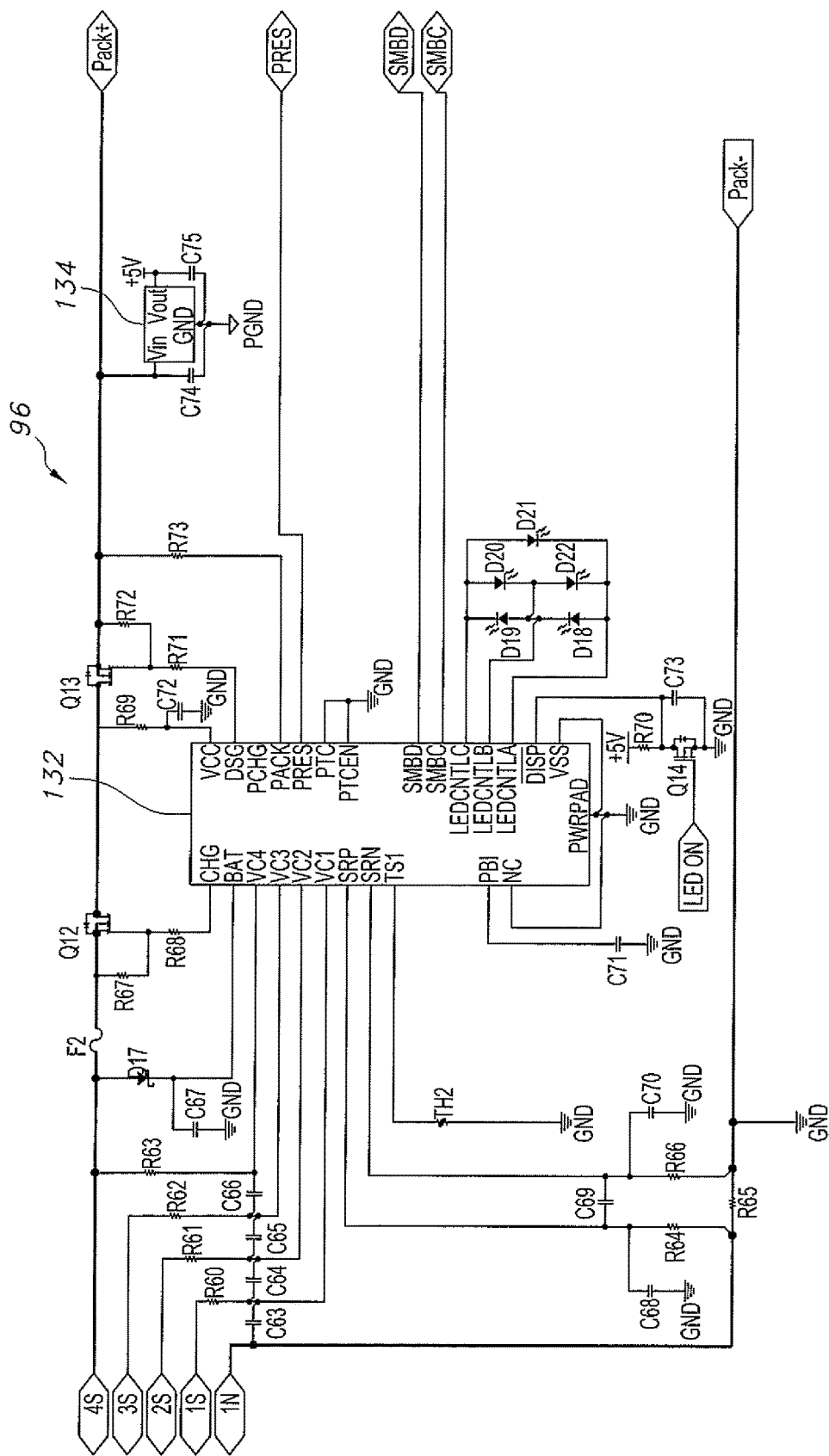
FIG. 11 is an electrical schematic diagram of an embodiment of the protection and gauging sub-circuit comprised within the energy capture circuit.

FIG. 11 illustrates an embodiment of the protection and gauging sub-circuit 96. In an embodiment, the protection sub-circuit 96 acts as a safety measure that protects the energy storage device 12 from potential damage as a result of being over-charged, over-discharged, or exceeding a set temperature during use and/or recharge. In an embodiment, the protection sub-circuit 96 protects the energy storage device 12 from becoming over-charged to a voltage or current state that is too high. In addition, the protection sub-circuit 96 protects the energy storage device 12 from becoming over-discharged to a voltage or current state that is too low. Furthermore, the protection sub-circuit 96 protects the energy storage device 12 from exceeding a set temperature during re-charge.

Figure 16:
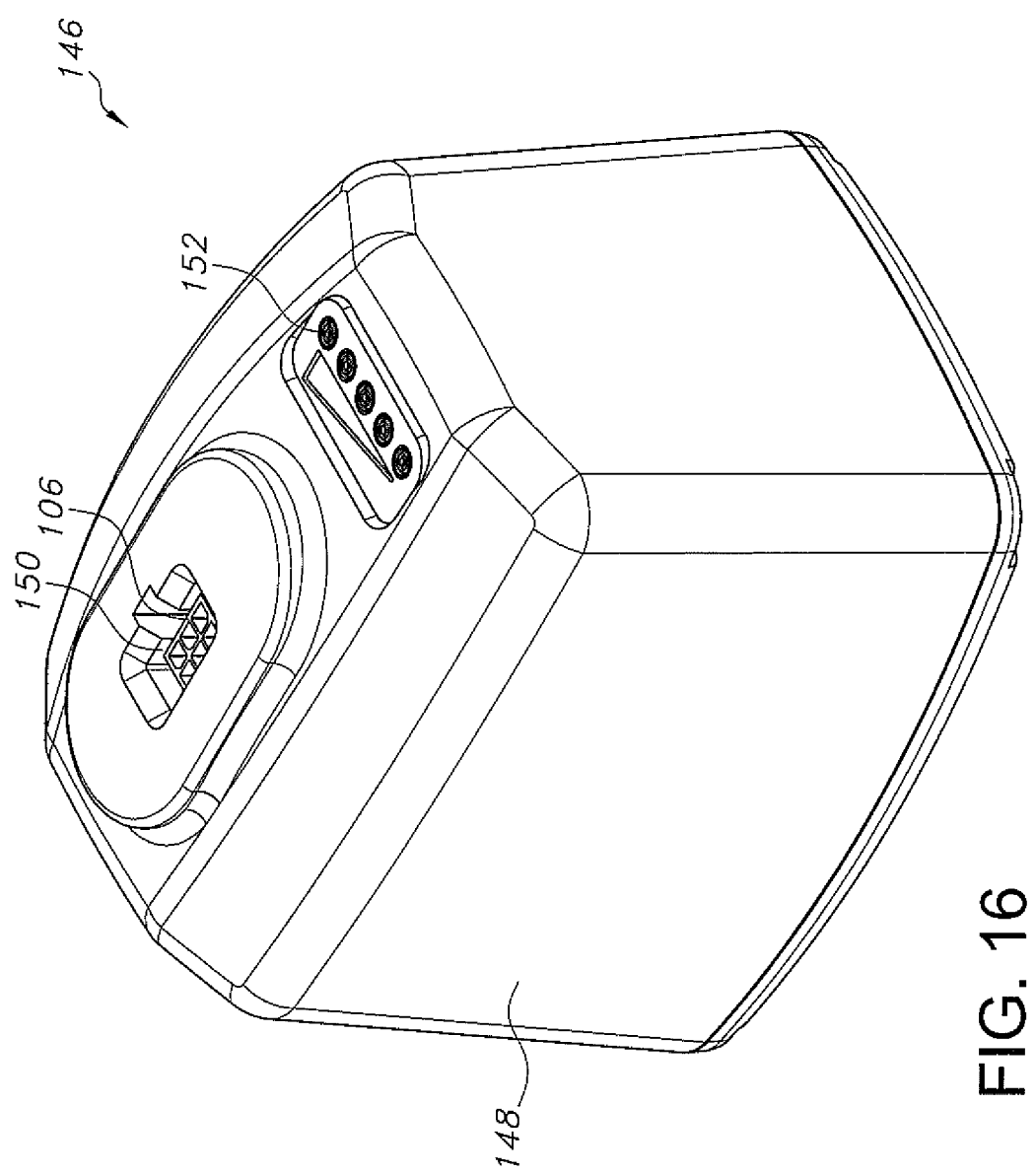
FIG. 16 illustrates an embodiment of a battery pack that is configured with the energy capture circuit of the present invention.

In an embodiment, the protection and gauging sub-circuit 96 comprises a sixth integrated circuit 132, field effect transistors $Q_{12}$ and $Q_{13}$, fuse $f_2$, capacitors $C_{68}$-$C_{70}$ and light emitting diodes $D_{18}$-$D_{22}$. In a preferred embodiment, $Q_{12}$ and $Q_{13}$ act as a circuit breaker that either electrically connects or disconnects the charging and discharging current from the energy capture circuit 16 to or from the energy storage device 12. In a preferred embodiment, charge pin (CHG) controls operation of $Q_{12}$ and discharge pin (DSG) controls operation of $Q_{13}$. In an embodiment, $Q_{12}$ opens and thus disconnects the energy storage device 12 during an over charge condition and Q13 opens and thus disconnects the energy storage device 12 during an over discharge condition. In addition, the integrated circuit 132 preferably comprises a voltage sensor (BAT) that measures the voltage state of the energy storage device 12. For example, if the energy storage device 12 is at an under voltage state, i.e., below about 2.6 V, or at an over voltage state, i.e., greater than about 4.2 V, $Q_3$ and $Q_4$ are controlled to electrically disconnect the energy capture circuit 14 and charging current from the energy storage device 12. In an embodiment, the protection sub-circuit 96 comprises sense resistor $R_{65}$ that generates a voltage drop that is used to determine the electrical current of the electrical power that is charging the energy storage device 12. The protection and gauging sub-circuit 96 may also comprise light emitting diodes $D_{18}$-$D_{22}$ that comprise an energy device status indicator 152 (FIG. 16). These light emitting diodes $D_{18}$-$D_{22}$ serve to indicate the amount of electrical charge stored within the energy storage device 12. For example, a display of five LEDS indicates a fully charged energy storage device 12 and a display of one LED indicates that about 20 percent of electrical charge remains. The protection circuit 96 also comprises a sixth voltage regulator 134 utilized to modify the voltage of the electrical power that powers the capacitive touch sub-circuit 136.

Figure 12:
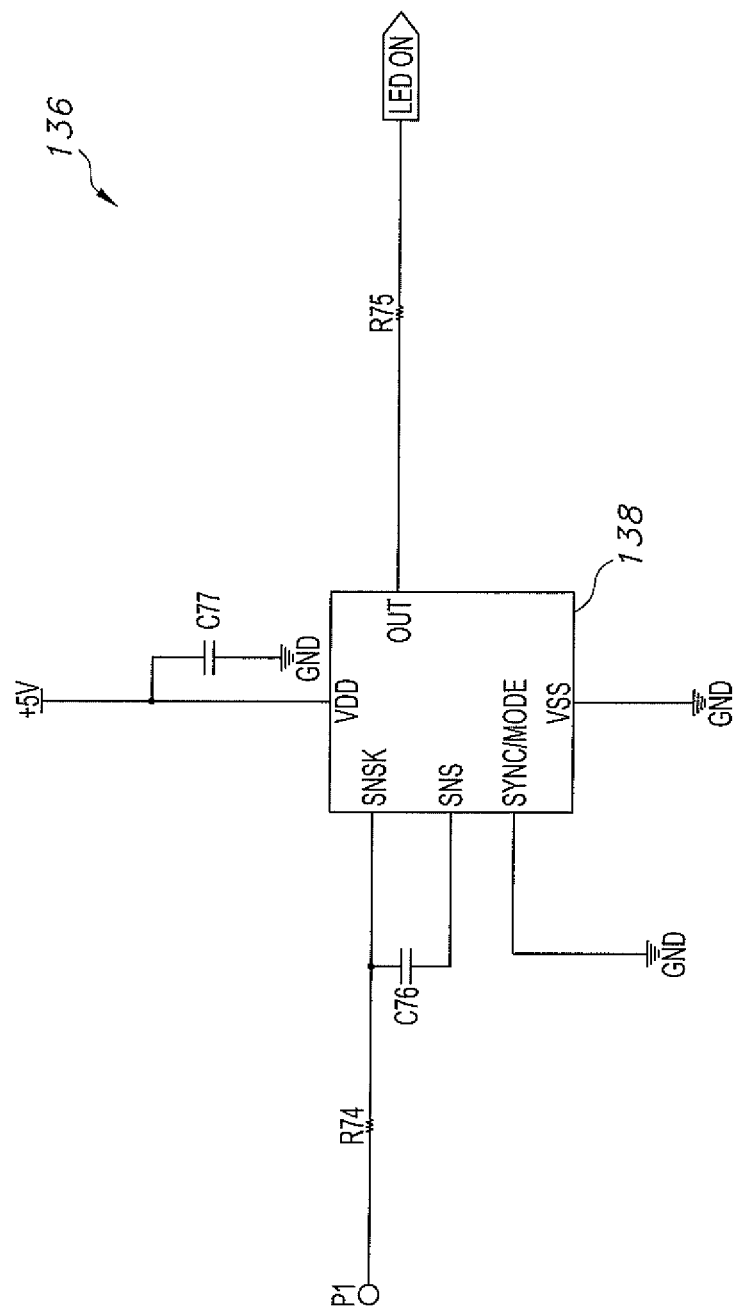
FIG. 12 is an electrical schematic diagram of an embodiment of the captive touch sub-circuit comprised within the energy capture circuit.

FIG. 12 illustrates an embodiment of an optional capacitive touch circuit 136 that is electrically connected to the protection and gauging sub-circuit 96. The capacitive touch circuit 136 activates a user interface that displays the light emitting diodes, thus indicating the status of the energy storage device 12. In an embodiment, the LED status indicator 152 is activated when a user physically touches an input pad Pi. As shown in FIG. 12, the capacitive touch sub-circuit 136 comprises a seventh integrated circuit 138, capacitors $C_{76}$, $C_{77}$, and resistors $R_{74}$, $R_{75}$. In an alternative embodiment, the capacitive touch circuit 136 may be used to activate the display of other information such as whether an error has occurred within the energy capture circuit 16 or the energy storage device 12. In a further embodiment, the capacitive touch sub-circuit 136 may be used to program the capture circuit 16.

Figure 13:
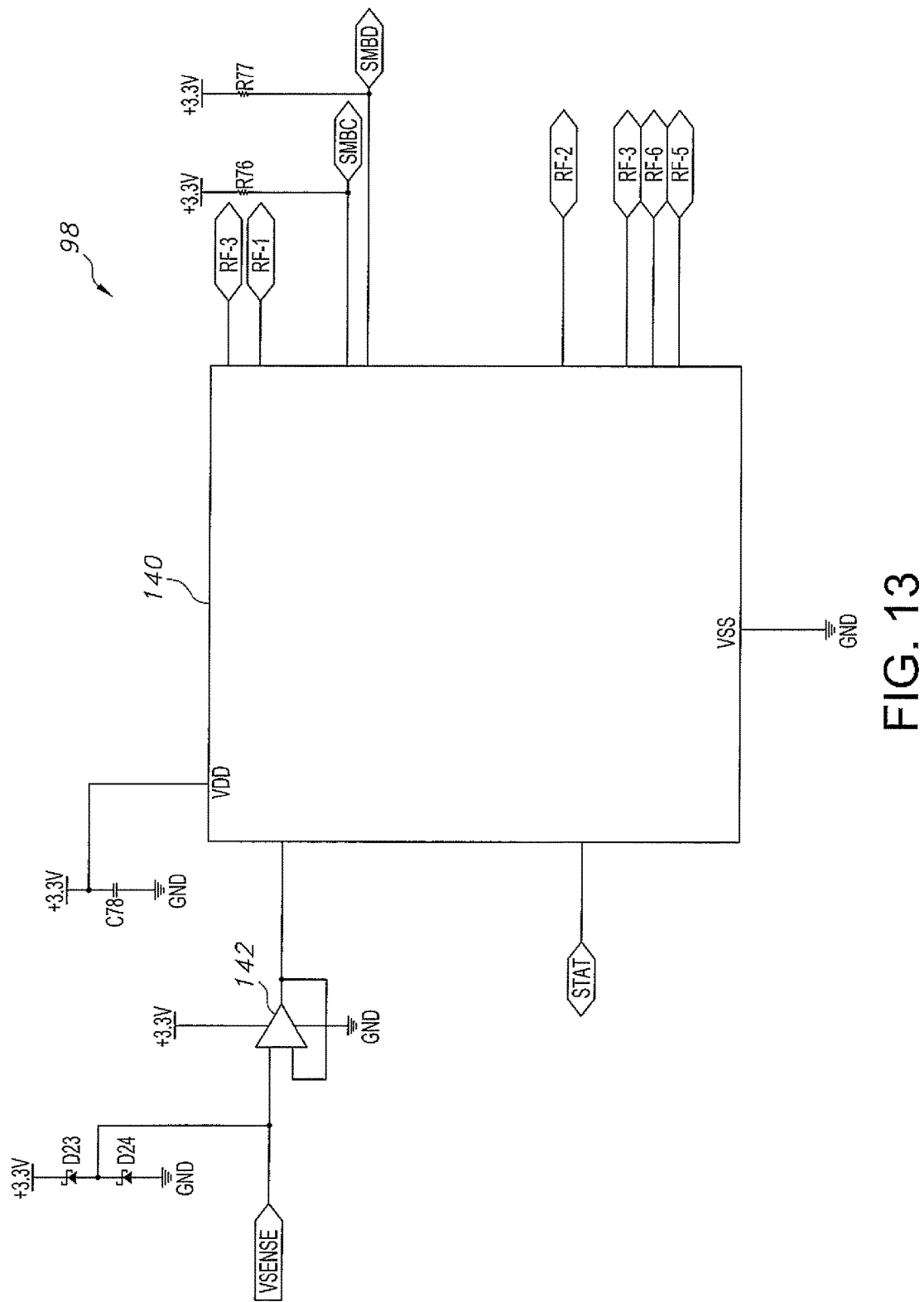
FIG. 13 is an electrical schematic diagram of an embodiment of the energy capture circuit master control sub-circuit.

FIG. 13 is an electrical circuit diagram that illustrates an embodiment of the master control sub-circuit 98. As shown, the circuit comprises an eighth integrated circuit 140 that acts as the capture circuit master control unit. In addition, the master control sub-circuit 98 comprises an amplifier 142 that is designed to buffer the voltage of the Vsense signal received from the voltage regulator sub-circuit 92 illustrated in FIG. 9. In an embodiment, the master control unit 98 utilizes the buffered voltage signal from the voltage regulator sub-circuit 92 to determine the magnitude of the voltage of the incoming electrical power. The master control unit 98 is thus configured to modify operation of the various sub-circuits that comprise the capture circuit in response to the amplitude of the voltage of the incoming electrical power. Diodes $D_{23}$, $D_{24}$ act as a voltage clamp to limit the Vsense voltage and capacitor $C_{78}$ provide electrical filters for the respective voltage inputs that power the amplifier 142 and master control unit 140, respectively.

In an embodiment, the master control unit 140 controls operation of the capture circuit 16 by analyzing inputs from the Vsense signal received from the pre regulator sub-circuit 92 and system management bus data (SMBD) and clock (SMBC) signals that provide communication to and from the charger sub-circuit 94. Based on inputs from these signals, the master control unit 140 modifies operation of the charger circuit 94 to optimally charge an electrically connected energy storage device 12. Furthermore, the master control unit sub-circuit 98 is configured to communicate with the energy transmitting circuit 14.

The master control sub-circuit 98 is configured to send and receive information about the operational readiness of the capture circuit 16 as well as the status of a connected electrical storage device. In an embodiment, the master control sub-circuit 98 is configured to communicate with the energy transmitting circuit 14 via radio frequency (RF) telemetry. Alternatively, the master control sub-circuit 98 may be configured to communicate with other wireless communication protocols which include, but are not limited to, blue tooth, ZigBee, and Z-wave. In an embodiment, the master control sub-circuit 98 is configured to receive signals from the energy transmitting circuit 14 through RF telemetry ports RF-1, RF-2, and RF-3 and send out a communication signal through RF telemetry ports RF-4, RF-5, and RF-6.

Figure 14:
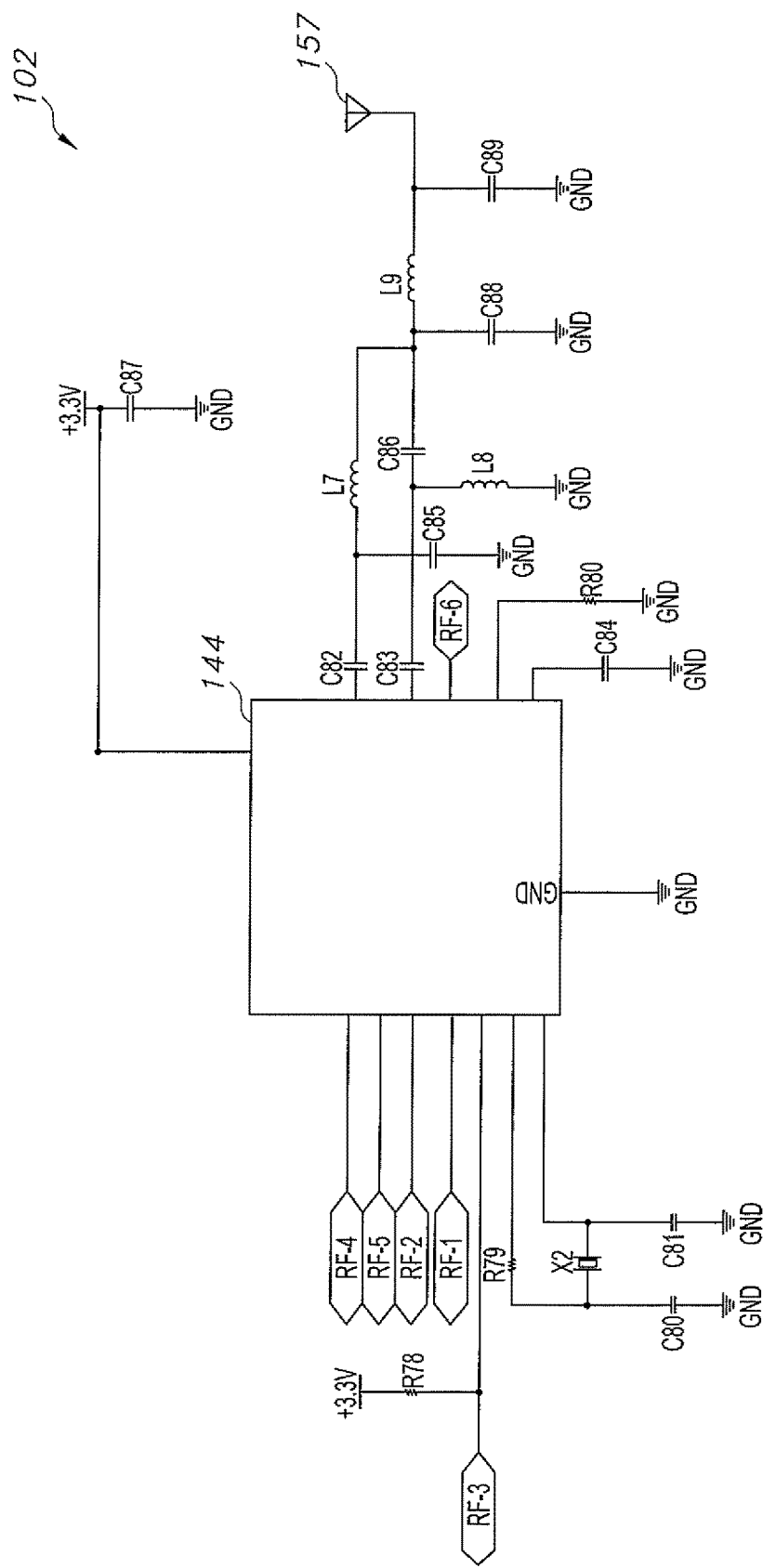
FIG. 14 is an electrical schematic diagram of an embodiment of the transceiver sub-circuit comprised within the energy capture circuit.

FIG. 14 illustrates an electrical schematic diagram of an embodiment of the transceiver sub-circuit 102 that may be used to send and receive data signals between the energy transmitting circuit 14 and the energy capture circuit 16. As shown, the transceiver sub-circuit 102 comprises a ninth integrated circuit 144 that is electrically connected to an RF antenna 157. In addition, the transceiver sub-circuit 102 comprises capacitors $C_{77}$, $C_{80}$-$C_{89}$, resistors $R_{78}$-$R_{80}$, and inductors $L_7$-$L_9$. Crystal $X_2$ provides a clock signal to the transceiver sub-circuit 102. In an embodiment, an RF data signal transmitted by the energy transmitting circuit 16 is received by the RF antenna 157 and then sent to the integrated circuit which sends the signal through ports RF-1, RF-2, and RF-3 to the master control sub-circuit 98. Data signals generated by the master control sub-circuit 98 are sent through ports RF-4, RF-5 and RF-6 to the integrated circuit 144 of the transceiver 102 which is then wirelessly transmitted by the RF antenna 157.

In an embodiment, the capture circuit 16 is electrically configured within a battery pack 146, an example of which is illustrated in FIG. 16. As shown, the battery pack 146 comprises a housing 148, a device connection port 150, and a light emitting diode (LED) status indicator 152. The device connection port 150 is the interface with which the battery pack connects to an electrical device. The light emitting diode (LED) status indicator 152 alerts a user to the status of the battery pack, such as remaining charge capacity or an internal error.

Figure 17:
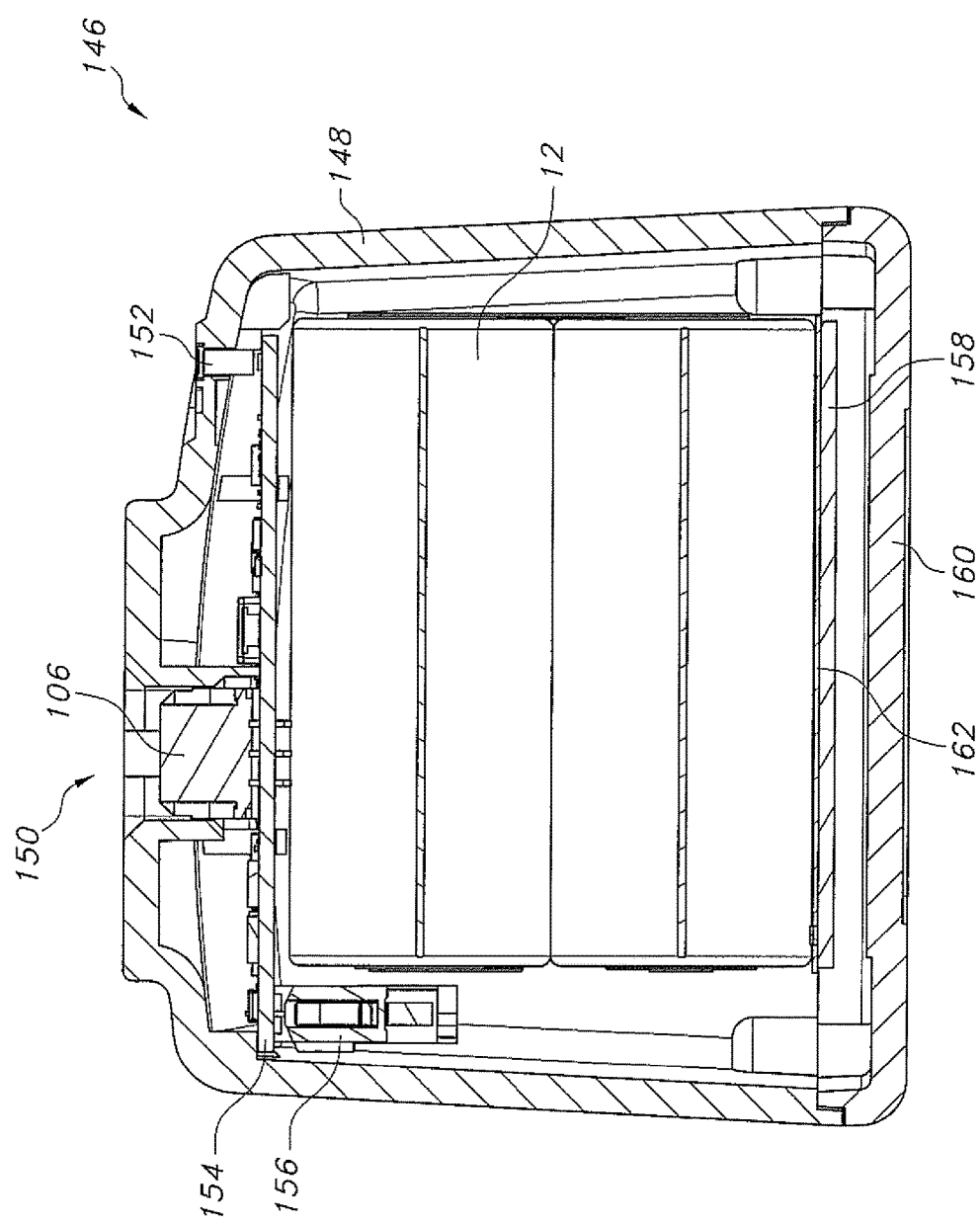
FIG. 17 is a cross-sectional view of the embodiment of the battery pack configured with the energy capture circuit of the present invention shown in FIG. 16.

FIG. 17 illustrates a cross-sectional view of the battery pack 146 shown in FIG. 16. As shown, the battery pack comprises a plurality of energy storage devices 12, i.e., secondary electrochemical cells that are electrically connected to each other and to the energy capture circuit 16 and the receiving coil 100. In the embodiment, the energy receiving circuit 16 is incorporated within an energy capture circuit board 154 that is enclosed within the housing 148 of the battery pack 146. In an embodiment, electrical junction 156 electrically connects the energy capture circuit board 154 to at least one energy storage device 12, i.e., a secondary electrochemical cell as illustrated. The receiving coil 100 is preferably positioned on an external surface of a receiving coil printed circuit board 158. As shown, the receiving coil circuit board 158 is positioned adjacent the plurality of secondary electrochemical cells opposite the energy receiving circuit board 154. A housing back plate 160 connected to the housing body encloses the cells, energy receiving circuit board 154 and receiving coil circuit board 158 within the battery pack 146.

In an embodiment, a shielding material 162 such as a ferrite material may be positioned within the housing 148 of the battery pack 146. The shielding material 162 is intended to shield the cells and energy receiving circuit board 154 from magnetic fields that may interfere with their operation. The shielding material 162 also serves to isolate the receiving coil circuit 158 from potential electrical interference from the cells and energy receiving circuit board 154. Examples of shielding ferrite materials include, but are not limited to, manganese-zinc ($Mn_aZn_{(1-a)}Fe_2O_4$) and nickel-zinc ($Ni_aZn_{(1-a)}Fe_2O_4$) ferrite materials. In an embodiment, the ferrite material has a permeability of 70 or greater. Other shielding materials may include, but are not limited to, metals such aluminum and copper.

Figure 18:
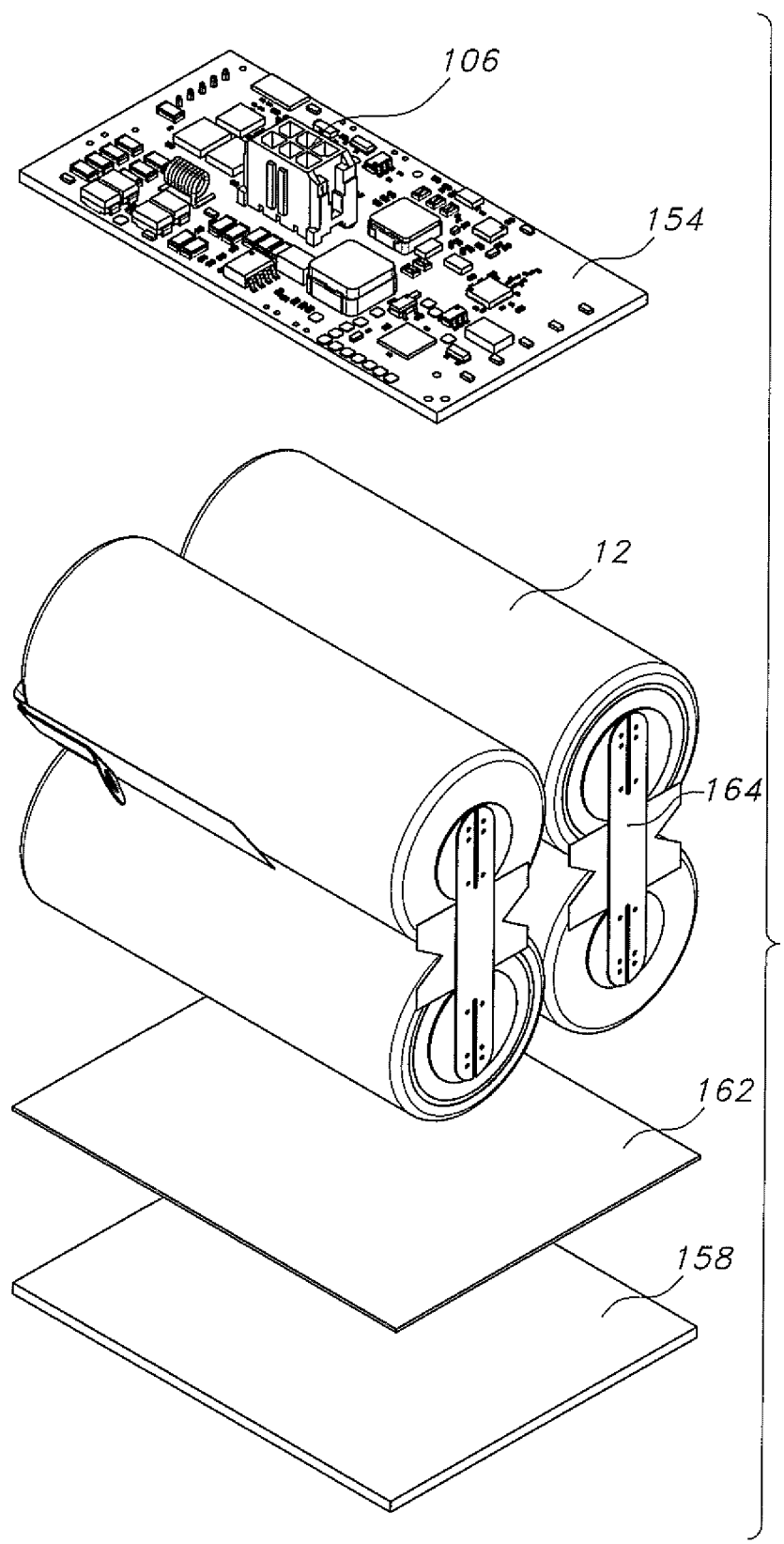
FIG. 18 is an exploded view of the components within the housing of the battery pack shown in FIGS. 16 and 17.

FIG. 18 illustrates an exploded view of an embodiment of the components that reside within the housing 148 of a battery pack 146. As shown, the plurality of secondary electrochemical cells 12 is electrically connected with a tab 164 that electrically connects the respective terminals of the cells 12. The receiving circuit board 154 and receiving coil circuit board 158 are positioned at opposite ends of the plurality of electrochemical cells 12 such that they are spaced apart by the cells. The shielding material 162 is preferably positioned between the cells and the receiving coil circuit board 158. A first wire connection 165 provides the electrical connection between the cells and the energy receiving circuit board 154 and a second wire connection (not shown) provides the electrical connection between the receiving coil circuit board 158 and the energy receiving circuit board 154.

As illustrated in FIGS. 17 and 18, at least one receiving coil 100 is positioned within the battery pack housing 148. In a preferred embodiment, the at least one receiving coil 100 is positioned alongside an interior surface of the battery pack housing 148. As illustrated in FIG. 17, the receiving coil 100 may be positioned along a sidewall of the housing in a horizontal orientation with respect to the housing back plate 160, or alternatively, the receiving coil 100 may be positioned in a vertical position with respect to the back plate 160. In an embodiment, the battery pack housing 148 is constructed of a material that allows for electrical energy, wirelessly transmitted via near field resonant magnetic induction, to pass therethrough. Example materials include, but are not limited to, polymeric materials such as polyether ether ketone (PEEK) or polyethylene terephthalate (PET).

In an embodiment, the receiving coil 100 may be configured in a plurality of non-limiting orientations and shapes. Such configurations enable the receiving coil to be positioned within the confined space within the battery pack housing 148. In addition, such configurations are designed to maximize reception of the electrical energy. For example, the receiving coil 100 may be configured in a spiral coil form, or alternatively, the receiving coil 100 may be configured such that it extends along the interior surface of the battery pack housing 148 surrounding the energy storage device 12.

Figure 19:
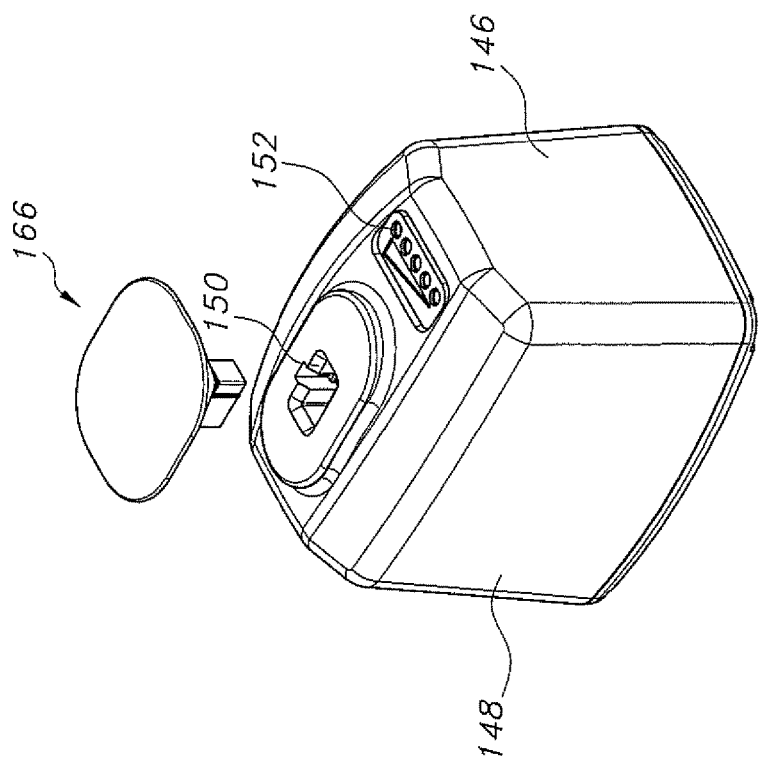

FIGS. 19 through 23 illustrate an embodiment of a wireless energy capture adapter 166 that may be used with energy storage devices 12, such as a battery pack that is not equipped with the wireless energy receiving circuit 16 of the present invention. As shown, the wireless energy capture adapter 166 is configured to electrically connect to the energy storage device 12, such as a battery pack 146 containing at least two secondary cells electrically connected together. As illustrated in FIG. 19, the wireless energy capture adapter 166 is positioned within the battery pack device connection port 150. In an embodiment, the adapter 166 is configured to receive electrical energy wirelessly transmitted via magnetic inductive coupling which is then used to charge the electrochemical cells within the housing 148 of the battery pack 146.

As illustrated in FIGS. 21, 22, and 23, the adapter 166 comprises a receiving coil 168 that is electrically connected to an energy receiving circuit board 154 that comprises the energy receiving circuit 16 of the present invention. The receiving coil 168 and energy receiving circuit board 154 are supported by an adapter housing 170 that comprises an electrical plug end 172 at a housing distal end that is received within the connection port 150 that electrically connects to the energy storage device 12, i.e., a secondary electrochemical cell contained within the housing 148 of the battery pack 146. In an embodiment, the receiving coil 168 extends from a proximal receiving coil end 168A positioned at a rim 173 of the housing 170 through a depth of the housing 170 to a distal receiving coil end 168B which is connected to the energy receiving circuit board 154 positioned at a base 177 of the housing 170. The base 177 meets the plug end 172 at the housing distal end. In addition, the plug end 172 comprises at least one prong 181 which resides therewithin. In an embodiment, the at least one prong 181 extends outwardly from the receiving circuit board 154 and extends within the plug end 172. In the embodiment shown in FIG. 23, three prongs 181 reside within the plug end 172. In an embodiment, the prongs 181 provide an electrical connection between the energy receiving circuit board 154 to the energy storage device 12.

As illustrated in the embodiment, the adapter housing 170 is constructed of a generally frusto-conical shape with the plug end 172 extending distally from the housing 170. In a preferred embodiment, the frusto-conical shape of the adapter housing 170 is provided by two pairs of opposed frusto-conical sidewalls 170A, 170B and 170C, 170D, and upwardly and outwardly extending curved portion 171C between sidewalls 170B and 170C, and curved sidewall 171D between sidewalls 170A and 170C, and so designed to minimize the surface area of the adapter 166 which further minimizes potential contamination of the energy storage device 12. In an embodiment, the adapter 166 may further comprise a shielding material 174 such as a ferrite material as previously disclosed. As shown, the shielding material 174 is formed in the shape of a ring that is positioned surrounding the receiving coil 168 and receiving circuit board 154.

In an embodiment, the energy transmitting circuit 14 of the present invention may be incorporated within a container or receptacle that is designed to hold or store an energy storage device 12, such as a battery pack configured with the energy capture circuit 16. In addition, the container is preferably constructed to withstand a sterilization process, such as an autoclave procedure. Such a configuration is particularly useful during a sterilization process in which an energy storage device 12, i.e., a battery pack is autoclaved. Thus, by incorporating the energy transmitting circuit 16 within the structure of the container, the energy storage device 12 can be wirelessly charged while being positioned therewithin, particularly after the container and the secondary electrochemical cell 12 have been sterilized through an autoclave procedure. During an autoclaving procedure, the object being sterilized is subjected to increased heat and humidity in an effort to sterilize the surface of the object. In the case of a secondary electrochemical cell or battery pack, the autoclaving process typically reduces the amount of stored electrical energy therewithin. Therefore, the cell must be charged after the sterilization process to ensure the energy storage device is fully charged. However, electrically charging the energy storage device using a traditional process in which the battery terminals are connected to the charger, may re-contaminate the surface of the cell. Therefore, incorporating the energy transmitting circuit within the container eliminates the need to further handle the cell. The cell can be wirelessly charged through near field magnetic inductive coupling without removing the cell or pack from its container. Furthermore, incorporating the transmitting circuit within the container allows for efficient energy transfer while minimizing the possibility of compromising cell sterility.

Figure 20:
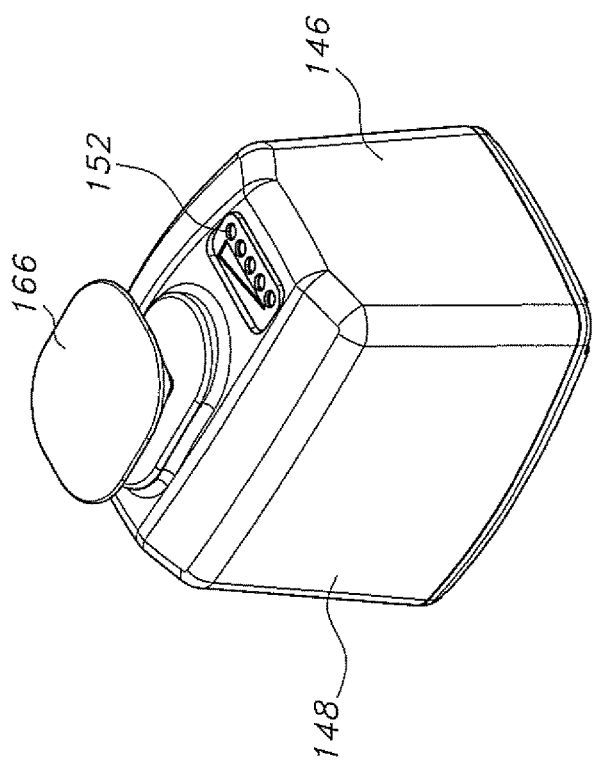
FIGS. 19 and 20 illustrate an embodiment of a wireless energy capture adapter of the present invention connected to a battery pack.
Figure 24:
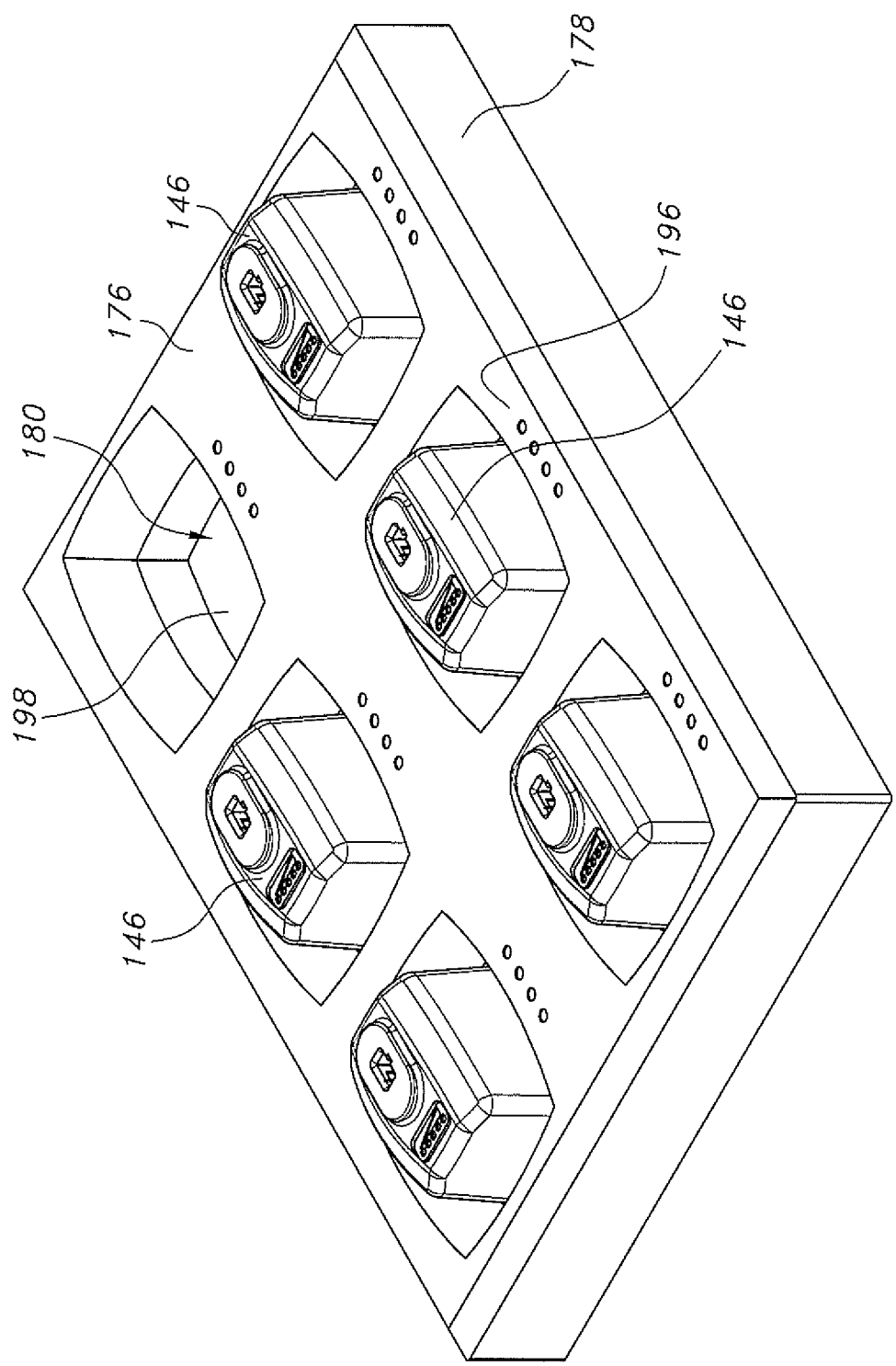
FIG. 24 illustrates an embodiment of a tray configured with the wireless energy transmitting circuit of the present invention.
Figure 25:
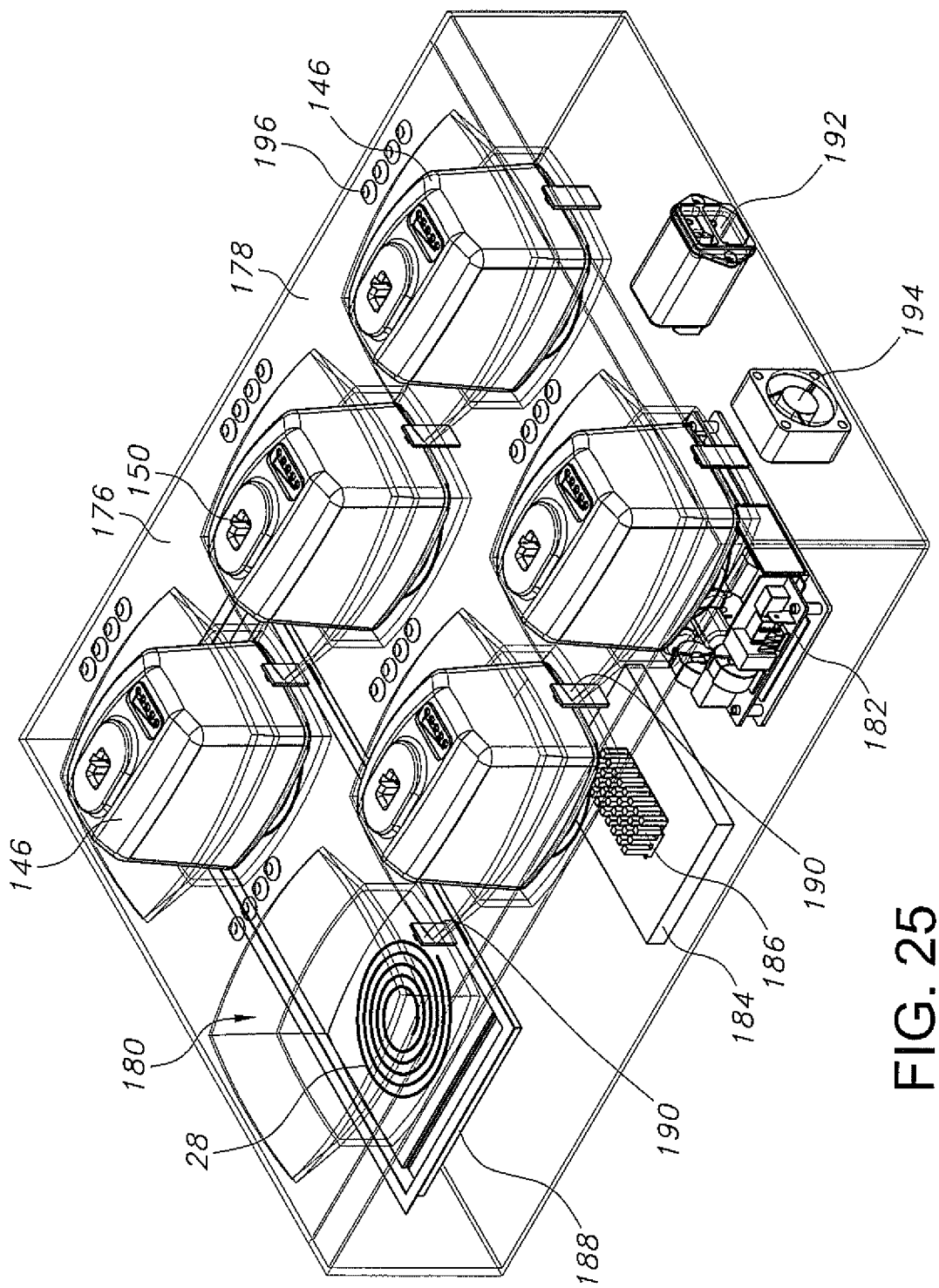
FIG. 25 illustrates an embodiment of the wireless energy transmitting circuitry enclosed within the housing of the tray shown in FIG. 24.

FIGS. 24 through 39 illustrate various embodiments of sterilizable containers that are designed to hold or store an electrical energy storage device 12. Furthermore, in an embodiment, these containers, which include, but are not limited to, trays, bins, and bays, may be incorporated with at least a portion of the energy transmitting circuit 14 of the present invention illustrated in FIGS. 1 through 6. FIGS. 24 and 25 illustrate an embodiment of a tray 176 designed to hold at least one energy storage device 12, such as a battery pack 146 that is configured with the energy capture circuit 16 of the present invention. In an embodiment, the battery pack 146 may be constructed with the energy capture circuit 16 and coil 100 electrically connected within the housing 148, as illustrated in FIG. 17. Alternatively, the battery pack 146 may be configured with a wireless energy capture adapter 166, as illustrated in FIG. 20. In an embodiment, the tray 176 is constructed with a tray housing 178 having multiple cavities 180 formed therewithin that are configured to receive an energy storage device, i.e., a battery pack 146. As shown, five battery packs 146, each incorporating the energy receiving circuit 16 of the present invention are positioned within a respective cavity 180 of the tray 176.

FIG. 25 illustrates an alternate embodiment in which the energy transmitting circuit 16 of the present invention is incorporated within the housing 178 of a container, such as the tray 176. As illustrated, the tray 176 comprises an energy transmitting circuit 16 of the present invention incorporated within an energy transmitting circuit board 182. At least one energy transmitting circuit board 182 is preferably positioned within a space enclosed within the container housing 178. As shown, the energy transmitting circuit board 182 is positioned within the housing 178 and below the cavity 180 which receives and supports an energy storage device 12. In an embodiment, at least one energy transmitting coil 28 electrically connected to the energy transmitting circuit 16 is positioned within the housing 178 of the container.

In addition to the energy transmitting circuit board 182, the energy storage device container may comprise additional circuit boards. As shown in FIG. 25, the tray 176 further comprises an electrical amplifier 184 comprising a heat sink 186. The amplifier 184 is designed to further amplify the electrical energy transmitted from the energy transmitting circuit board 182. The tray 176 also has a power management circuit board 188 that is designed to distribute electrical power between the various battery packs 146 positioned within the respective cavities 180.

In an embodiment, each of the tray cavities 180 that receives an energy storage device 12 may comprise a sensor 190 such as an optical sensor or a Hall sensor, configured to detect the presence of the energy storage device 12. In an embodiment, the tray 176 comprises an electrical power receiving outlet 192 in which an electrical power source, such as an alternating current electrical power source, is connected. The electrical power receiving outlet 192 serves to connect the energy transmitting circuit board 182 with an electrical energy source that is used to wirelessly transmit electrical power. In addition, the electrical power receiving outlet 192 connects the electrical amplifier 184 and power management board 188 to an electrical energy source. In an embodiment, the tray 176 may comprise a fan 194 to remove excess heat generated by the various circuit boards from within the container compartment housing 178. Furthermore, the tray 176 may comprise a tray status indicator 196 such as a plurality of light emitting diodes (LEDS) shown in FIGS. 24 and 25. The container status indicator 196 is configured to provide a user with information about the status of the energy storage device 12 or the operating condition of the tray 176. For example, the tray status indicator 196 may be configured to display a code or pattern that indicates that an energy storage device is present or not present within the tray cavity 180. In addition, the tray status indicator may be configured to display the amount of charge within the energy storage device 12. Furthermore, the container status indicator 196 may be configured to display that an error with the container and/or the energy storage device has occurred.

Figure 26:
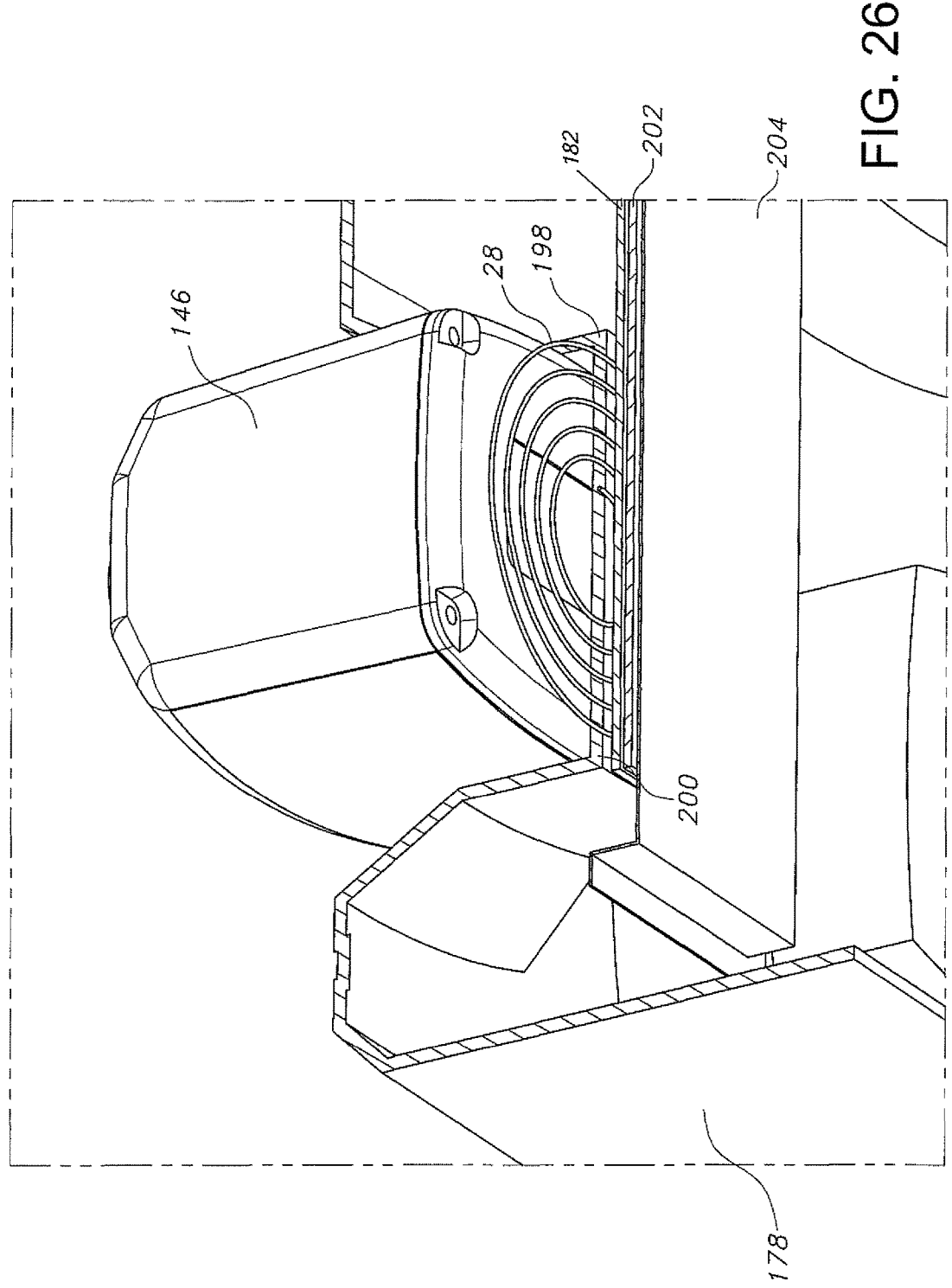
FIG. 26 shows a partial cross-sectional view of an embodiment of a battery pack configured with the wireless energy capture circuit positioned within a cavity of a tray shown in FIGS. 24 and 25.

FIG. 26 illustrates a partial cross-section view of a battery pack 146 positioned within a tray cavity 180. As shown, the battery pack 146 is positioned on a base platform 198 of the cavity 180. The transmitting coil 28 and energy transmitting circuit board 182 are positioned below the platform 198. A first shielding material 202 such as a ferrite material, as previously disclosed, may be positioned adjacent to the energy transmitting circuit board 182. In addition, a second magnetic field shielding material 204 may be positioned adjacent to the first magnetic field shielding material 202. In an embodiment, the second magnetic field shield may be composed of a metal such as aluminum or copper.

In an embodiment, the transmitting coil 100 is positioned directly below the cavity base platform 198 and the base plate 160 of the battery pack 146. Thus, the transmitting coil 28 is positioned in close proximity to the receiving coil 100 residing within the housing 148 of the battery pack 146. Furthermore, the first shielding material 202 is preferably positioned directly adjacent the transmitting coil 28 such that magnetic fields from nearby cavities 180 within the tray 176 do not interfere with the wireless transmission of electrical energy from the dedicated coil 128. In an embodiment, the second shielding material 204 comprising a metal is positioned directly adjacent the first shielding material 202. As shown in FIG. 26, the first shielding material 202 is positioned distal the transmitting coil 28 and the second shielding material 204 is positioned distal the first shielding material 202. The second shielding material 204 serves to absorb any magnetic fields that may not have been blocked by the first shielding material 202. Thus, the combination of the first and second shielding materials 202, 204 helps to minimize any interference caused by magnetic fields from adjacent tray cavities 180.

Figure 27:
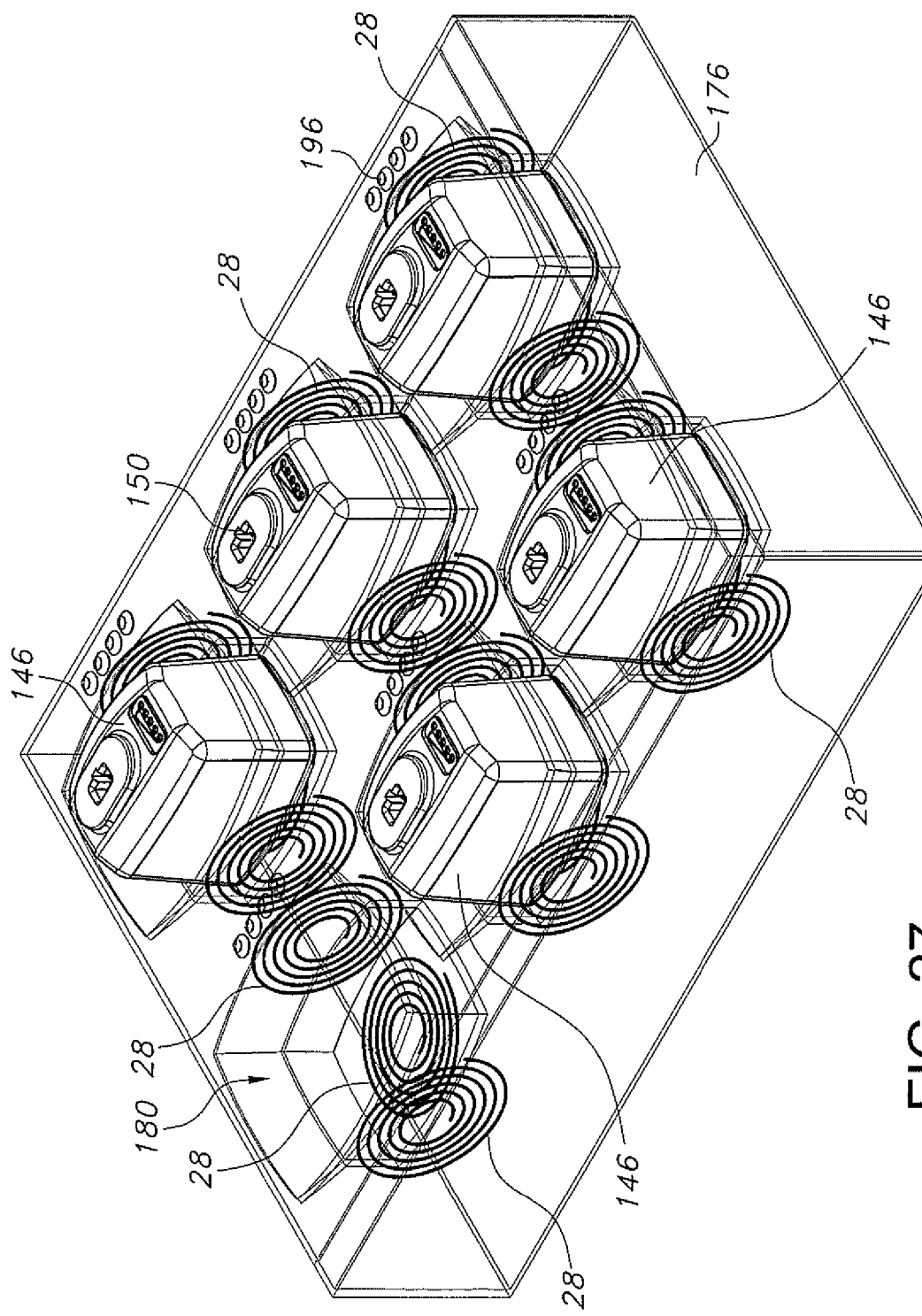
FIGS. 27-29 illustrate embodiments of the transmitting coil positioned within a tray configured with the wireless energy transmitting circuit of the present invention.
Figure 28:
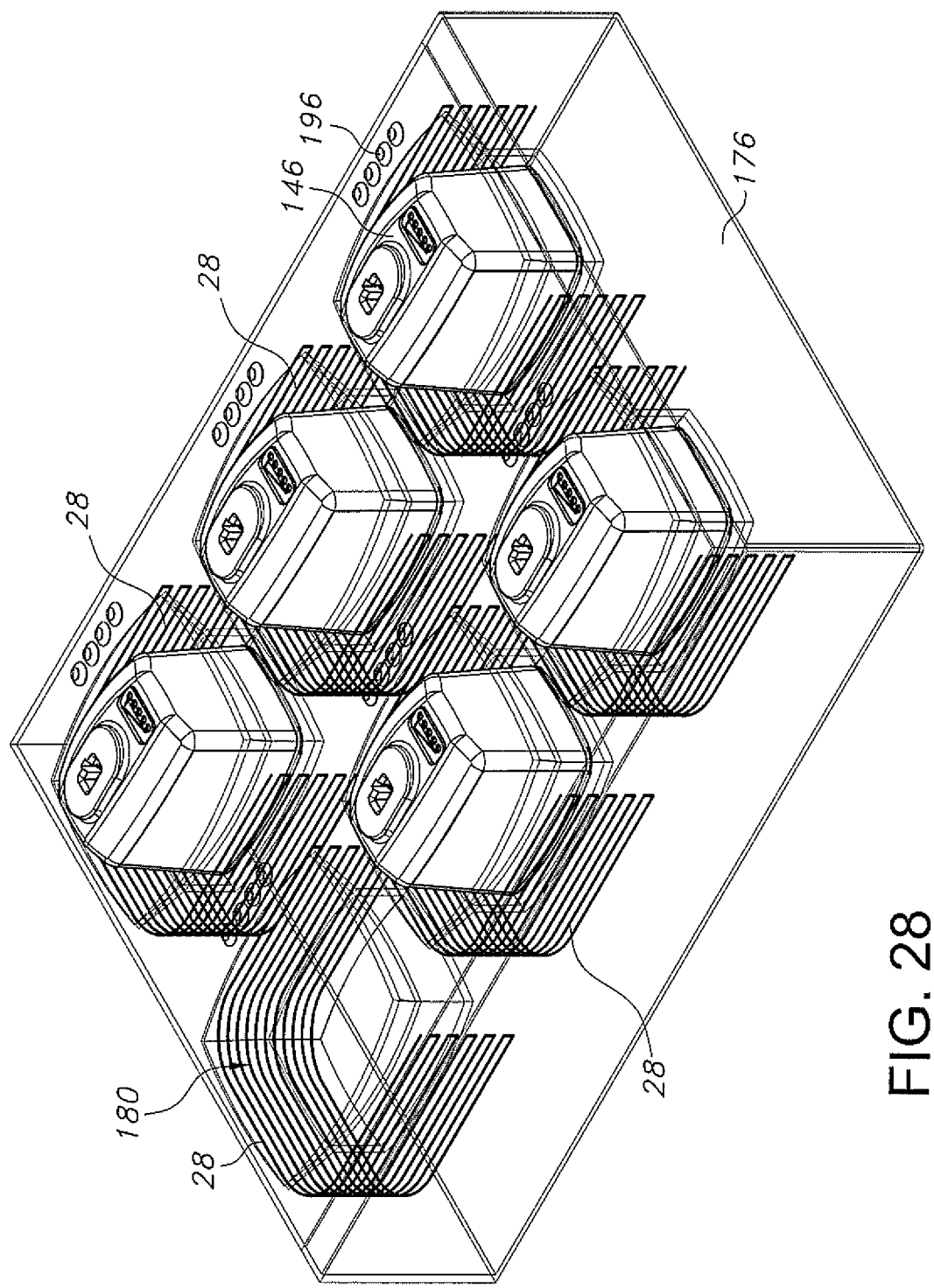
Figure 29:
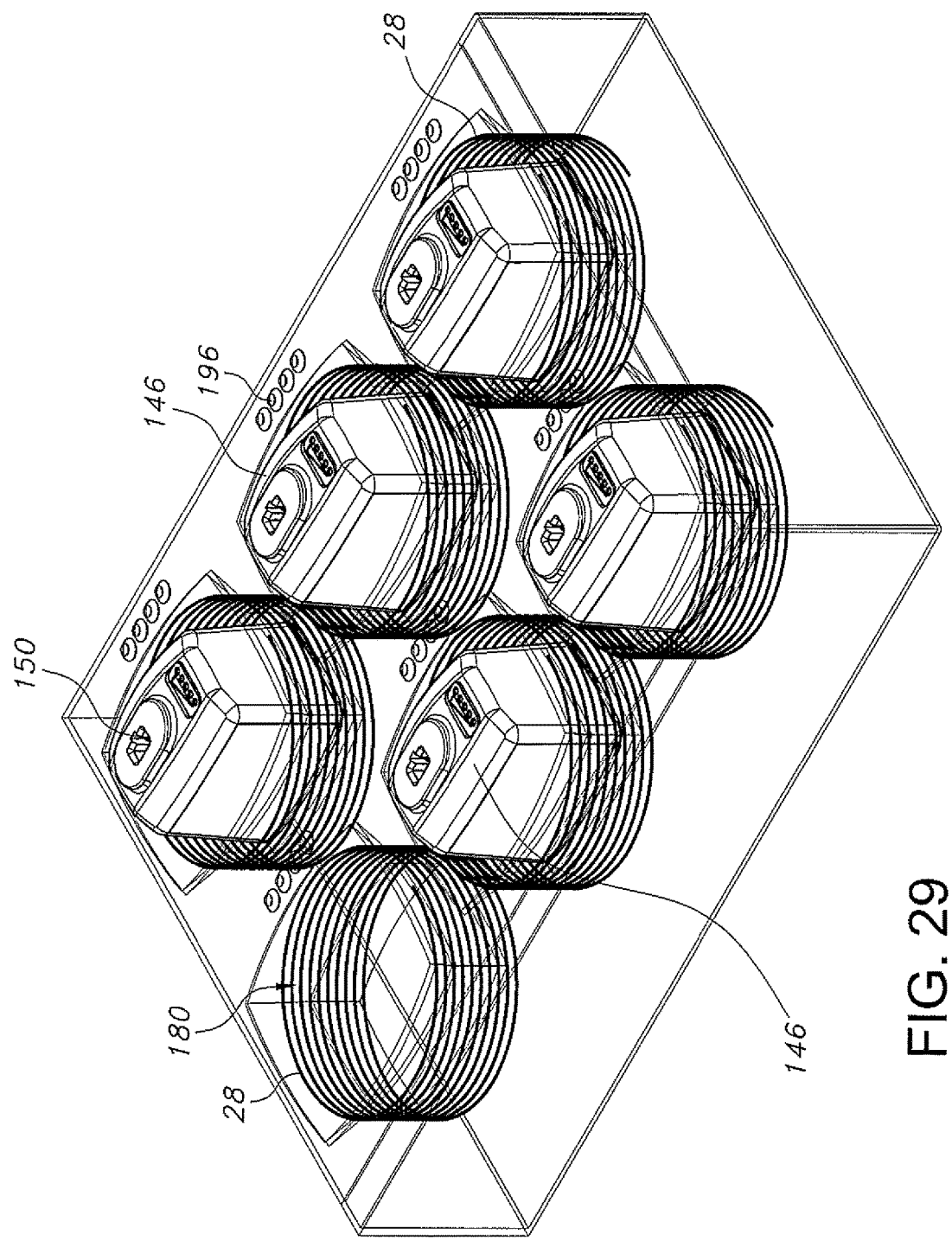
Figure 30B:
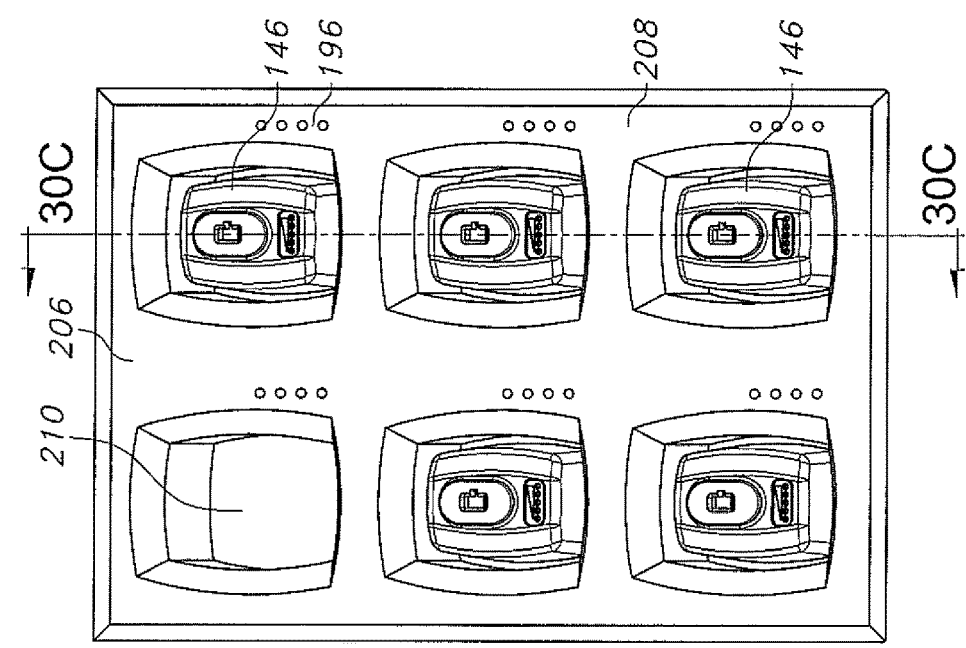
FIGS. 30A-30C show embodiments of an energy storage device bay configured with the wireless energy transmitting circuit of the present invention.
Figure 30C:
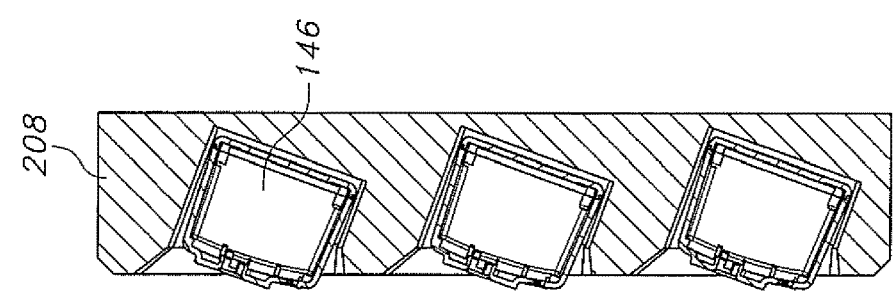
Figure 30A:
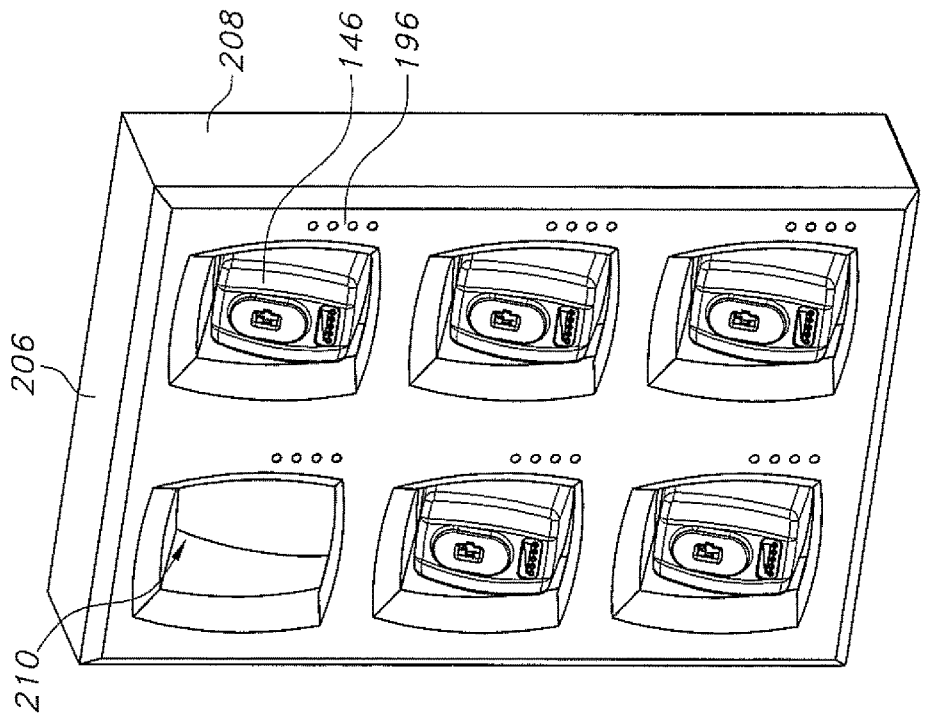
Figure 31B:
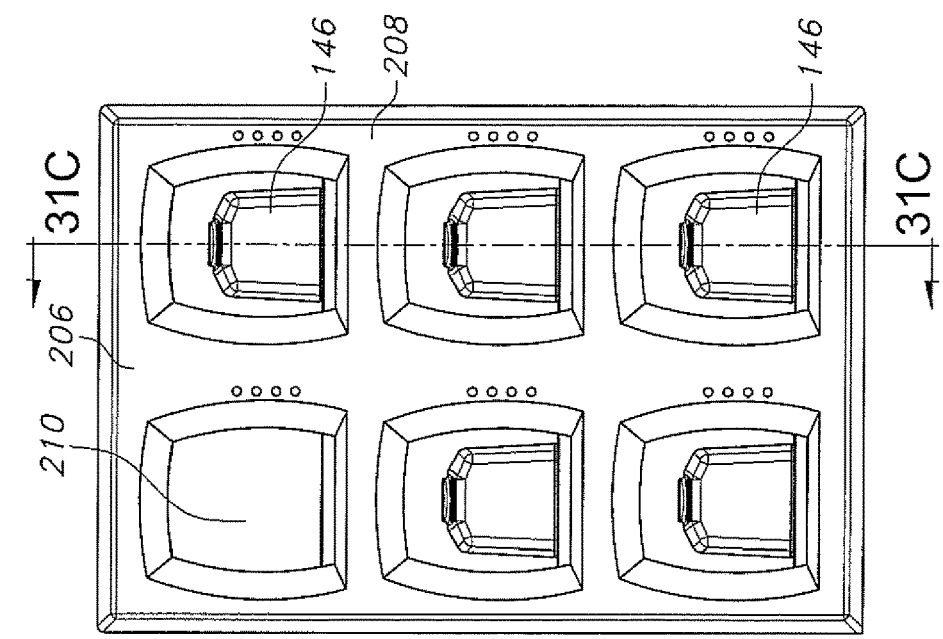
FIG. 31A-31C illustrate embodiments of an energy storage device bay configured with the wireless energy transmitting circuit of the present invention.
Figure 31C:
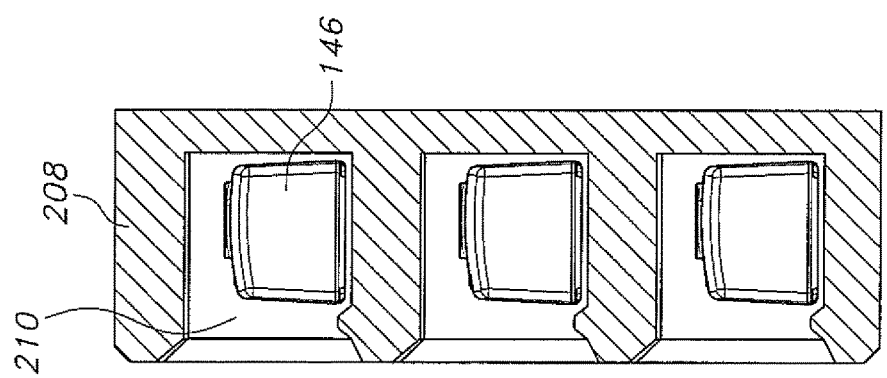
Figure 31A:
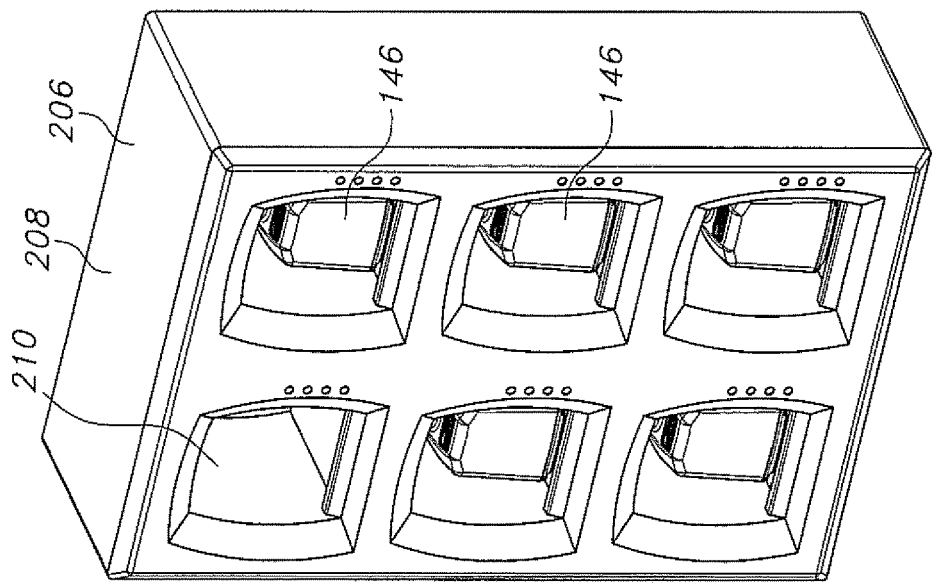

FIGS. 27 through 29 illustrate various configurations of the transmitting coil 28. As illustrated, the transmitting coil 28 may be configured in various shapes and positions within the container housing 178. As shown in FIG. 27, the transmitting coil 28 may comprise a circular spiral shape that is positioned in either a horizontal or perpendicular orientation with respect to the sidewalls of the housing 178. In an embodiment, the transmitting coil 28 may be constructed within the thickness of a sidewall of a container housing. In addition, the transmitting coil 28 may be constructed within the thickness of at least one sidewall that defines each cavity 180 of the tray 176. In addition, the transmitting coil 28 may be positioned on an exterior surface of a sidewall of the container housing.

FIG. 28 illustrates an embodiment in which the transmitting coil 28 comprises a plurality of spaced apart metal strips. As illustrated, the transmitting coil 28 comprises a plurality of metal strips that are formed within the cavity sidewall and partially surround the energy storage device 12 positioned within each of the cavities 180. FIG. 29 illustrates an embodiment in which the transmitting coil 28 comprises a spiral shape surrounding the energy storage device 12 and is further formed within the cavity sidewall. Thus, by configuring the transmitting coil 28 such that it at least partially surrounds each energy storage device 12 positioned within the tray 176, reception of the wirelessly transmitted electrical energy by the energy capture coil 100 within the energy storage device 12 is improved.

FIGS. 30A, 30B, 30C, 31A, 31B, 31C, and 32 illustrate various embodiments of bays 206 which are configured to hold and support a plurality of electrical storage devices 12, such as a battery pack configured with the energy capture circuit 16 of the present invention. As shown, the bay 206 comprises a housing 208 having a plurality of compartments 210 formed therewithin, each compartment 210 being configured to receive and support an energy storage device 12. In an embodiment, at least a portion of the wireless energy transmitting circuitry, as illustrated in FIGS. 1-6, is configured within the sidewalls of the housing 208 of the bay 206. In addition, the transmitting coil 28 may be positioned within at least one sidewall of the housing 208 of the bay 206. In a preferred embodiment, transmitting circuit 14 and at least one transmitting coil 28 is positioned adjacent each compartment 210 within the bay housing 208. As illustrated in FIGS. 30A, 30B, 30C, 31A, 31B, 31C, and 32, a battery pack 146 provided with a dedicated energy capture circuit 16 is positioned within each compartment 210 comprising the bay 206. FIG. 32 illustrates an embodiment of a bay 206 in which the various energy storage device compartments 210 are configured in multiple rows, one stacked above another. In an embodiment, the bay 206 may be configured with a plurality of compartments 210, each of which is constructed having a variety of non-limiting shapes and sizes.

FIGS. 33 and 34 illustrate embodiments of bins 212 that may be used to hold and support an energy storage device 12 configured with the energy capture circuit 16 of the present invention. As illustrated, each of the bins 212 comprises a bin housing 214 that encloses at least one energy storage device 12 therewithin. A plurality of latches 216 may be used to secure the energy storage device 12 within the bin 212. In an embodiment, a shelf 218 is positioned between each of the bins 212 illustrated in FIG. 33. The shelf 218 is configured with at least one transmitting coil 28. In an embodiment, the transmitting coil 28 may be positioned on an external surface of the shelf 218 or, alternatively, the at least one transmitting coil 28 may be incorporated within a thickness of the shelf 218. In an embodiment, at least a portion of the energy transmitting circuit 14 may be incorporated within at least one of the shelves 218. A sidewall 220 provides structural support for the plurality of shelves 218 and bins 212.

FIG. 34 illustrates an embodiment in which a plurality of bins 212 is positioned in a stacked orientation. As shown, a plurality of supports 222 is used to stack the bins 212. In an embodiment, at least one energy transmitting coil 28 may be incorporated within each of the supports 222. In addition, at least a portion of the energy transmitting circuit 14 may be incorporated within each of the supports 222.

FIG. 35 illustrates an embodiment of an energy storage device 12, i.e., a battery pack 146 configured with the energy capture circuit 16 positioned within a bin 212. As illustrated, the battery pack 146 is positioned within a retaining cage 224 positioned within the bin 212. In an embodiment, a transmitting coil 28 is positioned below the retaining cage 224 and battery packs 146. In an embodiment, the transmitting coil 28 may be positioned within the bin 212 to facilitate wireless energy transmission to the energy storage device 12. In addition, the transmitting coil 28 within the bin 212 may be configured as disclosed in U.S. Pat. App. Pub. 2015/0207337 to Peterson et al., assigned to the assignee of the present invention which is incorporated herein by reference in its entirety.

Figure 36:
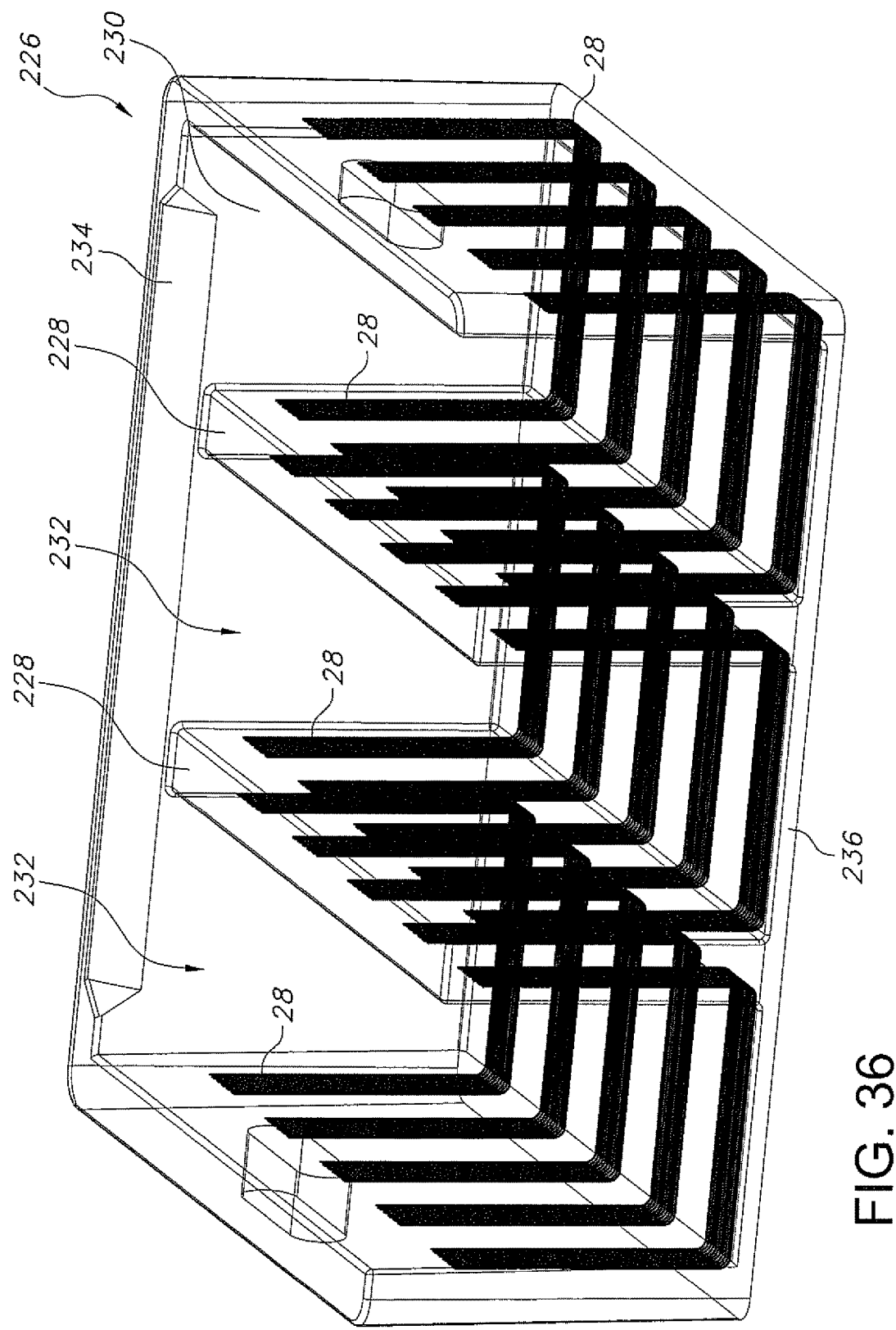
FIGS. 36 and 37 show embodiments of a bin container configured with a plurality of energy transmitting coils.
Figure 37:
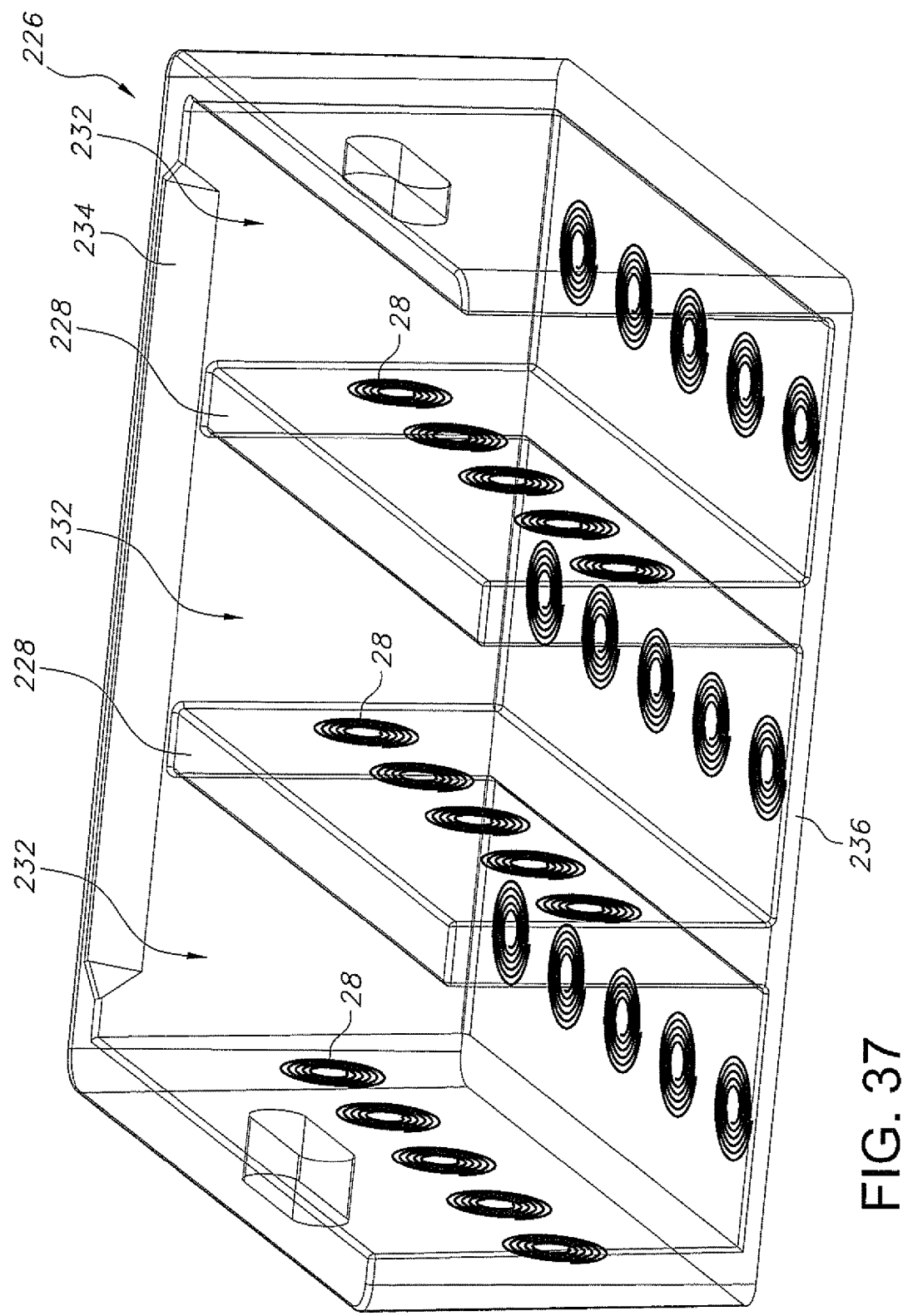

FIGS. 36 and 37 illustrate embodiments of a bin container 226 configured with the wireless transmitting coil 28. As shown in FIGS. 36 and 37, the bin containers 226 comprise a plurality of sidewalls 228 that define receptacles 232, each configured to receive a bin 212. An end wall 230 and stop 234 are designed to hold a bin 212 within each receptacle 232. In an embodiment, a plurality of energy transmitting coils 28 is incorporated within the sidewalls 228 that define the partitions 232 within the bin container 226. In an embodiment, these energy transmitting coils 28, which are electrically connected to the energy transmitting circuit 14 of the present invention, help facilitate wireless transmission of electrical energy to at least one energy storage device 12, such as a battery pack, that is configured with the energy capture circuit 16 and coil 100 positioned within the bin 212. As illustrated in FIG. 36, the transmitting coil 28 comprises a plurality of spaced apart metal strips in a parallel orientation that line the sidewall 228. The bin container 226 illustrated in FIG. 37 comprises a plurality of transmitting coils 28 configured in a spiral pattern incorporated within the sidewalls 228. In an embodiment, the transmitting coil 28 may be incorporated within the thickness of the sidewalls, or alternatively, the transmitting coil 28 may be positioned on a surface of the sidewalls 228.

Figure 38:
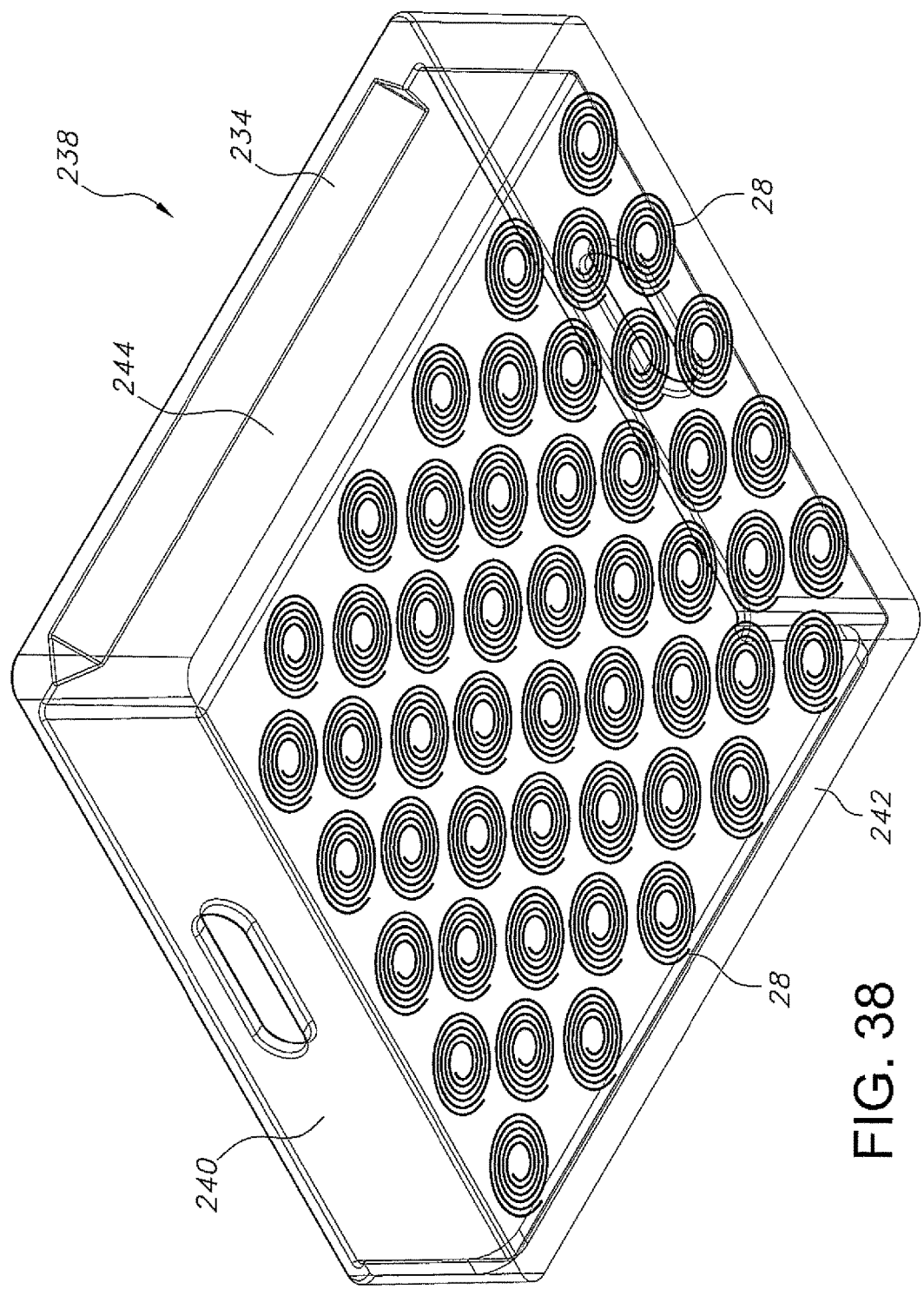
FIG. 38 illustrates an embodiment of a tray configured with a wireless energy transmitting coil that is designed to hold a plurality of energy storage devices configured with a wireless energy capture circuit.

FIG. 38 shows an embodiment of a tray 238 configured with a plurality of energy transmitting coils 28. As illustrated, the tray 238 comprises sidewalls 240 and an end wall 244 that extends upwardly from a base wall 242. The end wall 244 is oriented about perpendicular to the sidewalls 240. As shown, the end wall 244 may comprise a stop 234 designed to hold the plurality of energy storage devices 12 within the tray 238. In an embodiment, the plurality of energy transmitting coils 28 may be embedded within the base wall 242 of the tray 238. Alternatively, the plurality of transmitting coils 28 may be positioned on an external surface of the base wall 242. It is further contemplated that a plurality of energy transmitting coils 100 may be embedded or positioned on a surface of at least one sidewall 240 or end wall 244. Thus, a plurality of energy storage devices 12 configured with the energy capture circuit 16 of the present invention may be positioned within the tray 238 such that the energy capture coil 100 electrically connected to the energy storage device 12 is in close proximity to at least one transmitting coil 28 within the tray 238.

Figure 39:
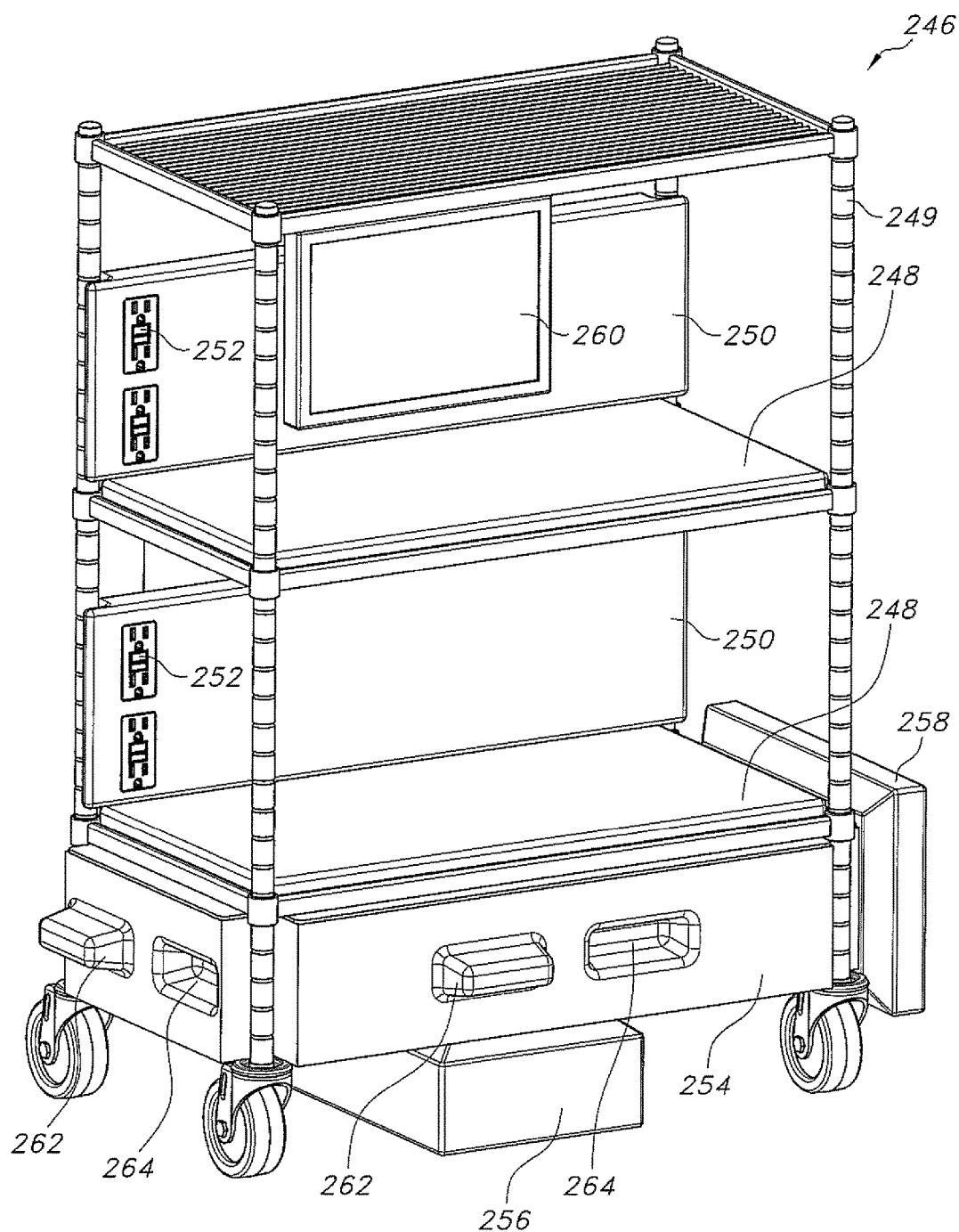
FIGS. 39 and 40 show embodiments of a cart configured with the wireless energy transmitting circuitry of the present invention.
Figure 40:
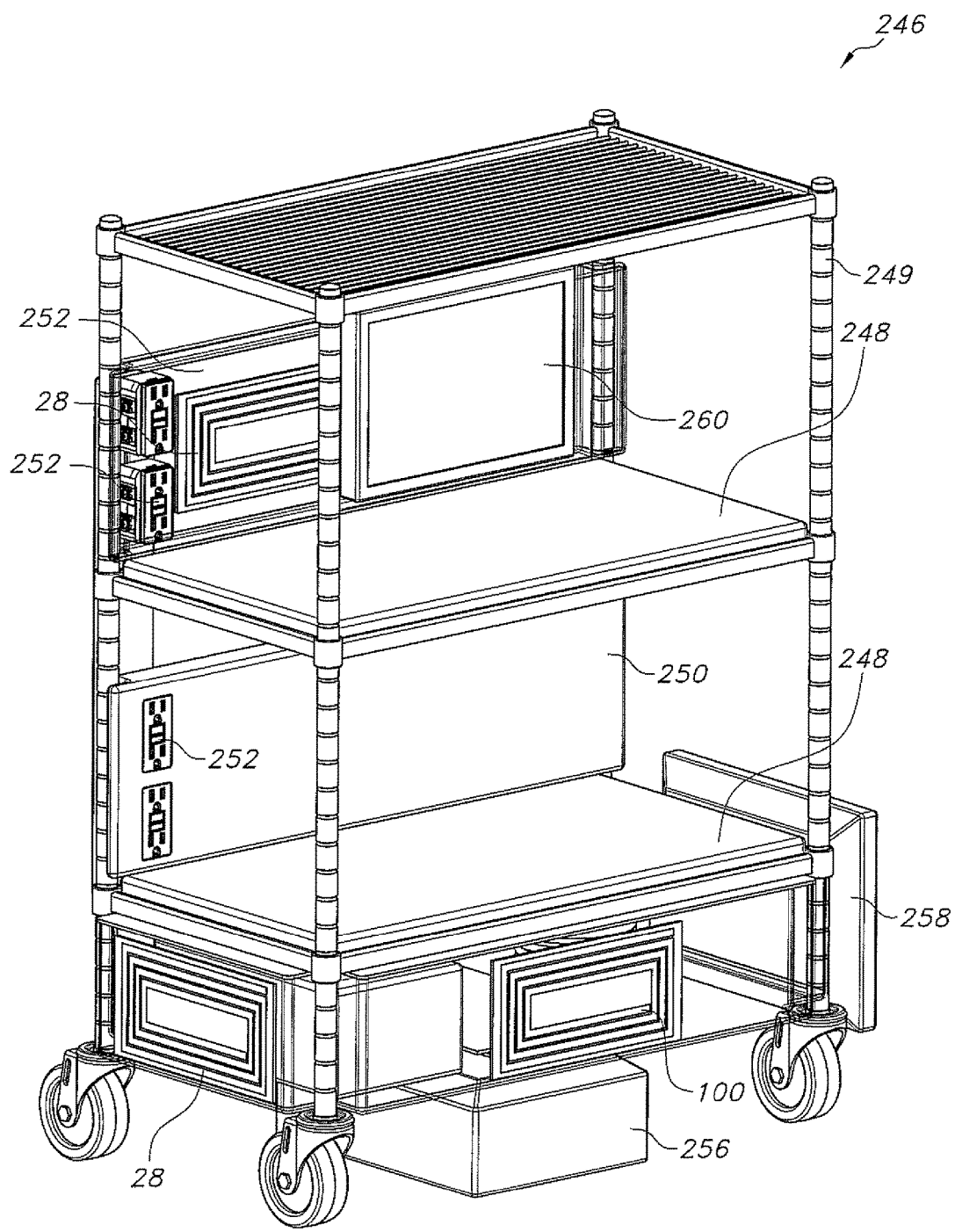

In operation, at least one energy storage device 12, such as a battery pack 146 configured with the energy capture circuit 16 and energy capture coil 100 is positioned on or within a container, such as a tray 176, bin 212 or bay 206. The container comprising the at least one energy storage device 12 configured with the energy capture circuit 16 and energy capture coil 100 is sterilized using an autoclaving process. After the energy storage device 12 is sterilized, the container comprising the energy storage device is removed from the autoclave. The energy storage device equipped with the energy capture circuit 16 and energy capture coil 100 is then electrically charged by wirelessly transferring electrical energy transmitted by the energy transmitting coil 28 comprised within the container. Thus, the energy storage device 12, such as a battery pack, is electrically charged without physical contact. FIGS. 39 and 40 illustrate embodiments of a cart 246 that is configured with the energy transmitting circuit 14 and transmitting coil 28 of the present invention. As illustrated, the cart 246 comprises a plurality of cart shelves 248 and end walls 250 oriented about perpendicular to the cart shelves 248. The shelves 248 and end walls 250 are supported by a cart frame 249. The cart shelves 248 are designed to support at least one energy storage device 12 configured with the energy capture circuit 16 and capture coil 100. In an embodiment, at least one of the cart shelves 248 and end walls 250 may be configured with at least one energy transmitting coil 28 incorporated therewithin, or alternatively, positioned on an external surface of the shelf 248 or end wall 250. In addition, at least a portion of the wireless energy transmitting circuit 14 may be incorporated within either the end wall 250 or the cart shelf 248. Thus, by incorporating at least one energy transmitting coil 28 and/or energy transmitting circuit 14, the cart 246 can wirelessly transmit electrical energy to an energy storage device 12 configured with an energy receiving coil 100 and energy capture circuit 16 and thus, electrically charge the device.

In an embodiment, in addition to the energy transmitting circuit 14 and transmitting coil 28, the cart 246 may also be configured with at least one wireless energy receiving coil 100 and energy capture circuit 16. As illustrated in FIGS. 39 and 40, the cart 246 may comprise a panel that defines a compartment 254 configured to store various electronic circuitry therewithin. In an embodiment, the compartment 254 may provide a storage space for at least one energy capture circuit 16 or energy receiving circuit 14. In addition, as illustrated in FIG. 39, at least one energy receiving coil 100 or transmitting coil 28 may be incorporated within or on a surface of the panel. In addition, as illustrated in FIGS. 39 and 40, the back wall 250 may be configured with an electrical outlet 252. Thus, the cart 246 can electrically power additional electronic devices (not shown) by plugging the device into the electrical outlet 252 of the cart 246.

Furthermore, the cart 246 may be equipped with a display 260 that is electrically powered by the cart 246.

In an embodiment, the cart 246 may be configured with an electrical energy storage device 256 as illustrated in FIGS. 39 and 40. The electrical energy storage device 256 is configured to store electrical energy either received wirelessly, such as via magnetically coupled induction, or via a hard wire connection to an electrical power source. In addition, the cart 246 may be configured with an antenna 258 designed to capture wirelessly transmitted electrical energy. Alternatively, the antenna 258 may be configured to wirelessly transmit electrical energy. Thus, the antenna may be configured with at least one energy transmitting coil 28 and/or at least one energy receiving coil 100.

Furthermore, as illustrated in FIG. 39, the cart 246 may comprise male and female electrical interlocks 262, 264. When the electrical interlocks from at least two carts 246 are physically in contact, i.e., the male interlock 262 of a first cart 246 is in physical contact with a female interlock 264 of a second cart 246, electrical energy may be transferred and received between the electrically connected carts 246. Thus, the cart 246 is not only designed to wirelessly charge an energy storage device 12, such as a battery pack configured with the energy capture circuit 16 according to the present invention, but is also a mobile electrical energy source that can transmit and receive electrical energy to and from other carts 246.

It is appreciated that various modifications to the inventive concepts described herein may be apparent to those of ordinary skill in the art without departing from the spirit and scope of the present invention as defined by the appended claims.

What is claimed is:

1. A wireless electrical charging system, comprising:
   a) a closed container configured to house at least one electrical energy storage device, wherein the closed container comprises a connection port that is electrically connectable to an electrical energy storage device housed therein, and wherein the closed container is configured to withstand being subjected to an autoclave sterilization process without removing the electrical energy storage device from being housed therein; and
   b) an adapter comprising:
      i) an adapter housing having an adapter electrical plug end, the adapter electrical plug end being electrically connectable to the connection port of the closed container; and
      ii) an electrical energy capture circuit supported by the adapter housing, the electrical energy capture circuit comprising an electrical energy capture coil that is configured to receive wirelessly transmitted electrical power from an electrical energy transmitting circuit by magnetic induction coupling,
      iii) wherein, with the adapter electrical plug end connected to the connection port of the closed container, the electrical energy capture circuit is configured to receive wirelessly transmitted electrical power from an electrical energy transmitting circuit to charge the electrical energy storage device.

2. The wireless electrical charging system of claim 1, wherein the electrical energy capture circuit comprises:
   a) a voltage regulator that is configured to dynamically modify an amplitude of a voltage of the electrical power received by the electrical energy capture coil; and
   b) a charger circuit with a linear voltage converter configured to reduce the voltage of the electrical power received by the electrical energy capture coil to a reduced voltage that is suitable for charging the electrical energy storage device.

3. The wireless electrical charging system of claim 2, wherein the voltage regulator comprises a buck voltage converter.

4. The wireless electrical charging system of claim 1, wherein the closed container comprises an LED status indicator that is electrically connected to the electrical energy storage device housed in the closed container, the LED status indicator being configured to display a status of the electrical energy storage device.

5. The wireless electrical charging system of claim 1, wherein the electrical energy capture circuit of the adapter further comprises a protection circuit comprising at least one field effect transistor, wherein, with the adapter electrical plug end connected to the connection port of the closed container, the electrical energy capture circuit is configured to control opening and closing of the at least one field effect transistor, thereby electrically connecting or disconnecting the electrical energy capture circuit from an electrical energy storage device housed in the closed container.

6. The wireless electrical charging system of claim 1, wherein the electrical energy capture circuit of the adapter further comprises a conditioning circuit comprising an electrical impedance matching network circuit having a plurality of electrically connected capacitors and a rectification circuit having a plurality of electrically connected diodes.

7. The wireless electrical charging system of claim 1, wherein a magnetic field shielding material selected from the group consisting of a ferrite material, a metal, and combinations thereof is supported by the adapter housing adjacent to the electrical energy capture coil and is positioned inside the closed container.

8. The wireless electrical charging system of claim 1, wherein the adapter housing has a frusto conical shape.

9. The wireless electrical charging system of claim 1, wherein the electrical energy storage device is selected from the group consisting of an electrochemical cell, a battery pack, and a capacitor.

10. A wireless electrical charging system, comprising:
   a) an electrical energy transmitting circuit that is configured to wirelessly transmit an electrical power;
   b) a closed container configured to house at least one electrical energy storage device, wherein the closed container comprises a connection port that is electrically connectable to an electrical energy storage device housed therein, and wherein the closed container is configured to withstand being subjected to an autoclave sterilization process without removing the electrical energy storage device from being housed therein;
   c) an adapter comprising:
      i) an adapter housing having an adapter electrical plug end, the adapter electrical plug end being electrically connectable to the connection port of the closed container; and
      ii) an electrical energy capture circuit supported by the adapter housing, the electrical energy capture circuit comprising an electrical energy capture coil that is configured to receive the wirelessly transmitted electrical power from the electrical energy transmitting circuit by magnetic induction coupling,
      iii) wherein, with the adapter electrical plug end connected to the connection port of the closed container, the electrical energy capture circuit is configured to receive the wirelessly transmitted electrical power from the electrical energy transmitting circuit to charge the electrical energy storage device.

11. The wireless electrical charging system of claim 10, wherein the electrical energy transmitting circuit comprises:
   a) a power management circuit that is configured to modify at least one of a current and a voltage of an electrical power received from an external power supply;
   b) an electrical energy transmitting coil; and
   c) an amplifier electrically connected to the power management circuit and the electrical energy transmitting coil, wherein the amplifier and the electrical energy transmitting coil are configured to receive the modified current or voltage from the power management circuit and then transmit electrical power having an alternating current.

12. The wireless electrical charging system of claim 11, wherein electrical energy transmitting circuit comprises a pulse width modulator circuit that is electrically connected to the amplifier, the pulse width modulator circuit comprising a clock resonator source and an AND-gate that is electrically connected in parallel to a NAND-gate, and wherein the pulse width modulator circuit is configured to provide a clock reference signal to the amplifier.

13. The wireless electrical charging system of claim 11, wherein the electrical energy transmitting circuit comprises a power supply circuit that is configured to modify the electrical power received from the external power supply to electrically power the electrical energy transmitting circuit.

14. The wireless electrical charging system of claim 11, wherein the amplifier of the electrical energy transmitting circuit comprises a first set of field effect transistors Q1 and Q2 and a second separate set of field effect transistors Q3 and Q4, and wherein alternating movement of the respective first and second sets of field effect transistors causes an electrical power having an alternating current to flow across the electrical energy transmitting coil to generate a magnetic field.

15. The wireless electrical charging system of claim 10, wherein the electrical energy capture circuit comprises a charger circuit with a linear voltage converter configured to reduce the voltage of the received wirelessly transmitted electrical power.

16. The wireless electrical charging system of claim 10, wherein the electrical energy capture circuit comprises:
   a) an electrical energy capture coil configured to receive the wirelessly transmitted electrical power from the electrical energy transmitting circuit;
   b) a voltage regulator that is configured to dynamically modify an amplitude of a voltage of the electrical power received by the electrical energy capture coil; and
   c) a charger comprising a linear voltage converter that is configured to reduce the voltage of the electrical power received from the voltage regulator to a reduced voltage that is suitable for charging the electrical energy storage device.

17. The wireless electrical charging system of claim 16, wherein the voltage regulator of the electrical energy capture circuit comprises a charger circuit with a linear voltage converter configured to reduce the voltage of the received wirelessly transmitted electrical power.

18. The wireless electrical charging system of claim 17, wherein the voltage regulator comprises a buck voltage converter.

19. The wireless electrical charging system of claim 10, wherein the closed container comprises an LED status indicator that is electrically connected to the electrical energy storage device housed in the closed container, the LED status indicator being configured to display a status of the electrical energy storage device.

20. The wireless electrical charging system of claim 10, wherein the electrical energy capture circuit of the adapter further comprises a protection circuit comprising at least one field effect transistor, wherein, with the adapter electrical plug end connected to the connection port of the closed container, the electrical energy capture circuit is configured to control opening and closing of the at least one field effect transistor, thereby electrically connecting or disconnecting the electrical energy capture circuit from an electrical energy storage device housed in the closed container.

21. The wireless electrical charging system of claim 10, wherein the electrical energy capture circuit of the adapter further comprises a conditioning circuit comprising an electrical impedance matching network circuit having a plurality of electrically connected capacitors and a rectification circuit having a plurality of electrically connected diodes.

22. The wireless electrical charging system of claim 10, wherein the electrical energy transmitting circuit further comprises an electrical energy transmitting circuit radio frequency transceiver and the electrical energy capture circuit further comprises an electrical energy capture circuit transceiver, the respective transceivers being configured to send and receive data by radio frequency telemetry.

23. The wireless electrical charging system of claim 10, wherein a magnetic field shielding material selected from the group consisting of a ferrite material, a metal, and combinations thereof is supported by the adapter housing adjacent to the electrical energy capture coil and is positioned inside the closed container.

24. The wireless electrical charging system of claim 10, wherein the adapter housing has a frusto conical shape.

25. The wireless electrical charging system of claim 10, wherein the electrical energy storage device is selected from the group consisting of an electrochemical cell, a battery pack, and a capacitor.

* * * * *